United States Patent
Xia et al.

(10) Patent No.: US 11,405,944 B2
(45) Date of Patent: Aug. 2, 2022

(54) COORDINATED STATIONS IN OBSS WITH SHARED TXOP IN THE FREQUENCY DOMAIN

(71) Applicant: SONY GROUP CORPORATION, Tokyo (JP)

(72) Inventors: Qing Xia, San Jose, CA (US); Mohamed Abouelseoud, San Francisco, CA (US); Liangxiao Xin, San Jose, CA (US)

(73) Assignee: SONY GROUP CORPORATION, Tokyo (JP)

( * ) Notice: Subject to any disclaimer, the term of this patent is extended or adjusted under 35 U.S.C. 154(b) by 20 days.

(21) Appl. No.: 17/152,536

(22) Filed: Jan. 19, 2021

(65) Prior Publication Data

US 2021/0410163 A1    Dec. 30, 2021

Related U.S. Application Data

(60) Provisional application No. 63/043,309, filed on Jun. 24, 2020.

(51) Int. Cl.
| | |
|---|---|
| *H04W 72/12* | (2009.01) |
| *H04W 72/08* | (2009.01) |
| *H04W 74/02* | (2009.01) |
| *H04W 72/04* | (2009.01) |
| *H04W 72/00* | (2009.01) |

(52) U.S. Cl.
CPC ..... *H04W 72/1268* (2013.01); *H04W 72/005* (2013.01); *H04W 72/044* (2013.01); *H04W 72/082* (2013.01); *H04W 72/121* (2013.01); *H04W 74/02* (2013.01)

(58) Field of Classification Search
CPC ........... H04W 72/1268; H04W 72/005; H04W 72/044; H04W 72/082; H04W 72/121; H04W 74/02; H04W 74/0816; H04W 74/002; H04W 84/12
See application file for complete search history.

(56) References Cited

U.S. PATENT DOCUMENTS

| | | | |
|---|---|---|---|
| 9,622,262 B2 * | 4/2017 | Zhu | H04W 74/002 |
| 10,516,457 B2 * | 12/2019 | Wang | H04W 74/0816 |
| 2014/0269544 A1 * | 9/2014 | Zhu | H04L 1/1671 370/329 |

(Continued)

FOREIGN PATENT DOCUMENTS

CN    109067436 A    12/2018

*Primary Examiner* — Ivan O Latorre
(74) *Attorney, Agent, or Firm* — O'Banion & Ritchey LLP; John P. O'Banion

(57) ABSTRACT

A wireless network communications protocol to allow sharing transmit opportunities (TXOP) in the same basic service set (BSS), or an overlapping basic service set (OBSS) over at least one channel. Sharing offer and request information is exchanged with an access point (AP) station, which shares this with APs on overlapping BSSs. Information is exchanged between stations advertising that a coming TXOP is available to be shared, and identifying stations that are willing to join it. Resource unit (RU) distributions are determined for the participant stations to use in sharing the TXOP, while the AP of the OBSS performs scheduling and distribution of RUs for stations in the OBSS.

20 Claims, 69 Drawing Sheets

(56) References Cited

U.S. PATENT DOCUMENTS

| | | | |
|---|---|---|---|
| 2016/0028466 A1* | 1/2016 | Han | H04L 1/1829 370/315 |
| 2017/0181187 A1* | 6/2017 | Asterjadhi | H04W 74/006 |
| 2017/0294949 A1* | 10/2017 | Zhang | H04W 52/46 |
| 2017/0325239 A1* | 11/2017 | Xing | H04B 7/2621 |
| 2018/0027591 A1* | 1/2018 | Shinohara | H04W 28/0268 370/329 |
| 2020/0106579 A1* | 4/2020 | Cherian | H04L 5/0032 |
| 2021/0111855 A1* | 4/2021 | Verma | H04W 72/044 |
| 2021/0120548 A1* | 4/2021 | Chen | H04W 72/0426 |
| 2021/0127307 A1* | 4/2021 | Huang | H04W 16/18 |
| 2021/0127420 A1* | 4/2021 | Lu | H04W 76/15 |
| 2021/0143884 A1* | 5/2021 | Kwon | H04W 72/04 |
| 2021/0289499 A1* | 9/2021 | Naribole | H04W 72/0453 |
| 2021/0314879 A1* | 10/2021 | Seok | H04B 17/318 |
| 2021/0315009 A1* | 10/2021 | Xia | H04L 63/08 |
| 2021/0315010 A1* | 10/2021 | Hsu | H04W 74/008 |
| 2021/0410149 A1* | 12/2021 | Xia | H04W 72/1242 |
| 2021/0410163 A1* | 12/2021 | Xia | H04W 72/082 |
| 2022/0053560 A1* | 2/2022 | Xin | H04W 74/004 |

* cited by examiner

FIG. 72

| Frame Control | Duration | RA | TA | Reserved Band TXOP Holder BSS | TF Delay | Data Delay | MU-BA Delay | FCS |
|---|---|---|---|---|---|---|---|---|
| Octets: 2 | 2 | 6 | 6 | 1 | 1 | 1 | 1 | 4 |

| B0 | B1 | B2 | B3 | B4 | B5 | B6 | B7 | B8 | B9–B15 |
|---|---|---|---|---|---|---|---|---|---|
| Reserve Band | 20 MHz | 40 MHz | 80 MHz | 80+80 MHz or 160 MHz | Primary | Secondary | Random Access | Scheduled Access | Reserved |
| Bits: 1 | 1 | 1 | 1 | 1 | 1 | 1 | 1 | 1 | 7 |

| Frame Control | Duration | RA | TA | STA TXOP Access Allocation 1 | ... | STA TXOP Access Allocation n | FCS |
|---|---|---|---|---|---|---|---|
| 2 | 2 | 6 | 6 | 6 | ... | 6 | 4 |

Octets:

| TXOP Holder MAC Address | TXOP Participant MAC Address | Allocation Control Info |
|---|---|---|
| 1 | 1 | 4 |

Octets:

| B0 – B3 | B4 – B15 | B16 – B19 | B20 – B27 | B28 – B31 |
|---|---|---|---|---|
| Priority | AID12 | UL BW | RU Allocation | Reserved |
| 4 | 12 | 4 | 8 | 4 |

Bits:

1850

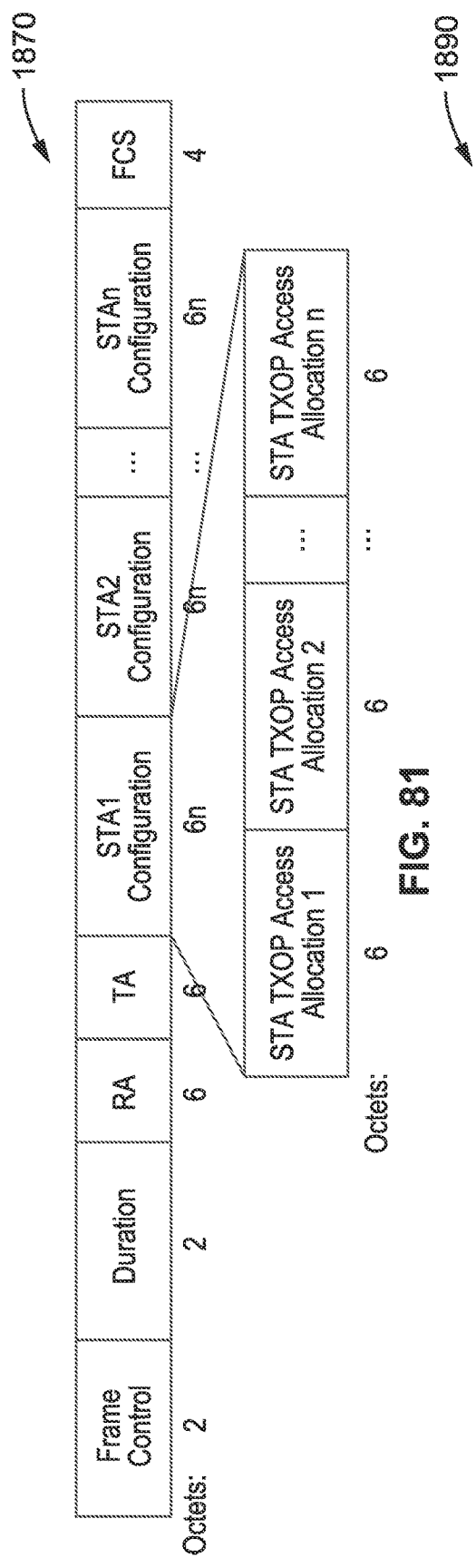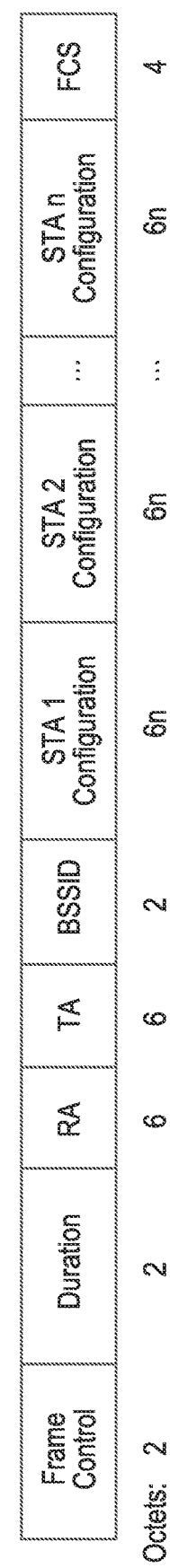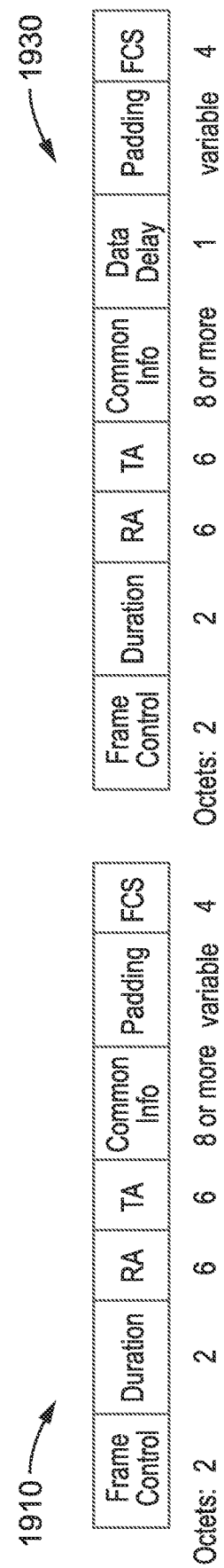

COORDINATED STATIONS IN OBSS WITH SHARED TXOP IN THE FREQUENCY DOMAIN

CROSS-REFERENCE TO RELATED APPLICATIONS

This application claims priority to, and the benefit of, U.S. provisional patent application Ser. No. 63/043,309 filed on Jun. 24, 2020, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to Wi-Fi transmissions over a network, and more particularly to performing uplink (UL) multi-user (MU) transmissions over the network.

2. Background Discussion

The use of Wi-Fi networks is rapidly expanding, with a growth that is spurred by the ongoing development of novel applications and the proliferation of smart-devices. In view of the growing number and increasing demand of Wi-Fi users, there is a need for both high throughput and low latency.

Numerous 802.11 amendments have been proposed to improve the performance of WLANs, specifically those focusing on the 2.4 GHz and 5 GHz bands. Additional techniques have targeted data rate improvement proposed solutions from the perspective of the Physical (PHY) layer, e.g., increasing bandwidth from 20 MHz to 160 MHz, proposing new modulation and coding schemes and improving Multiple-Input-Multiple-Output (MIMO) systems.

Improvements have been introduced to the Medium Access Control (MAC) layer for reducing the overhead of transmission and thus increasing data throughput by, for example, reducing interframe spacing, aggregating and segmenting packets, and applying power consumption protocols to alternate between awake and doze states for STAs to save power.

In addition, IEEE 802.11ax introduced an Orthogonal Frequency Division Multiple Access (OFDMA) technique, where adjacent subcarriers are grouped into resource units (RUs). By assigning RUs for Multi-users (MUs) in uplink (UL) and downlink (DL) DATA transmission, the technique maximizes the transmission rate.

OFDMA allows many users to use the same time resources at the same time and splits the frequency domain among them. This results in improved use of resources and allows latency reduction since more users can be scheduled at the same time.

Certain Wi-Fi communications involving Real-Time Applications (RTAs), such as real-time gaming, are very sensitive to delay and thus have more stringent requirements for the communications to be performed with low latency. The user experience, such as real-time interaction between different game players, is very important in real time gaming.

However, these current 802.11 protocols can still have latency issues which are problematic for applications such as real-time gaming, or other real time applications.

Accordingly, a need exists for a protocol which can increase UL efficiency by non-AP stations performing MU UL OFDMA transmissions. The present disclosure fulfills that need and provides additional benefits over previous technologies.

BRIEF SUMMARY

Multiple User (MU) uplinks (ULs) are facilitated in this disclosure which allows a non-AccessPoint (AP) station (STA) to initiate MU UL transmissions, once it has obtained the channel, without waiting for a trigger frame from AP. This non-AP STA performs as a Transmit Opportunity (TXOP) holder STA, which is configured to initiate shared TXOP access and schedule the channel resources for other non-AP STAs (from the internal Basic Service Set (BSS) or from an Overlapping Basic Service Set (OBSS)) in which STAs are willing to join in the shared TXOP. The disclosure also provides for dynamic scheduling, exchanging messages with the AP for information sharing or approval, as well as exchanging information with other STAs, for example those willing to share the TXOP.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 72 is a data field diagram of an OBSS share trigger frame according to at least one embodiment of the present disclosure.

FIG. 73 is a data field diagram of a reserved band TXOP holder BSS field according to at least one embodiment of the present disclosure.

FIG. 78 is a data field diagram of a TXOP holder configuration frame format according to at least one embodiment of the present disclosure.

FIG. 79 is a data field diagram of a STA TXOP Access Allocation field according to at least one embodiment of the present disclosure.

FIG. 80 is a data field diagram of an allocation control info subfield according to at least one embodiment of the present disclosure.

FIG. 81 is a data field diagram of a TXOP access configuration frame according to at least one embodiment of the present disclosure.

FIG. 82 is a data field diagram of an OBSS TXOP access configuration frame according to at least one embodiment of the present disclosure.

FIG. 83 is a data field diagram of a TXOP share request trigger frame according to at least one embodiment of the present disclosure.

FIG. 84 is a data field diagram of a TXOP share response trigger frame according to at least one embodiment of the present disclosure.

DETAILED DESCRIPTION

1. Introduction

Figure 1:
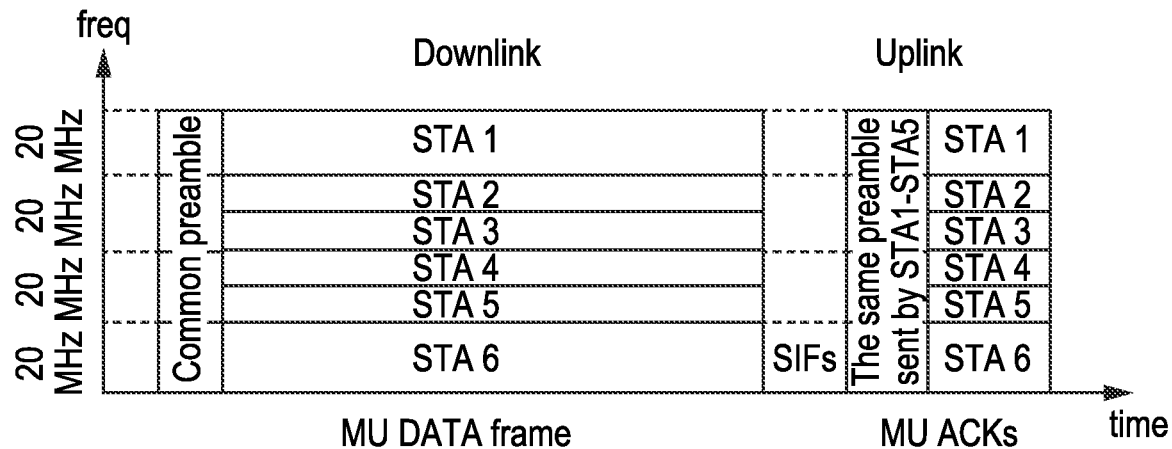
FIG. 1 is a slotted transmission diagram of DL OFDMA MIMO transmission in IEEE 802.11.

A new protocol is described for enabling multi-user (MU) UpLink (UL) transmissions in the shared TXOP which can operate even in an Overlapping Basic Service Set (OBSS) scenario. The shared TXOP means that during one TXOP, the channel access is shareable between different users. More specifically, when a non-AP STA obtains (grabs) the channel, it is able to initiate the MU UL transmission without waiting for a trigger frame from the AP. This non-AP STA performs as the TXOP holder STA, which can initiate shared TXOP access and schedule the channel access resources for other non-AP STAs (in the same BSS or in an OBSS) that are willing to join the following shared TXOP. By way of example and not limitation, the disclosed solutions focus on the OBSS case, since it is more challenging than the BSS case. The disclosed solution improves channel utilization efficiency and decreases OBSS interference and channel access contention delay, thus improving flexibility and Real-Time Application (RTA) performance.

2. Current IEEE 802.11 for WLANs

Current 802.11 techniques initiate the uplink (UL) multi-user (MU) transmission at the AP level. This requires that if non-AP STAs need to send UL DATA to the AP, and they sense that the channel is available, they cannot merely start the transmission. The non-AP STAs have to wait until they receive a trigger frame from the associated AP to start the UL DATA transmission.

The present disclosure describes a shared TXOP protocol that is initiated at the non-AP STA level for MU UL OFDMA transmissions. In the disclosed solution, the non-AP STA that gains channel access is enabled to initiate the shared TXOP and assigns different channel resources to other non-AP STAs for the MU UL DATA transmission.

2.1. WLAN Features Affecting Delay 2.1.1. Channel Access and Delay Tolerance

Both contention-based and contention free access are allowed in WLAN devices. The contention based access requires the device to sense the channel and contends for it every time the channel is busy in order to gain access to the channel. This introduces extra transmission delays but is necessary for collision avoidance. Contention free channel access allows the AP to gain access to the channel without contention. This is allowed in Hybrid Controlled Channel Access where channel access coordination is accomplished by using a shorter inter-frame spacing equal to PIFs (PCF inter-frame spacing) compared to the DIFS (distributed inter-frame spacing) as used by other STAs. Although contention free access appeared to be a viable solution for avoiding contention delay, it has numerous shortcomings and is thus not widely deployed, with the majority of Wi-Fi devices using contention based access.

For a STA to access the channel it is required to sense the channel and determine if it is busy. This channel is considered busy when any of the following are detected: (a) the STA detects a preamble of a frame, wherein the channel is considered busy for the length of the detected frame; (b) the STA detects energy at more than 20 dB of the minimum sensitivity; or (c) the STA detects that the channel is virtually busy by reading the NAV of a detected frame.

802.11ax introduced two NAVs to avoid collisions that might arise by faulty resetting of the NAV timer. One NAV is for the BSS STAs and the other NAV is for non-BSS STAs. The STA maintains the two NAVs separately.

802.11ax uses CSMA/CA for channel access as do all legacy 802.11 WLAN devices. For an AP to send a trigger frame for UL MIMO transmission it is still required to contend for channel access. In order to enable the AP to obtain (win) channel access over any STA in its BSS, 802.11ax introduced a second set of Enhanced Distributed Channel Access (EDCA) for 802.11ax devices only, to allow legacy non 802.11ax devices to access the channel freely with EDCA and increase the chance of the AP to gain channel access to schedule UL or DL OFDMA MIMO data transmissions.

2.1.2. Multi-User Transmission and Reception 802.11 WLAN devices allow the use of a MIMO antenna for transmission and reception as well as OFDMA channel access. IEEE 802.11ax supports the multi-user transmission in both uplink (UL) and downlink (DL).

This allows multi-stream transmission to one or more users through up to 8 streams for example in SU-MIMO DL in 802.11ac or through multi-user transmission to more than one user through MU-MIMO DL transmission as defined in 802.11ac. Accordingly, the AP can assign one or more streams to STAs in its BSS.

With the use of wide channels for data transmission, up to 160 MHz, the channel is expected to be interference frequency selective in which some frequencies experience different interference levels than others. This affects the expected achievable communications rate and can degrade performance. To solve this problem 802.11ax introduced OFDMA where adjacent subcarriers are grouped into resource units (RUs). These RUs can be assigned to different receivers to maximize transmission rate. This scheduling can result in maximizing the signal-to-interference-plus-noise ratio (SINR) for each receiver and hence allows higher Modulation and Coding Scheme (MCS) and therefore increases achieved throughput.

OFDMA allows multiple users to utilize the same time resources at the same time and split the frequency domain among them; which improves resource utilization and reduces communication latency since more users can be scheduled at the same time. In addition, STAs having small amounts of data to communicate (which is typical for RTAs) can occupy narrow RUs making scheduling very efficient and allowing better distribution of resources among applications requiring access for small amounts of data. This can help in reducing channel access times and the amount of overhead associated with frame headers and preambles.

OFDMA can be more efficient when it is combined with the use of MIMO transmissions. An RU can be used to send multiple spatial streams to a STA depending on the MIMO capacities of the STAs. Also, one RU can be assigned for sharing between more than one STA where each can have one or more spatial streams depending on the MIMO capacities of the STAs. Packing more STAs in the same resource also beneficially reduces latency for the STAs and APs.

FIG. 1 depicts an example of DL OFDMA MIMO transmission. The AP is sending a PHY preamble to all STAs to specify the frequency/RUs mapping and RUs assignment for STAs. Following the preamble, the AP sends DL DATA to the specific station using the RU assignment for this STA. The Multi-user ACK transmission should be synchronized to the reception of DL DATA frame where STAs start transmission of a SIFS after the reception of the DL trigger frame.

Figure 2:
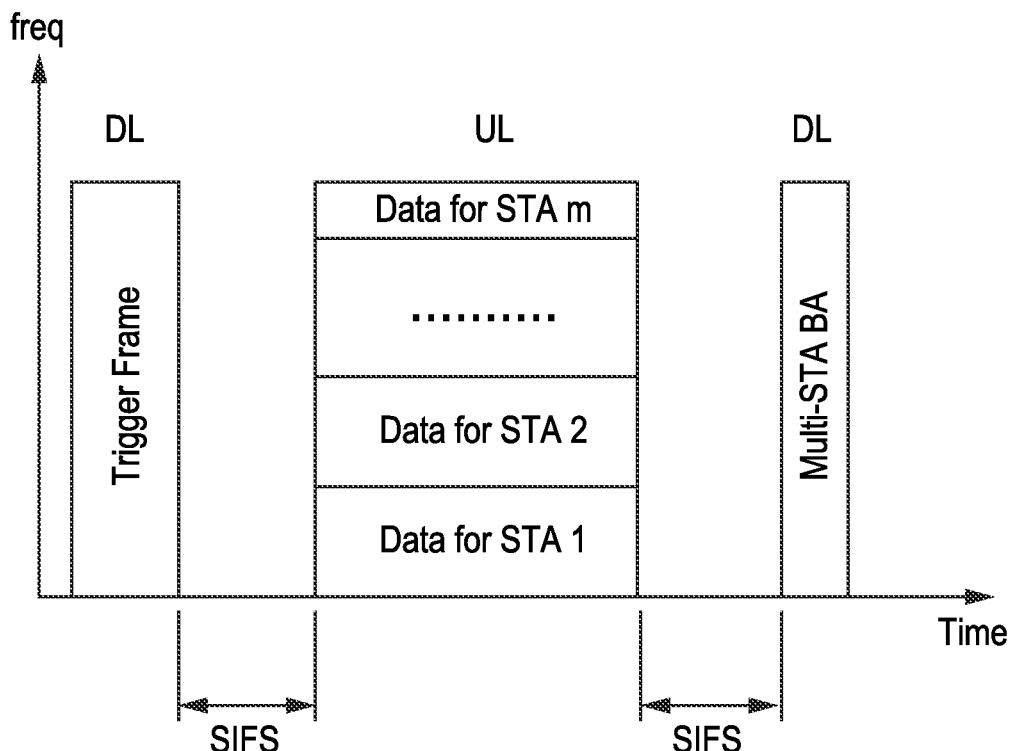
FIG. 2 is a slotted transmission diagram of UL OFDMA MIMO transmission in IEEE 802.11.

FIG. 2 shows an example of UL OFDMA MIMO transmission. The AP is sending a trigger frame to all STAs containing the frequency/RU mapping and RUs assignment for STAs. The UL MIMO transmission should be synchronized to the reception of that frame where STAs start transmission of a SIFS after the reception of the DL trigger frame.

2.1.4. Retransmission

Figure 3:
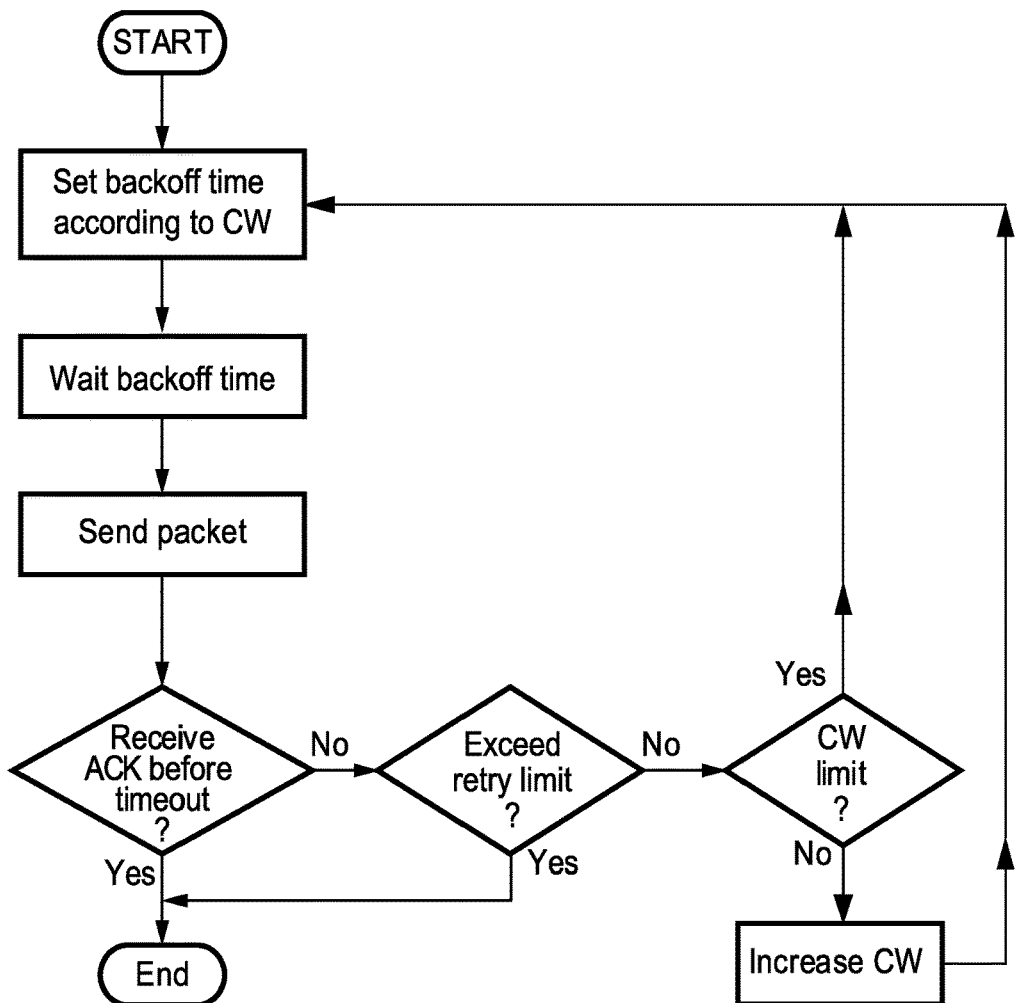
FIG. 3 is a flow diagram of a conventional UL OFDMA MIMO transmission.

FIG. 3 depicts a flow diagram for operation in a WLAN system under IEEE 802.11 using CSMA/CA to allow STAs to obtain access to the channel for packet transmission and retransmission. In a CSMA/CA system, before each transmission and retransmission, the STA has to sense the channel and set a backoff time to contend for channel access. The backoff time is decided by a uniform random variable between 0 and the size of contention window. After the STA waits for the backoff time and senses that the channel is idle, the STA sends the packet.

A retransmission is required if the STA does not receive an ACK before timeout; otherwise the transmission succeeds. When a retransmission is required, the STA checks the number of retransmissions of the packet. If the number of retransmissions exceeds the retry limit, then the packet is dropped and no retransmission is scheduled. Otherwise the retransmission is scheduled. If the retransmission is scheduled, then another backoff time is needed to contend for channel access for retransmission. If the size of the contention window does not reach the upper limit, then the STA increases it. The STA sets another backoff time depending on the new size of the contention window. The STA waits the back off time for retransmission and so on so forth.

Figure 4:
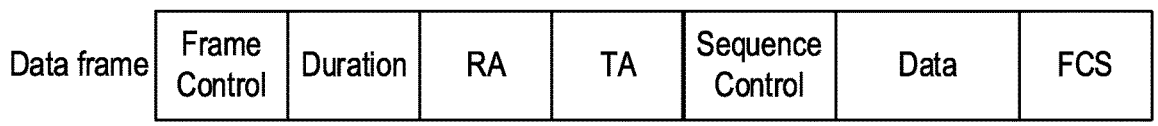
FIG. 4 is a data field diagram of a data frame format in a regular WLAN system.

FIG. 4 illustrates the data frame format in a regular WLAN system. A Frame Control field indicates the type of the frame. A Duration field contains NAV information used for CSMA/CA channel access. An RA field contains an address for a recipient of the frame. A TA field contains the address of the STA that transmitted the frame. A Sequence control field contains the fragment number and the sequence number of the packet.

Figure 5:
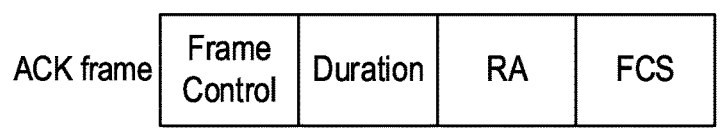
FIG. 5 is a data field diagram of an ACK frame format in a regular WLAN system.

FIG. 5 illustrates an ACK frame format in a regular WLAN system. A Frame Control field indicates the type of frame. A Duration field contains NAV information used for CSMA/CA channel access. An RA field contains an address of the recipient of the frame.

Figure 6:
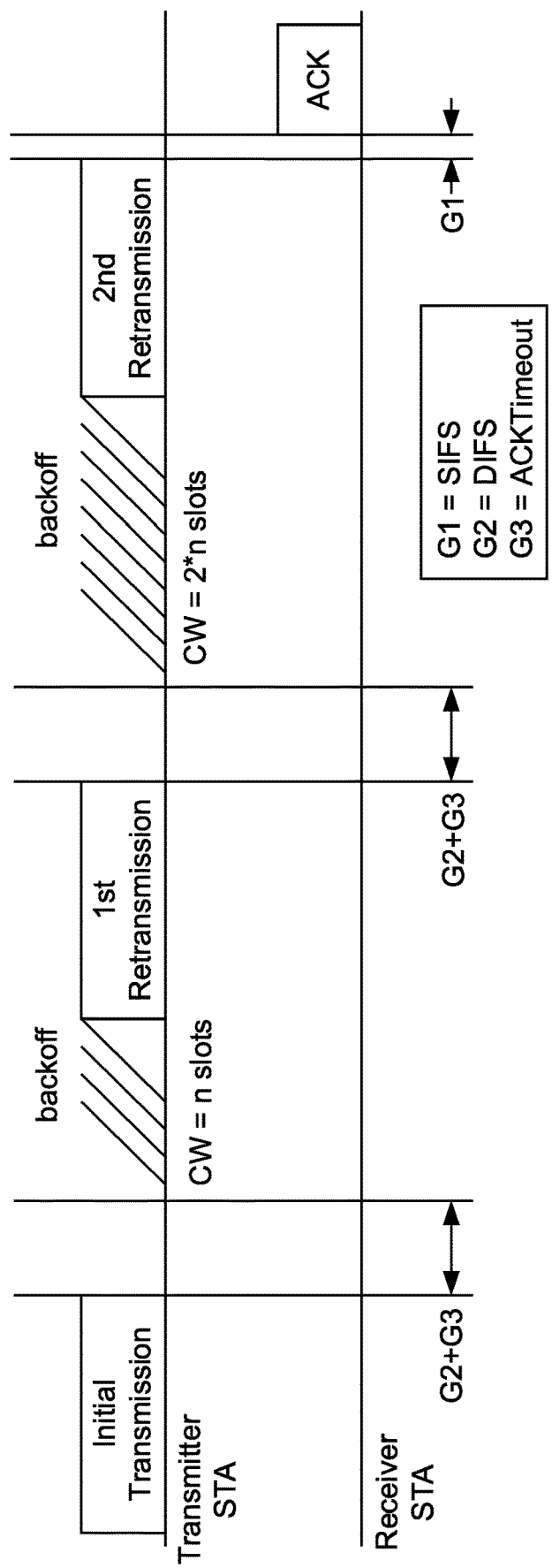
FIG. 6 is a communication sequence diagram of conventional retransmission in CSMA/CA where the backoff time is increased due to retransmission.

FIG. 6 illustrates one example of the retransmission in CSMA/CA where the backoff time is increased due to retransmission. The data packet frame and ACK frames use the formats as shown in FIG. 4 and FIG. 5, respectively. After the transmitter transmits the initial transmission of a packet, it does not receive the ACK before timeout. Then, it sets another backoff time, whereby the size of the contention window is n slots. After waiting the backoff time, the transmitter STA retransmits the packet for the first time. However, the retransmission also fails. The transmitter STA needs to retransmit the packet and sets the backoff time again to contend the channel access. This time, the size of the contention window is doubled, which is 2*n slots, due to the retransmission. The expected backoff time is also doubled by the contention window size. The second retransmission succeeds since it receives an ACK before timeout.

Figure 7:
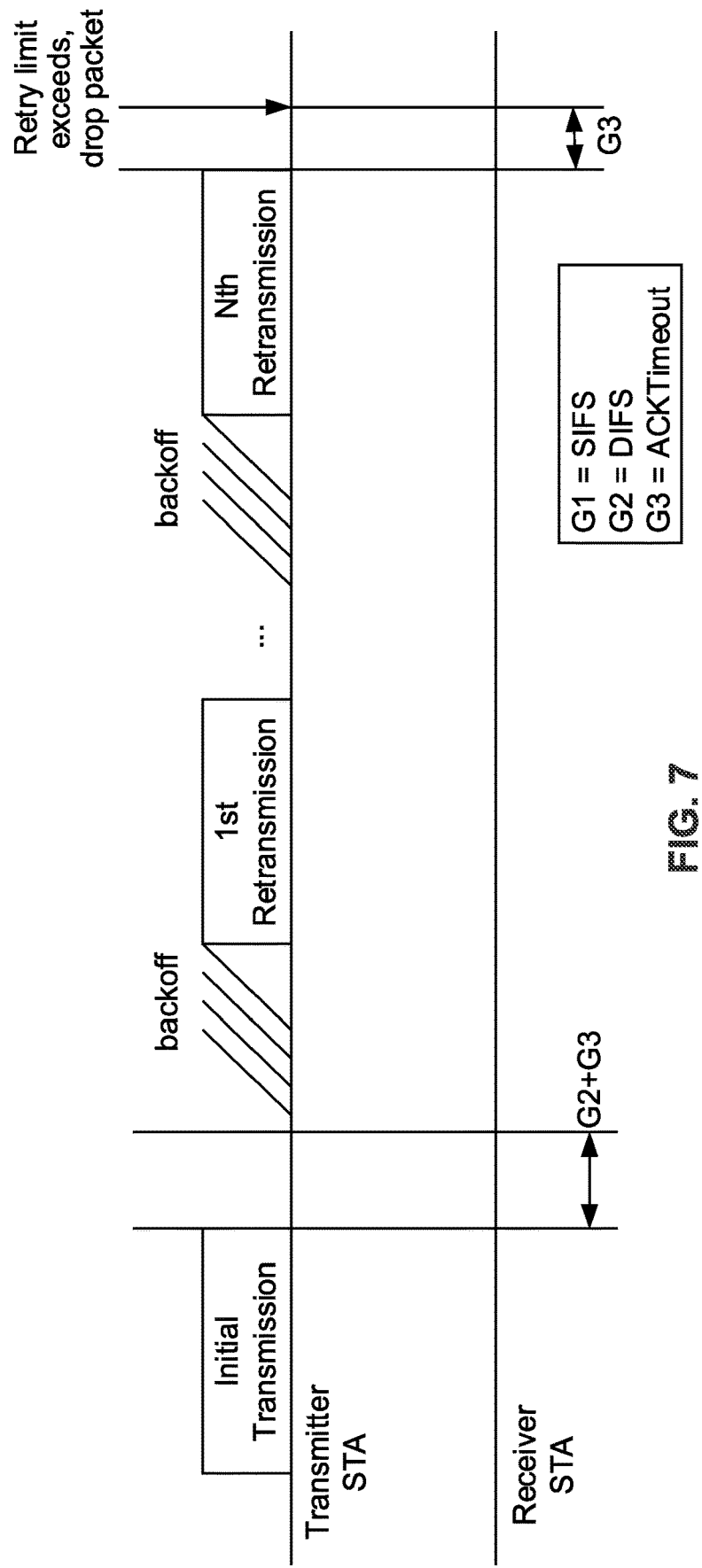
FIG. 7 is a communication sequence diagram of dropping a packet after the number of retransmissions exceeds the retry limit.

FIG. 7 illustrates one example that the packet is dropped after the number of retransmission exceeds the retry limit. The data packet frame and ACK frame use the formats as shown in FIG. 4 and FIG. 5, respectively. As shown in the figure, after the initial transmission of a packet fails, the transmitter STA retransmits that packet multiple times. However, none of the retransmissions succeed. After retransmitting N times, the number of retransmission exceeds the retry limit. The transmitter STA stops retransmitting that packet and that packet is dropped.

Figure 8:
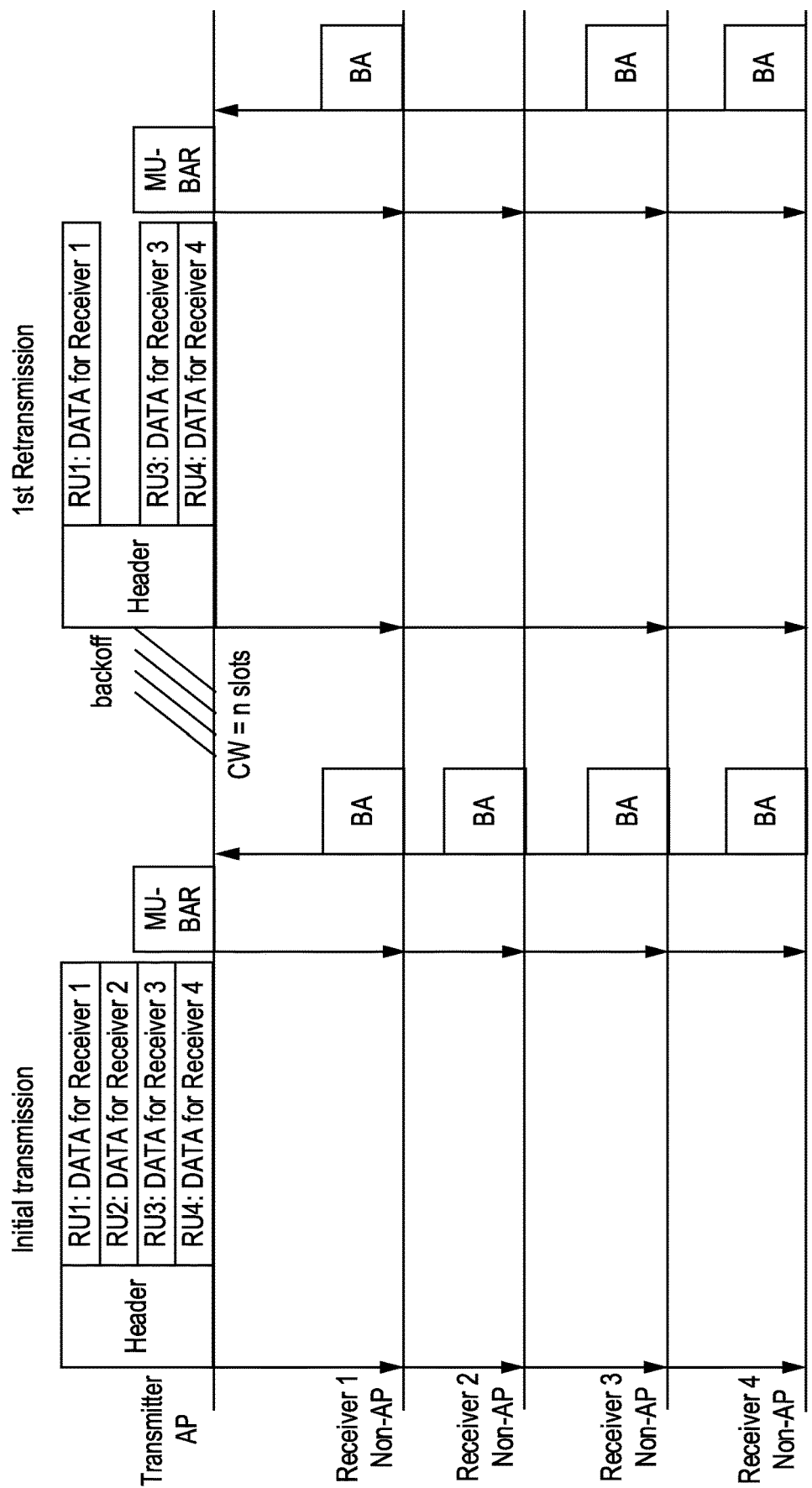
FIG. 8 is a communication sequence diagram of a conventional downlink multi-user transmission using OFDMA.

FIG. 8 illustrates another example in which the packet is dropped after the number of retransmission exceeds the retry limit. The data packet frame and the ACK frame uses the formats shown in FIG. 4 and FIG. 5, respectively. As shown in the figure, after the initial transmission of a packet fails, the transmitter STA retransmits that packet multiple times. However, none of the retransmissions succeed. After retransmitting N times, the number of retransmission exceeds the retry limit. The transmitter STA stops retransmitting that packet and that packet is dropped.

Figure 9:
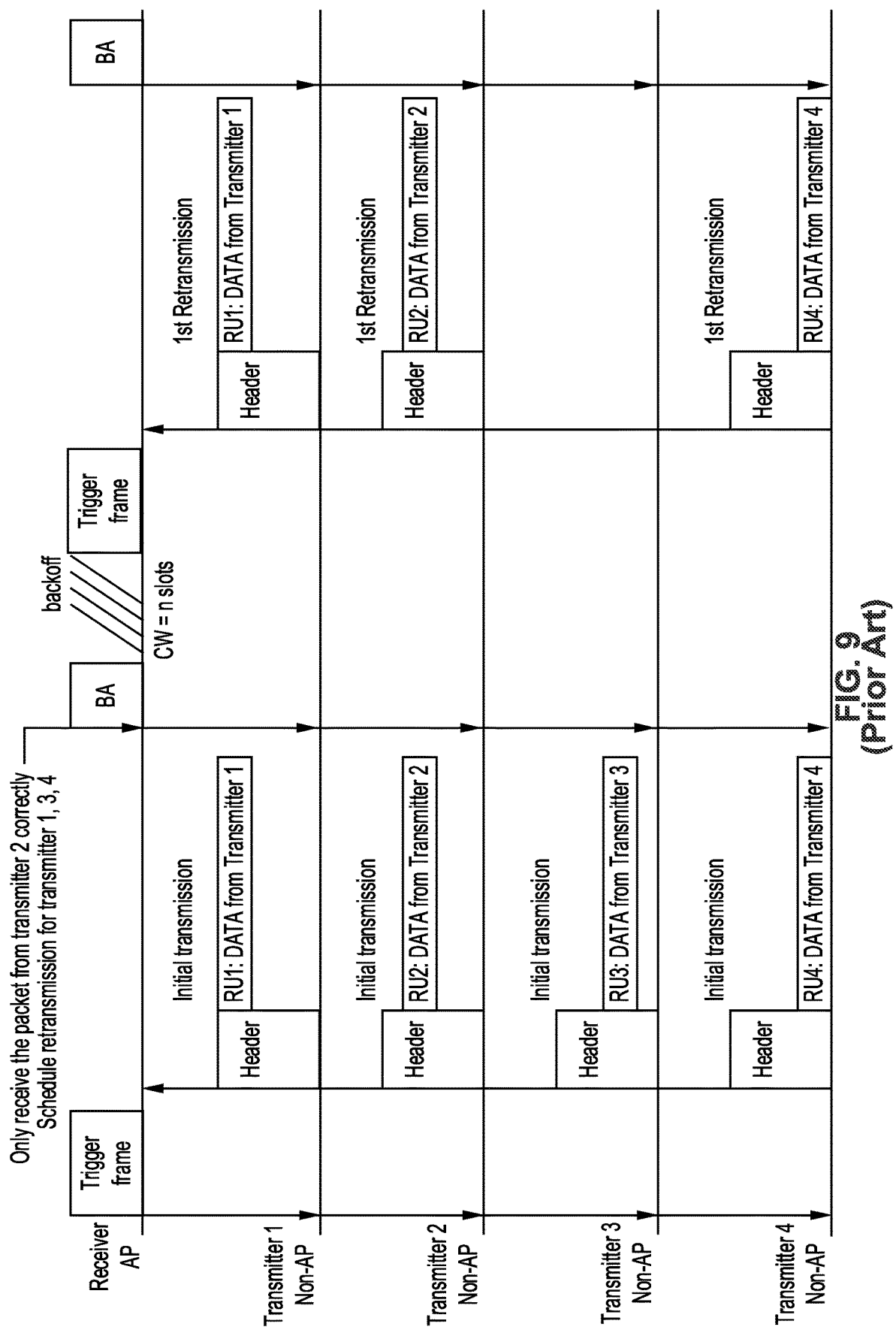
FIG. 9 is a communication sequence diagram of a conventional uplink multi-user transmission using OFDMA.

FIG. 9 illustrates one example that the packet is dropped after the number of retransmission exceeds the retry limit. The data packet frame and ACK frame use the formats as shown in FIG. 4 and FIG. 5, respectively. As shown in the figure, after the initial transmission of a packet fails, the transmitter STA retransmits that packet multiple times. However, none of the retransmissions succeed. After retransmitting N times, the number of retransmission exceeds the retry limit. The transmitter STA stops retransmitting that packet and that packet is dropped.

2.1.5. UL OFDMA Random Access 802.11ax introduced the UL OFDMA random access for UL transmission when the AP does not know which STA has data to transmit or when an unassociated STA wants to transmit data. The trigger frame can allocate some RUs for random UL channel access. When the AP assigns specific RUs for uplink random access the STAs use the OFDMA back-off procedure to decide whether they will access the random access channel or not. This is performed by selecting a random backoff value and comparing it to the number of RUs assigned for random access. If the current random backoff value is less than the number of RUs, the STA randomly accesses one of the RUs assigned for random access. Random access is expected to provide for efficient short packet transmission.

3. Problem Statement

For MU UL transmissions, such as 802.11n/ac, which implement Request-To-Send/Clear-To-Send (RTS/CTS) or RTS/CTS with extensions in the channel access scheme to aid in preventing packet collisions. However, this scheme only allowed one user to occupy the channel at one time. Besides, a long delay is introduced by the overhead of the RTS/CTS frame exchange mechanism.

In comparison, the 802.11ax technique implements an OFDMA scheme, which allows different users to access the channel simultaneously, which improves channel utilization efficiency and reduces average delay. However, current 802.11ax techniques rely on the AP to initiate UL transmissions for a shared TXOP. Meaning that if a non-AP STA senses that the channel is available and has DATA to transmit to the AP, it has to wait until receiving the trigger frame from the associated AP to start the UL DATA transmission. Also, it has to rely on the AP to schedule and distribute available channel resources between this non-AP STA which obtains the channel and the other non-AP STAs. In this case, it introduces several problems including low channel utilization efficiency and, thus, increased delay.

The delay issue becomes even worse when considering the OBSS case, in which the interference from the adjacent BSS causes more contention when accessing the channel, and thus leads to longer delay.

4. Contribution of the Invention

The present disclosure provides a new solution to enable multi-user (MU) UpLoad (UL) transmissions in the shared TXOP for the OBSS scenario. The shared TXOP means that during one TXOP, the channel access is shareable between different users. More specifically, when the non-AP STA obtains (grabs) the channel, it is able to initiate the MU UL transmission without waiting for the trigger frame from the AP. This non-AP STA performs as the TXOP holder STA, which is configured in this protocol for initiating a shared TXOP access and scheduling channel resources for other non-AP STAs (in the same BSS or in the OBSS) that are willing to join the shared TXOP. The studied scenario focuses primarily on the OBSS case, since it is more robust than the subset BSS case. The disclosed solution improves channel utilization efficiency and decreases OBSS interference and delay on the non-AP STA side, thus improving flexibility and real time application (RTA) performance on the non-AP STA side.

5. Non-AP STA Hardware Setup

Figure 10:
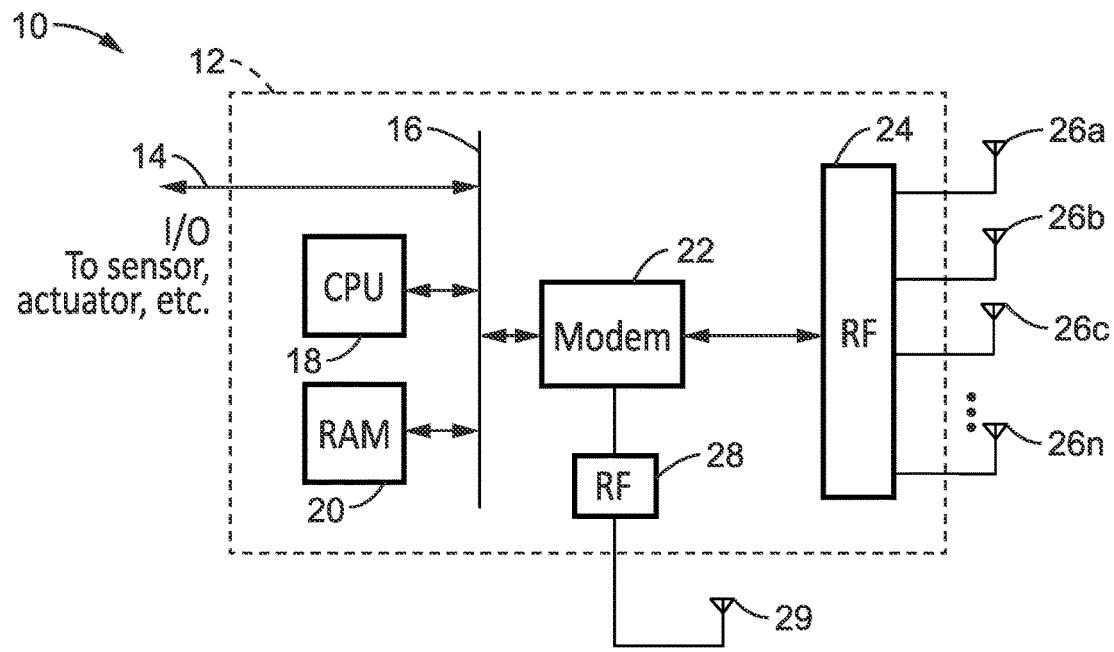
FIG. 10 is a block diagram of station (STA) hardware according to at least one embodiment of the present disclosure.

FIG. 10 illustrates an example embodiment 10 of a wireless station, including a non-AP STA. The circuitry 12 is shown having external I/O 14 to access applications. The I/O 14 connects to a bus 16 coupled to at least one CPU 18 and memory 20 (e.g., RAM), to execute (run) a program that implements communication protocols.

The host machine 10 accommodates at least one Modem 22 which transmits/receives data frames with neighboring STAs on at least one band, and may be directional or omni-directional. Modem 22 is connected to at least one RF module 24, 28 to generate and receive physical signals. In at least one embodiment, the RF modules include a frequency converter, array antenna controller, and so forth. In this example, the RF modules are shown connected to multiple antennas 26a, 26b, 26c through 26n, and 29 which are controlled to perform beamforming, or omni-directions communications for transmission and reception. In this way, the STA can transmit signals using multiple sets of beam pattern. The modem and antenna may also, or additionally, be configured for omni-directional operation.

It should be appreciated that the station hardware of the present disclosure can be configured for communications on any desired bands, for example millimeter wave bands and sub-6 Ghz bands. It should also be noted that multiple STAs may be grouped (clustered), such as configured as Multi-Link Devices (MLDs) in any desired configuration without departing from the teachings of the present disclosure.

Instructions from memory 20 are executed on processor 18 to execute a program which implements the communication protocol, which is executed to allow the STA to perform the functions of an access point (AP) station or a non-AP (regular) station (STA). It should also be appreciated that the programming is configured to operate in different modes (source, transmitter, intermediate, destination, receiver, first AP, other AP, non-AP stations associated with the first AP, non-AP TXOP holder station, non-AP TXOP participant stations, non-AP TXOP non-participant stations, stations associated with another AP, coordinator, coordinatee and so forth), depending on what role it is playing in the current communications context.

Figure 85:
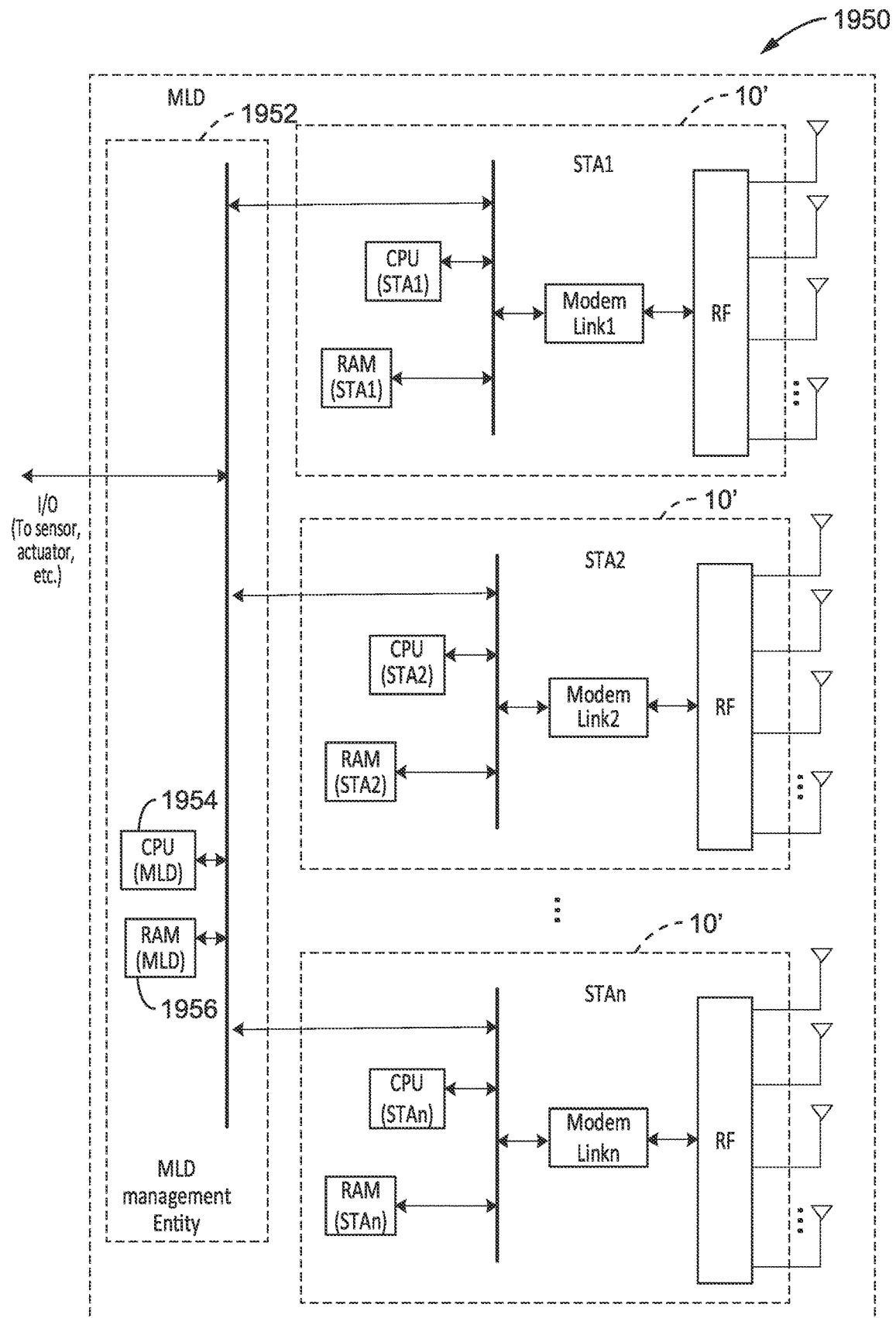
FIG. 85 is a block diagram of station (STA) hardware in which the stations are affiliated in a multi-link device (MLD) configuration according to at least one embodiment of the present disclosure.

FIG. 85 illustrates a variation of FIG. 10, as embodiment 1950 in which wireless communication stations are affiliated in a multi-link device (MLD) hardware configuration. Each STA within the MLD operates on a link of a different frequency. Each station 10' can be as that described in FIG. 10, with each having CPU, RAM, Modem, RF circuits and one or more antennas. It is seen in the figure that each of the n stations of the MLD shown provide a different link (e.g., Link1, Link2 through Linkn are shown).

The MLD is also seen with circuitry 1952 of an MLD management entity having at least one processor (CPU) 1954, memory 1956 which provides external I/O to access applications of the MLD and to implement communication protocols at the MLD level. The MLD is configured to distribute tasks to, and collect information from, each affiliated STA and share information between affiliated STAs.

It should also be appreciated that each STA of the MLD need not have its own processor and memory. In at least one embodiment, one or more of the stations within the MLD may share processors and memory between themselves, or share the processor and memory of the MLD circuit. Thus the present disclosure contemplates many possible arrangements for communication over multiple links within an MLD.

6. Topology and Scenario Description 6.1. Topology Under Study

Figure 11:
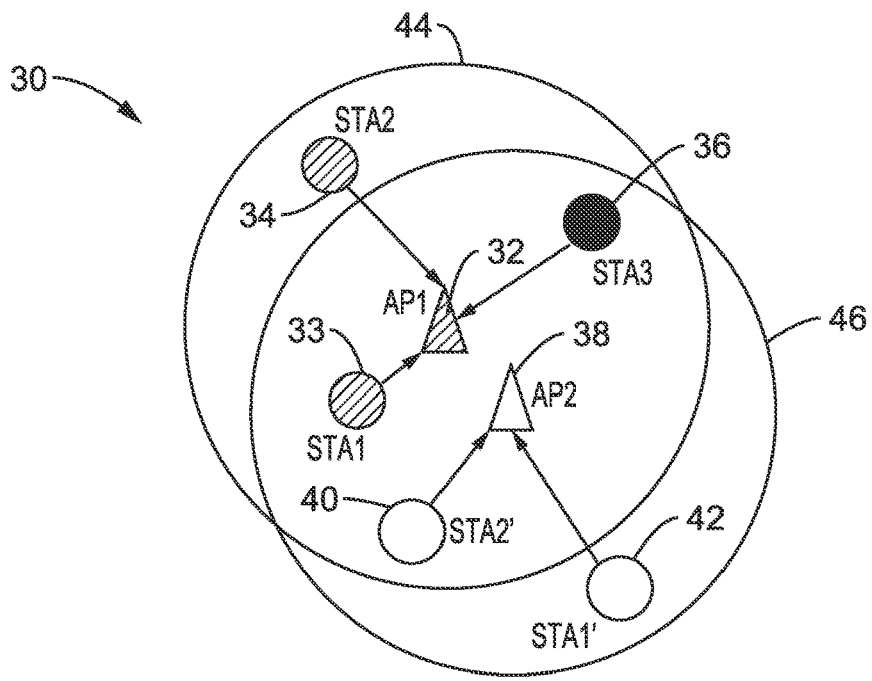
FIG. 11 is a network topology diagram example according to at least one embodiment of the present disclosure.

FIG. 11 illustrates an example embodiment 30 of a topology showing a WLAN OBSS scenario, which consists of two overlapped BSSs, where BSS1 44 consists of an AP (AP1) 32 and three STAs 33, 34 and 36. Among them, STA3 36 is shown for the sake of example as the non-AP TXOP holder STA which obtains the channel and shares its TXOP with other non-AP STAs, and the other two STAs 33 and 34 are non-AP shared TXOP participant STAs which do not obtain the channel as a TXOP holder but are willing to join the TXOP as shared by the TXOP holder STA. BSS2 46 consists an AP (AP2) 38 and two STAs comprising STA1' 42 and STA2' 40 in BSS2 are non-AP TXOP participant STAs in this example.

It should be noted that the role of TXOP holder station is not a fixed role, as any of the non-AP station or AP can perform the role of TXOP holder if they obtain the TXOP. This topology example is used for illustration of the disclosed solutions; however, the present disclosure may be applied to any WLAN topology without limitation, with single or multiple BSS and one or more stations per AP.

6.2. Scenario Description

In the studied scenario each BSS contains one AP and multiple non-AP STAs. Each of the non-AP STAs has packets generated periodically or non-periodically which need to be transmitted to the associated AP. This disclosure primarily focuses on the use of UpLink (UL) Orthogonal Frequency Division Multiple Access (OFDMA) transmission, for which the latency is always a critical issue due to the more complex scheduling between each non-AP STA and the AP, although the techniques herein are applicable to other use cases.

In 802.11ax multiple STAs can send UL DATA sequences simultaneously within a shared TXOP, which improves channel utilization efficiency.

However, in 802.11ax, the AP is the only device that can initiate the UL data transmission. The AP usually sends a trigger frame (e.g., BSRP) to the non-AP STAs to inquire on their buffer status and traffic priorities, and receives a response frame (e.g., BSR) from those non-AP STAs. The AP sends another trigger frame (e.g., Basic Trigger) with the resource allocation information to those non-AP STAs for their use in sending UL data sequences.

The AP initiated TXOP cannot capture the dynamic needs from non-AP STAs side, especially for those non-AP STAs that have RTA (Real Time Application) packets to transmit. The RTA packets usually have a small size; however, they require fast, low latency, transmission. In the exemplified OBSS scenario, the delay performance is more sever, since interference in an OBSS scenario introduces more aggressive channel contention resulting in longer delays.

The present disclosure describes a new solution for the OBSS scenario from the perspective of the non-AP STAs. Specifically for those non-AP STAs which sense that the channel is available and have packets to send to the AP immediately. The shared TXOP scheme is enabled by the STA that obtains channel access and is willing to share channel access in its TXOP with other STAs. The coordination among non-AP STAs and the AP makes it more efficient for each device to access the channel by joining the shared TXOP. The non-AP STAs participant in the shared TXOP may from the same BSS or from the OBSS. The shared TXOP scheme among multiple cooperative devices for an OBSS scenario efficiently decreases OBSS interference, while reducing the latency and providing more efficient channel utilizations between contesting STAs from the same BSS or from the OBSS.

More specifically, the present disclosure operates as follows. Once any non-AP STA obtains channel access, it can initiate the next shared TXOP immediately. This non-AP STA is referred to herein as the non-AP TXOP holder STA. The non-AP STAs that are willing to participate in the following shared TXOP are referred to herein as non-AP shared TXOP participant STAs.

The non-AP TXOP holder STA shares the TXOP in the frequency domain with other non-AP shared TXOP participant STAs that are either in the same BSS or in the other BSS. The non-AP TXOP holder STA does not need to wait for the AP to initiate a shared TXOP access. The non-AP TXOP holder STA is capable of scheduling and distributing the available frequency resources to other non-AP shared TXOP participant STAs. The non-AP TXOP holder STA can also let the associated AP do the scheduling once the access resource in the shared TXOP is reserved. The potential non-AP TXOP holder STAs can also use a predetermined scheduling to allocate channel access resources. The present disclosure provides a protocol which reduces latency for accessing the channel and also increases channel utilization efficiency.

Figure 12:
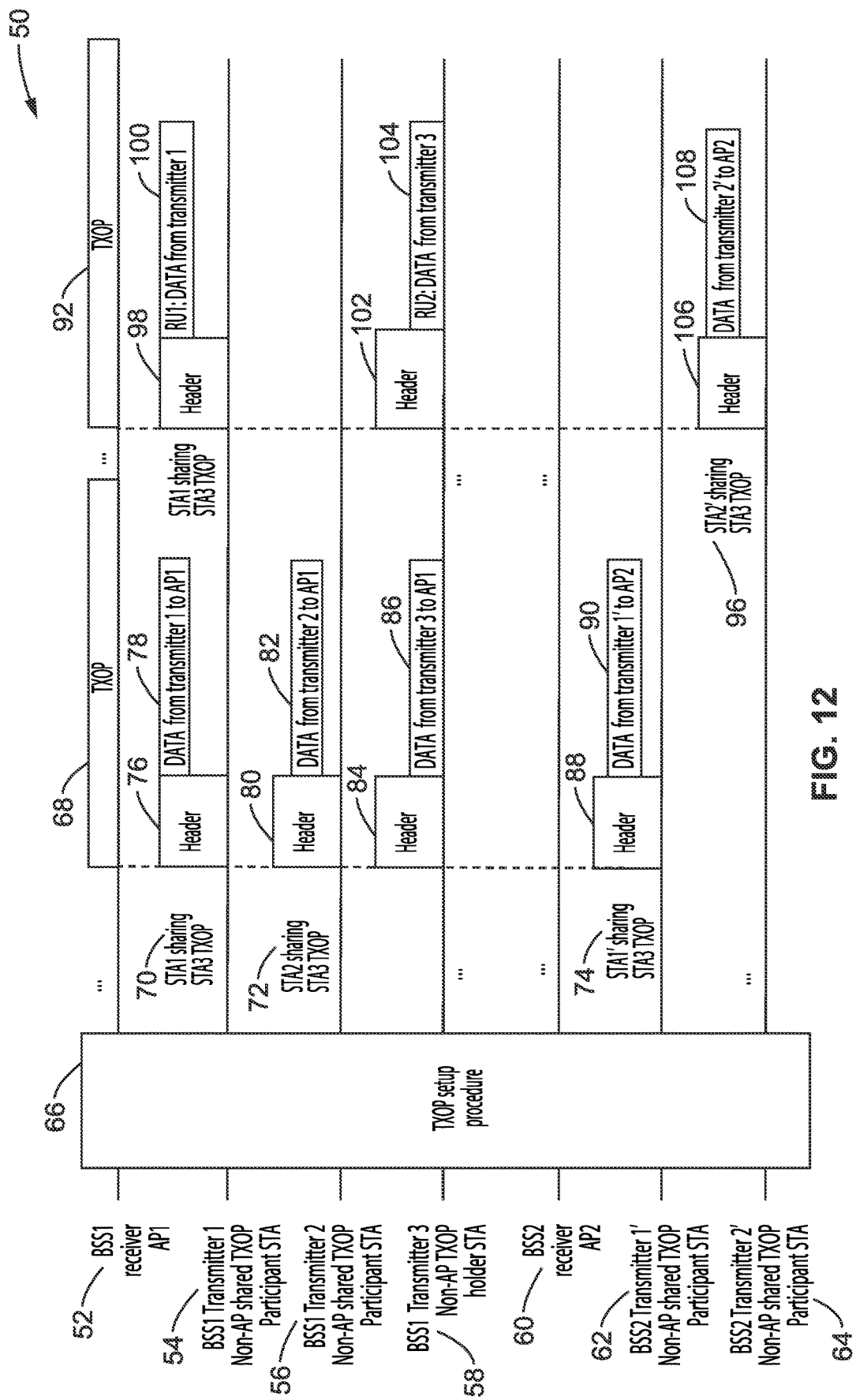
FIG. 12 is a communication sequence diagram of a shared TXOP protocol in OBSS scenario which is initiated by the non-AP TXOP holder STA according to at least one embodiment of the present disclosure.

FIG. 12 illustrates an example embodiment 50 of a high-level example of the disclosed shared TXOP protocol in an OBSS scenario which is initiated by the non-AP TXOP holder STA. The figure depicts interactions between a receiver AP (AP1) 52, two non-AP transmitters in BSS1 as shared TXOP participants 54, 56, and a non-AP transmitter TXOP holder 58. An OBSS is seen with a receiver AP (AP2) 60, non-AP shared TXOP participant STAs 62 and 64. A TXOP setup procedure 66 is performed.

In the TXOP setup procedure, non-AP STAs exchange the TXOP shareability information, e.g., share offer and share request, through the coordination of the associated AP in a single BSS. In addition, APs from different BSSs also exchange the share offer/request information of their associated STAs.

The figure depicts an example with two TXOPs being performed. When a non-AP TXOP holder STA 58 obtains the channel, it initializes the shared TXOP, and may need to confirm which non-AP STAs (from its own BSS and the OBSS) are willing to participate in the shared TXOP. The TXOP holder STA allocates channel access (RUs) to the other STAs (from its own BSS and from the overlapped BSS) that are willing to join the shared TXOP.

The RU assigned for a specific non-AP shared TXOP participant STA may be different in different TXOPs, e.g., the first TXOP 68 and the second TXOP 92. When the shared TXOP access starts the TXOP holder STA transmits UL DATA on the reserved RU. The non-AP shared TXOP participant STAs transmit UL DATA on the assigned RUs. The data is shown in a first TXOP 68 with STA1, STA2, and STA1' sharing 70, 72 and 74 the TXOP of STA3 58, with headers and data 76, 78, 80, 82, 84 and 86 of transmissions to AP1 52, and with header and data 88 and 90 of transmissions to AP2 60. The data is shown in a second TXOP 92 with STA1 and STA2' sharing 94, 96 the TXOP of STA 3 58, with headers and data 98, 100, 102 and 104 of transmission to AP1 52, and with header and data 106 and 108 of transmissions to AP2 60.

6.3. Scenario Classification

In the present disclosure different embodiments are described, which include a dynamic scenario and a semi-static scenario. For dynamic scenarios solutions from two aspects, with and without AP coordination, are described. For semi-static scenario, APs are needed as coordinators.

Solutions are analyzed in the OBSS topology in Section 7, after which frame format design is introduced in Section 8, after which a summary is provided of the present disclosure.

7. Protocol Design for OBSS Scenarios

7.1. Overview of the Protocol Design

In this section is described an OBSS protocol having a dynamic scenario in which the shared TXOP access schedule is made on-the-fly and a semi-static scenario where the shared TXOP access schedule is predetermined. In the OBSS scenario, the AP always needs to be involved to coordinate between BSSs.

Figure 13:
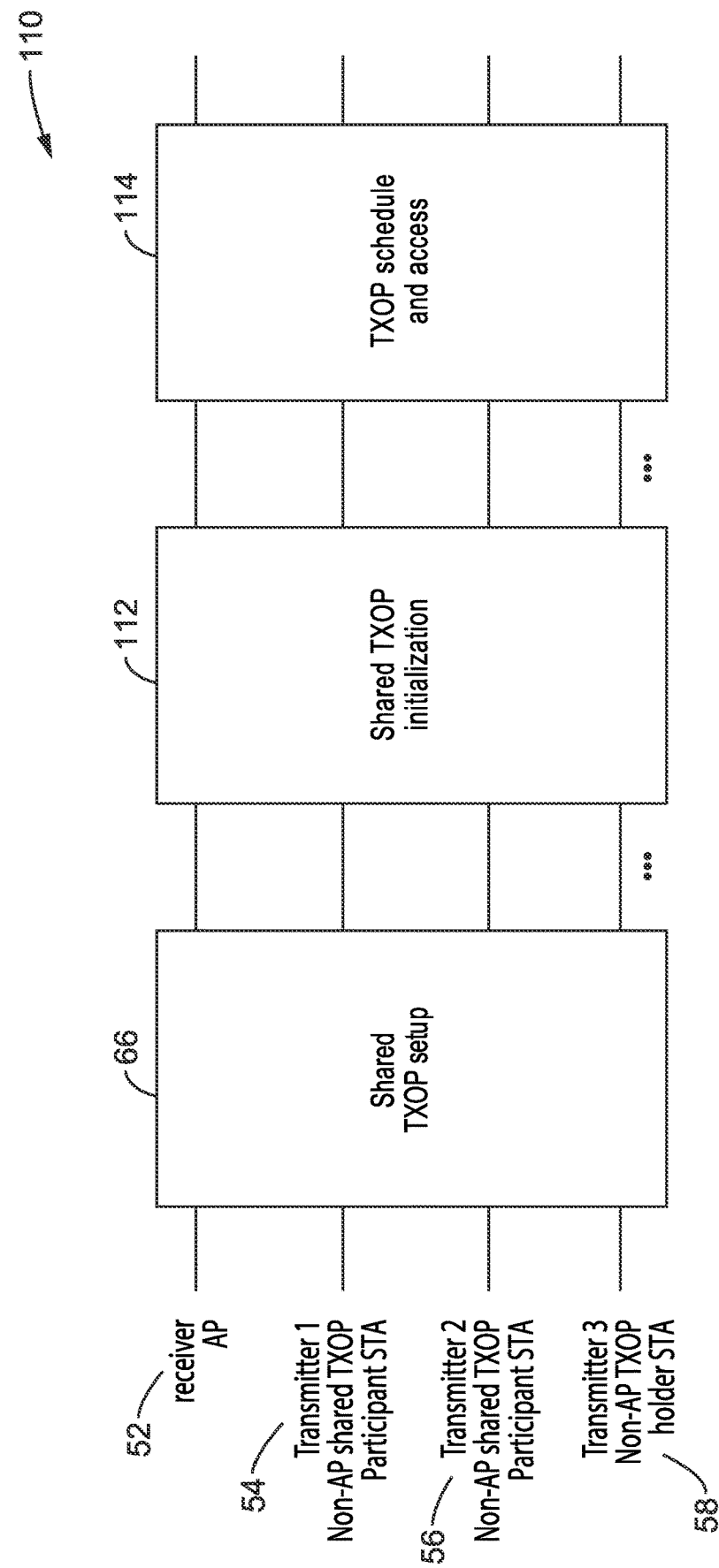
FIG. 13 is a communication sequence diagram of a dynamic scenario of a protocol having three stages, including a shared TXOP setup stage, according to at least one embodiment of the present disclosure.

FIG. 13 illustrates an example embodiment 110 of a dynamic scenario involving an AP 52, multiple non-AP shared TXOP participant STAs 54 and 56, and a non-AP TXOP holder STA 58, in which the disclosed protocol has three stages, including a shared TXOP setup stage 66 as seen in FIG. 12, a shared TXOP initialization stage 112, and a TXOP schedule and access stage 114.

In the shared TXOP setup stage 66, the non-AP STAs, including the TXOP holder STA and the shared TXOP participant STAs exchange the TXOP shareability information, which indicates whether STA's are willing to share offer/request a shared TXOP by embedding this information in the authentication or association or any other frames that are exchanged, through the coordination of the coordinated AP.

In the shared TXOP initiation stage 112, the non-AP TXOP holder STA gains channel access and announces it is willing to share its TXOP with other non-AP STAs, such as for example by broadcasting a MU-RTS-share frame to the potential TXOP participant STAs to indicate the TXOP is shareable. The other non-AP STAs who is willing to join the following shared TXOP respond to the TXOP holder STA to confirm their participation (by sending back a CTS-share frame).

In the TXOP schedule and access stage 114, the non-AP TXOP holder STA and the non-AP shared TXOP participant STAs access the channel simultaneously. The non-AP TXOP holder STA transmits UL data using the reserved RU. The non-AP shared TXOP participant STAs transmits UL data using the assigned RUs or randomly accessing the remaining RUs, depending on which channel access protocol is utilized.

7.2. Shared TXOP Setup Stage

Figure 14:
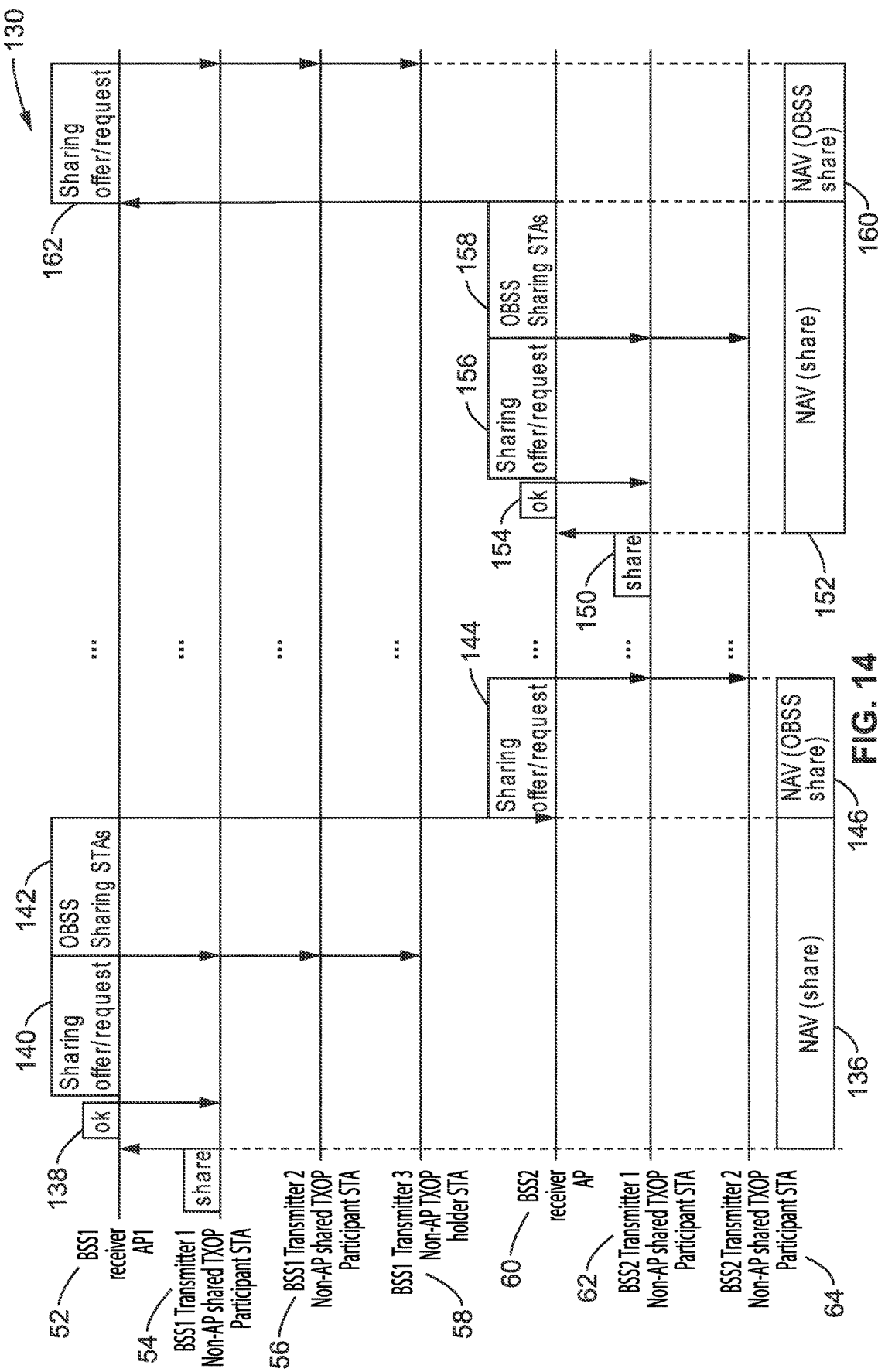
FIG. 14 is a communication sequence diagram of a shared information exchange in the shared TXOP setup stage for OBSS scenario, according to at least one embodiment of the present disclosure.

FIG. 14 illustrates an example embodiment 130 of the procedure of shared information exchange in the shared TXOP setup stage for OBSS scenario. As in a prior example interaction are shown a first BSS (BSS1) having a receiver AP1 52, two non-AP transmitters as shared TXOP participants 54, 56, and a non-AP transmitter TXOP holder 58. In a second BSS (BSS2) is seen a receiver AP 60, and two non-AP transmitters as shared TXOP participants 62 and 64.

The non-AP STAs indicate their share offer/request information 132 in e.g., the authentication/association request frame, which are sent to the associated AP. A new element designed as a STA TXOP Shareability Element is embedded in these management frames or any other exchanged frames with the AP, e.g., authentication/association response frame or beacon frame to exchange the share offer/request information of the non-AP STAs.

Communication of the share frame starts a NAV (share) period 136. Once the associated AP receives the share frame that contains this STA TXOP shareability element, it checks the shareability information and responds 138 to confirm successful reception, for example through authentication or association response. Then the AP broadcasts 140 the share offer/requests information of all the associated non-AP STAs with the sharing offer/request frame. In this case, once a non-AP STA receives a sharing offer/request frame, it is aware of the shareability of other non-AP STAs and updates its database.

Then, the AP unicasts 142 an OBSS sharing STAs frame to another AP of the adjacent BSS, and indicates the shareability of all the associated non-AP STAs. In response to the OBSS sharing frame being transmitted a NAV (OBSS) interval commences 146.

Once the other AP 60 in OBSS receives the OBSS sharing STAs frame, it will check the non-AP STA's share offer/request information as indicated by the TA field, and broadcasts 144 this information within its BSS with a sharing offer/request frame with the BSSID set as the TA as indicated in the received OBSS sharing STAs frame.

Next time, a non-AP TXOP participant 62 in BSS2 sends a share frame 150 to AP 60 to indicate its share offer/request information and a NAV (share) 152 commences. AP 60 confirms 154 the share frame and broadcasts 156 the share offer/requests information of all the associated non-AP STAs in its BSS with the sharing offer/request frame, after which AP 60 unicasts 158 an OBSS sharing STAs frame to AP 52 of BSS1, which commences NAV (OBSS share) 160. In response to receiving this OBSS sharing STAs frame, BSS1 AP 52 then broadcasts a sharing offer/request 162.

Figure 15:
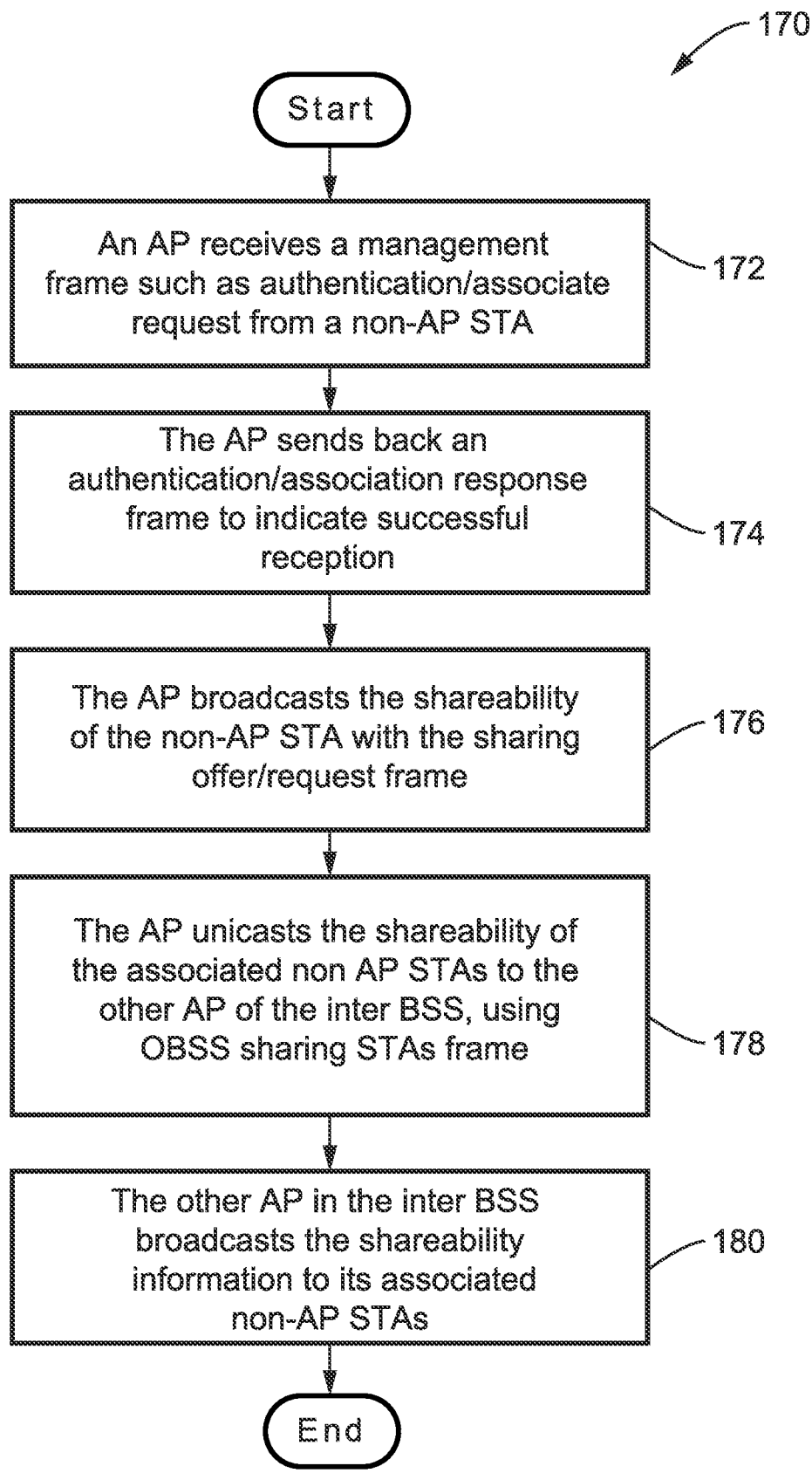
FIG. 15 is a flow diagram of a shared TXOP setup stage for OBSS scenario that is handled by the AP, according to at least one embodiment of the present disclosure.

FIG. 15 illustrates an example embodiment 170 of the shared TXOP setup stage for an OBSS scenario that is handled by the AP. After the shared TXOP Setup stage starts, the AP receives a management frame 172, such as an authentication frame or the association request frame, from a non-AP STA indicating if it is willing to offer/request a shared TXOP with other non-AP STAs. The AP retains this shareability information for this non-AP STA and sends back 174 an authentication or association response frame to confirm successful reception.

Then the AP broadcasts 176 a sharing offer/request frame to all the non-AP STAs in the internal BSS to update the shareability of the new associated non-AP STA. If the BSSID field of the sharing offer/request frame indicates the same MAC address as that which is in the TA field, it means the sharing offer/request frame is delivering shareability information from a non-AP STAs of the internal BSS. Otherwise, it means the sharing offer/request frame is delivering shareability information from non-AP STAs of an inter BSS whose ID is indicated by the BSSID. The AP also updates the shareability information to the OBSS by unicasting 178 an OBSS sharing STAs frame to the AP of the inter BSS. After receiving the OBSS sharing STAs frame, the AP from an inter BSS broadcasts 180 the updated shareability information to non-AP STAs.

Figure 16:
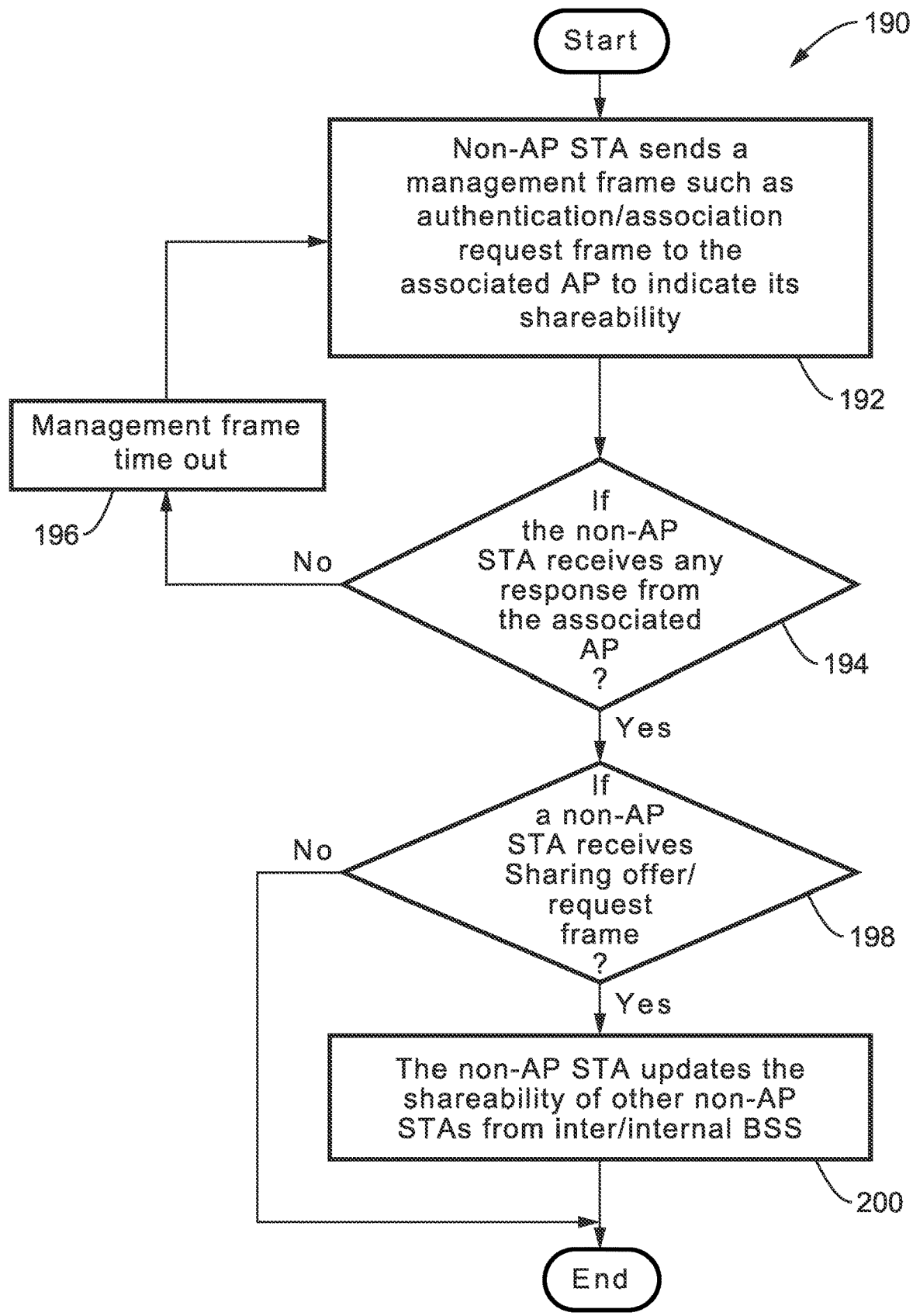
FIG. 16 is a flow diagram of a shared TXOP setup stage for OBSS scenario that is handled at non-AP STA level, according to at least one embodiment of the present disclosure.

FIG. 16 illustrates an example embodiment 190 of a shared TXOP setup stage for an OBSS scenario that is handled at the non-AP STA level. After the shared TXOP Setup stage starts, the Non-AP STA sends 192 a management frame to the associated AP to indicate its share offer/request information of the shared TXOP, the NAV is also set up to prevent interference caused by transmission in the OBSS.

A check 194 determines if a response was received from the associated AP. If the non-AP STA doesn't receive any feedback from the associated AP within the timeout period after sending an authentication frame or the association frame that contains the shareability information, then block 196 is reached with a management frame timeout, and in this embodiment execution returns to block 192 as the STA should retransmit the management frame to the associated AP to indicate its shareability.

Otherwise, if a response was received from the associated AP, then a check is made 198 to determine if the non-AP STA receives a sharing offer/request frame.

If at block 198 no sharing offer/request was received, then the process ends. However, if the non-AP STA receives a sharing offer/request frame, then at block 200 the STA updates the latest shareability information of other non-AP STAs, which may from an inter BSS if the BSSID field and the TA field of the sharing offer/request frame indicates the different MAC address, or from the internal BSS if the BSSID field and the TA field of the sharing offer/request frame indicates the same MAC address.

7.2. Shared TXOP Initialization Stage

Figure 17:
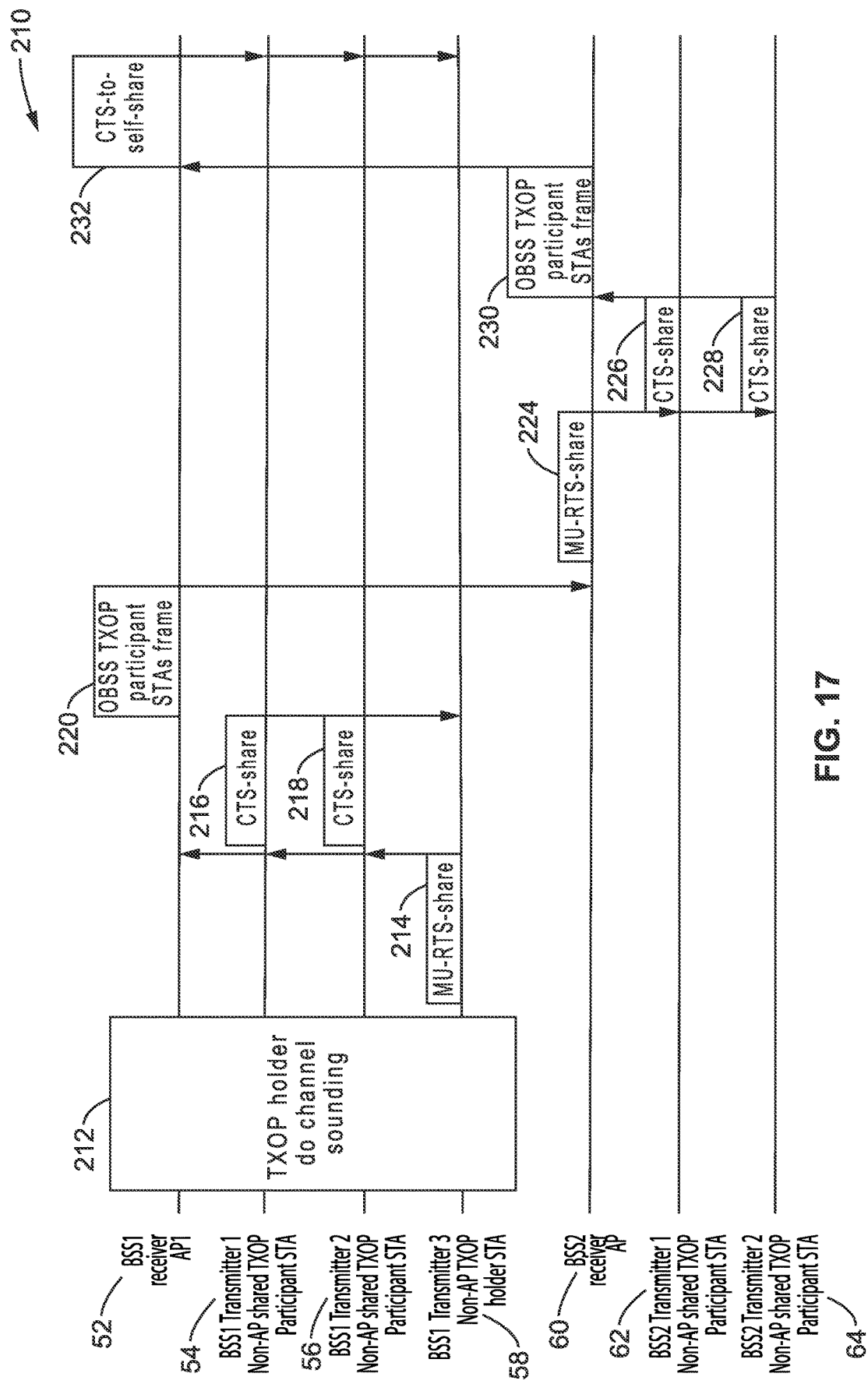
FIG. 17 is a communication sequence diagram of packet exchange in the shared TXOP initialization stage for the OBSS scenario according to at least one embodiment of the present disclosure.

FIG. 17 illustrates an example embodiment 210 of a packet exchange process in the shared TXOP initialization stage for the OBSS scenario. As in a prior example interactions are shown of a first BSS (BSS1) having a receiver AP1 52, two non-AP transmitters as shared TXOP participants 54, 56, and a non-AP transmitter TXOP holder 58. In a second BSS (BSS2) is seen a receiver AP 60, and two non-AP transmitters as shared TXOP participants 62 and 64. It will be noted that for simplicity of illustration, the NAV intervals are not shown.

In this scenario, the non-AP TXOP holder STA only needs to know the AID (Association ID) of the shared TXOP participant STAs from its own BSS, the non-AP TXOP holder STA can schedule the access for the shared TXOP participant STAs for the internal BSS and leave the scheduling work for the shared TXOP STAs from the inter BSS to their associated AP. Thus, for the other shared TXOP participant STAs from the inter BSS, their AID info is recorded by their associated AP, and is not needed by the non-AP TXOP holder STA.

In this stage, the non-AP TXOP holder STA obtains the channel, and is willing to share the TXOP with other non-AP STAs from intra or inter BSS. It needs to confirm which other non-AP STAs are willing to join its shared TXOP from internal BSS.

The non-AP TXOP holder STA first performs a channel sounding 212 to gather beamforming information towards other non-AP STAs in the internal BSS, which is named as the shared TXOP holder BSS.

Then, the non-AP TXOP holder STA sends a multiple-user request-to-send (MU-RTS)-share frame 214 to the potential non-AP shared TXOP participant STAs, with indicated bandwidth (BW) for each specified non-AP STA. Once the non-AP STAs receive this MU-RTS-share frame then they respond with a CTS-share frame 216, 218 to the non-AP TXOP holder STA using the BW as indicated in the received MU-RTS-share frame if they are willing to join the following shared TXOP.

The non-AP TXOP holder STA also sent the MU-RTS-share frame 214 to the associated AP to announce the start of the shared TXOP. Once the AP receives this MU-RTS-share frame, it becomes aware that the shared TXOP is initiated. Then, after the CTS-share frames, the AP unicasts 220 an OBSS TXOP participant STAs frame to another AP of the inter BSS, which is named as the shared TXOP participant BSS. The OBSS TXOP participant STAs frame doesn't contain any information of non-AP shared TXOP participant STA.

After receiving the OBSS TXOP participant STAs frame that doesn't contain any information of non-AP shared TXOP participant STAs, the AP of the shared TXOP participant BSS is aware that the initiation of the shared TXOP has commenced and sends a MU-RTS-share frame 224 to potential non-AP shared TXOP participant STAs, with indicated BW for each specified non-AP STA to response.

Once the non-AP STA from the shared TXOP participant BSS receives this MU-RTS-share frame, they respond with a CTS-share frame 226, 228, to the associated AP if they are willing to join to following shared TXOP.

After receiving all CTS-share frames from the non-AP TXOP participant STAs that are willing to participant in the following shared TXOP, the AP of the shared TXOP participant BSS unicasts 230 an OBSS TXOP participant STAs frame to the AP of share TXOP holder BSS, with the latest information of the shared TXOP participant STAs.

After receiving the OBSS TXOP participant STAs frame with the information of the shared TXOP participant STAs from another BSS, the AP broadcasts 232 a CTS-to-self-share frame to announce that the shared TXOP initialization work is finished in the shared TXOP participant BSS.

Once the CTS-to-self-share from the associated AP is received, the non-AP TXOP holder STA can start the TXOP schedule and access stage.

Figure 18:
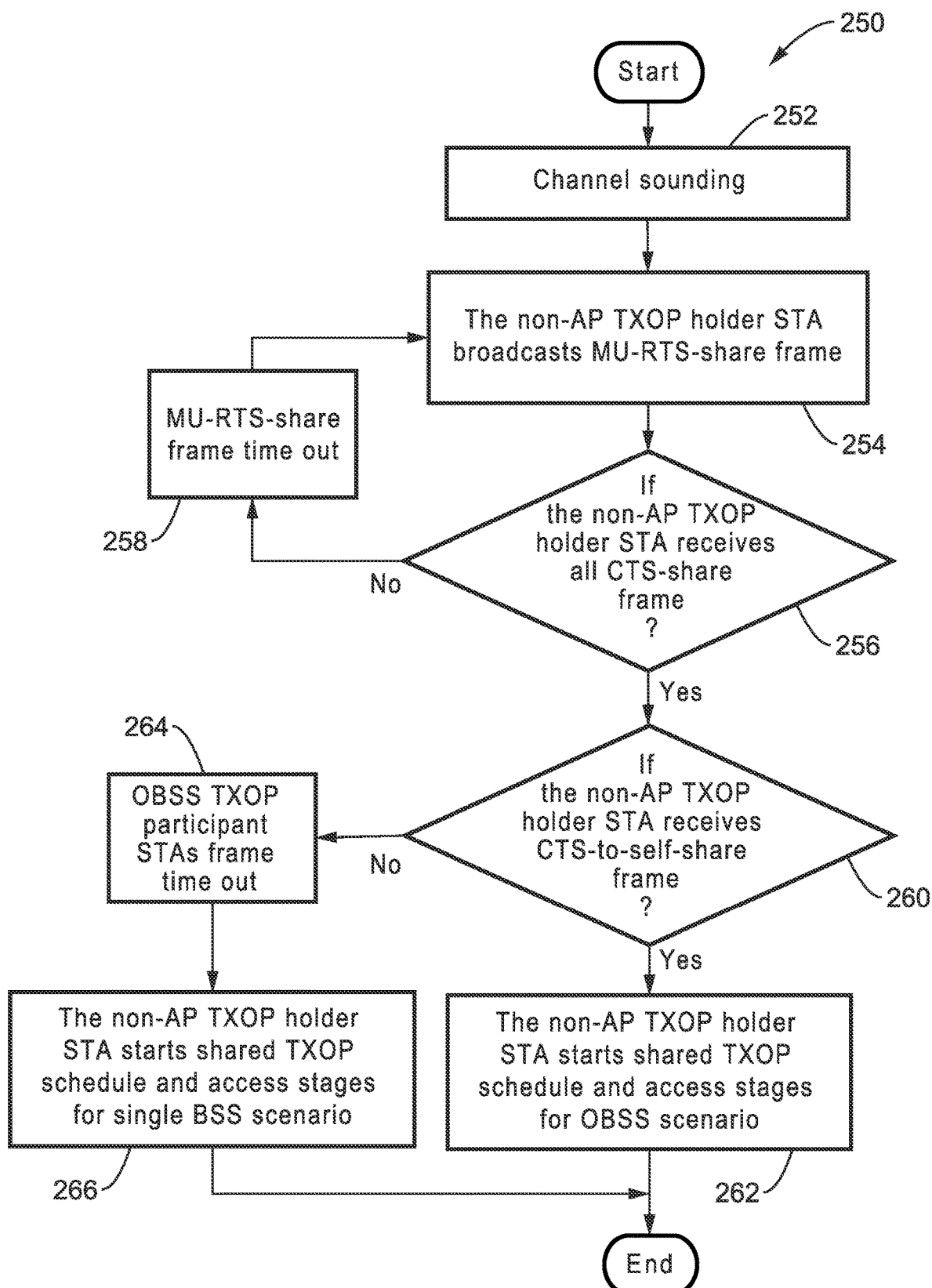
FIG. 18 is a flow diagram of a shared TXOP initialization stage for OBSS scenario, handled on the non-AP TXOP holder STA level, according to at least one embodiment of the present disclosure.

FIG. 18 illustrates an example embodiment 250 of the shared TXOP initialization stage for OBSS scenario, handled on the non-AP TXOP holder STA level.

Once the channel has been obtained, the non-AP TXOP holder STA first performs channel sounding 252 and then sends (broadcasts) MU-RTS-share frame 254 to the potential non-AP shared TXOP participant STAs and the AP.

At block 256 a check is made for receiving all CTS-share frames. If the non-AP TXOP holder STA doesn't receive CTS-share frame before MU-RTS-share frame time out, then a MU-RTS share frame timeout occurs 258 and execution returns to block 254 and it retransmits the MU-RTS-share frame.

If a CTS-share frame were received, then at block 260 a check is made to determine if the CTS-to-self-share frame was received. If a non-AP TXOP holder STA doesn't receive a CTS-to-self-share frame before OBSS TXOP participant STAs frame time out, then a timeout 264 is reached and at block 266 it starts a shared TXOP schedule and access stage for its own BSS.

Otherwise, if the CTS-to-self-share frame was received, then at block 262 the non-AP TXOP holder STA starts a shared TXOP schedule and access stage for an OBSS scenario.

Figure 19A:
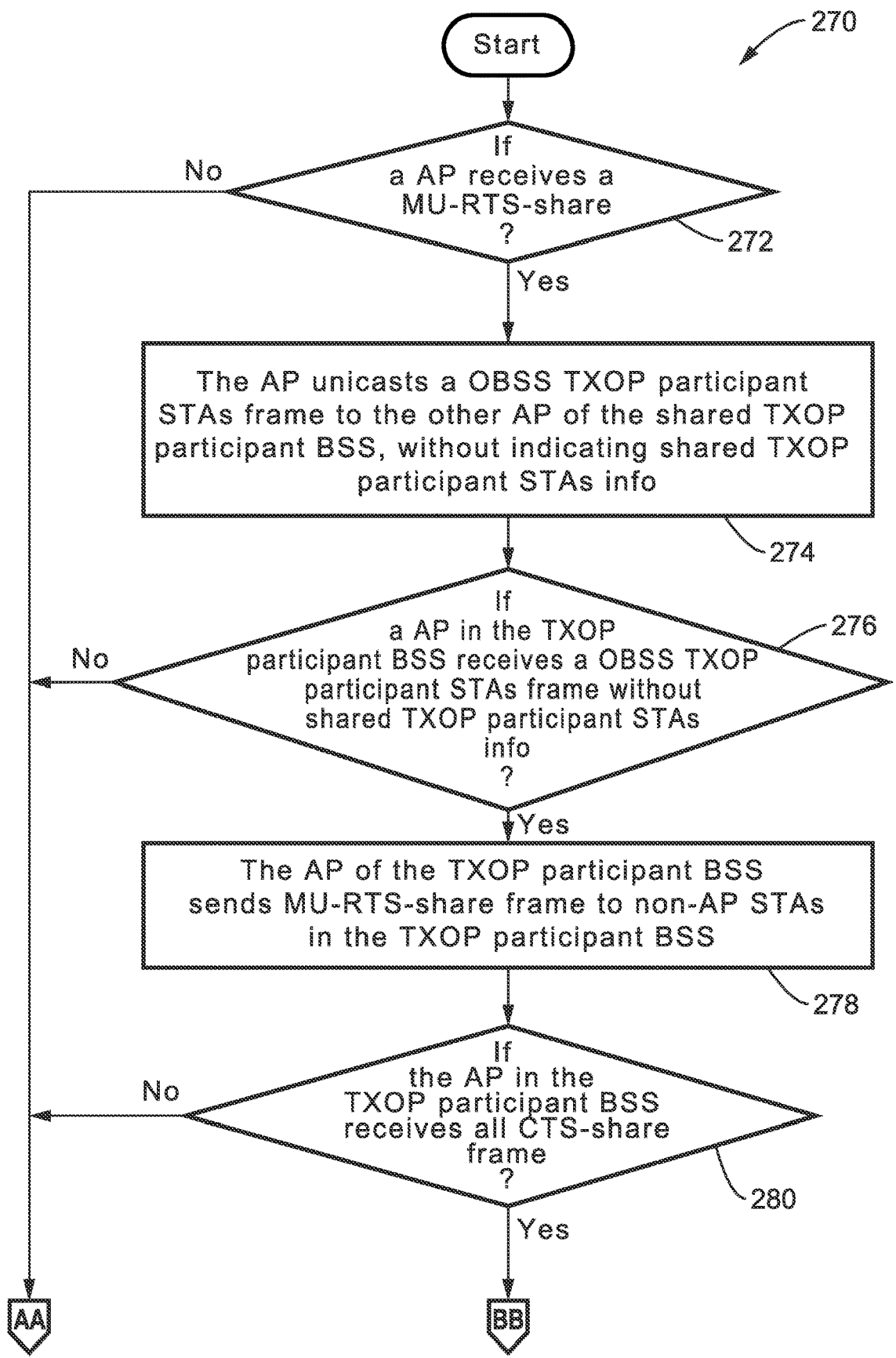
FIG. 19A and FIG. 19B is a flow diagram of a shared TXOP initialization stage for OBSS scenario, which is processed on the AP level, according to at least one embodiment of the present disclosure.
Figure 19B:
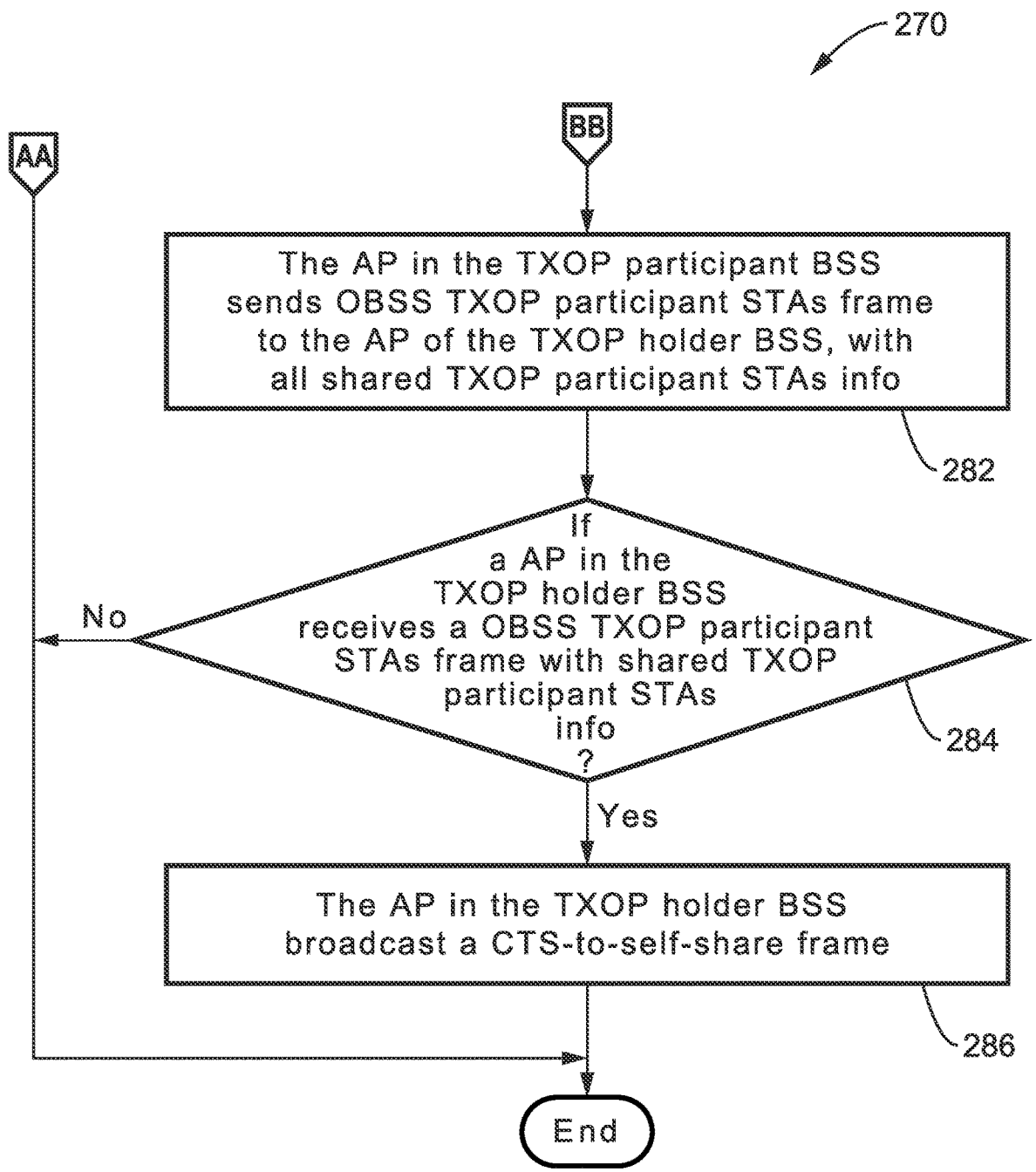

FIG. 19A and FIG. 19B illustrates an example embodiment 270 of the shared TXOP initialization stage for the OBSS scenario, which is processed on the AP level. If at block 272 it is determined that the AP receives a MU-RTS-share frame, then it unicasts 274 an OBSS TXOP participant STAs frame to the other AP of the shared TXOP participant BSS, without indicating shared TXOP participant STAs info.

If it is determined at block 276 that the AP receives the OBSS TXOP participant STAs frame that doesn't contain any information of non-AP shared TXOP participant STAs, the AP is aware that the initiation of shared TXOP has started and sends 278 a MU-RTS-share frame to the potential non-AP shared TXOP participant STAs, with indicated BW for each specified non-AP STA to response.

If it is determined at block 280 that the AP received all CTS-share frames from the non-AP TXOP participant STAs that are willing to participate in the following shared TXOP, then in FIG. 19B the AP unicasts 282 an OBSS TXOP participant STAs frame to the AP of TXOP holder BSS, with the latest information of the shared TXOP participant STAs.

If it is determined at block 286 that the AP received the OBSS TXOP participant STAs frame with the information of the shared TXOP participant STAs from another BSS, then the AP broadcasts 286 a CTS-to-self-share frame to announce the shared TXOP initialization work is finished in the shared TXOP participant BSS.

However, if any of the checks at block 272, 276, 280 or 284 fail, then the process ends without performing any of the actions.

Figure 20:
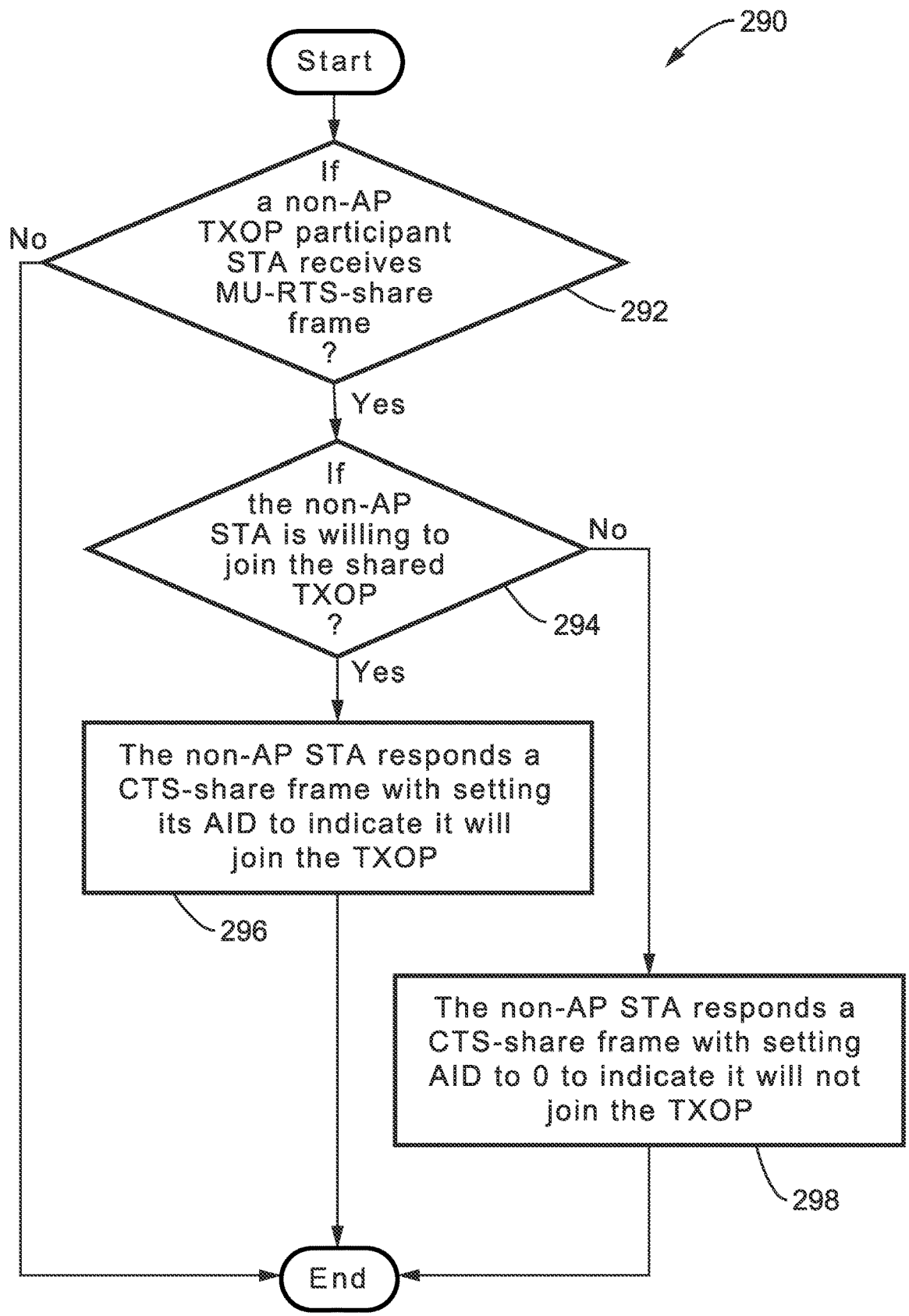
FIG. 20 is a flow diagram of a shared TXOP initialization stage for the OBSS scenario, which is processed at the non-AP TXOP participant STA level, according to at least one embodiment of the present disclosure.

FIG. 20 illustrates an example embodiment 290 of the shared TXOP initialization stage for OBSS scenario, which is processed on non-AP TXOP participant STA level.

A check is made 292 to determine if a non-AP STA receives MU-RTS-share frame. If the MU-RTS-share frame is not received then this processing ends.

Otherwise, the non-AP STA received the MU-RTS-share frame, then a check is made 294 if the non-AP STA is willing to join the following shared TXOP. If stations are willing to join, then at block 296 the non-AP STA responds with a CTS-share frame by indicating its AID using the assigned frequency band.

Otherwise, if the non-AP STA will not join the shared TXOP, it sends back 298 a CTS-share frame with setting AID to 0 to indicate it will not join the shared TXOP.

7.3. TXOP Schedule and Access Stage

In this section, multiple solutions are described for the TXOP schedule and access stage design, which includes variations for (a) random access on a scheduled band, (b) basic trigger on a scheduled band, (c) a basic trigger transmission with time shifting, (d) unicasting a TXOP access request trigger and time shifting in the scheduler, which is triggered by the non-AP TXOP holder, (e) unicasting a TXOP access request trigger and time shifting in the scheduler, which is triggered by the AP, (f) broadcasting TXOP access request trigger and time shifting in the scheduler, which is triggered by the non-AP TXOP holder, (g) broadcasting a TXOP access request trigger and time shifting in the scheduler, which is triggered by the AP.

Figure 21:
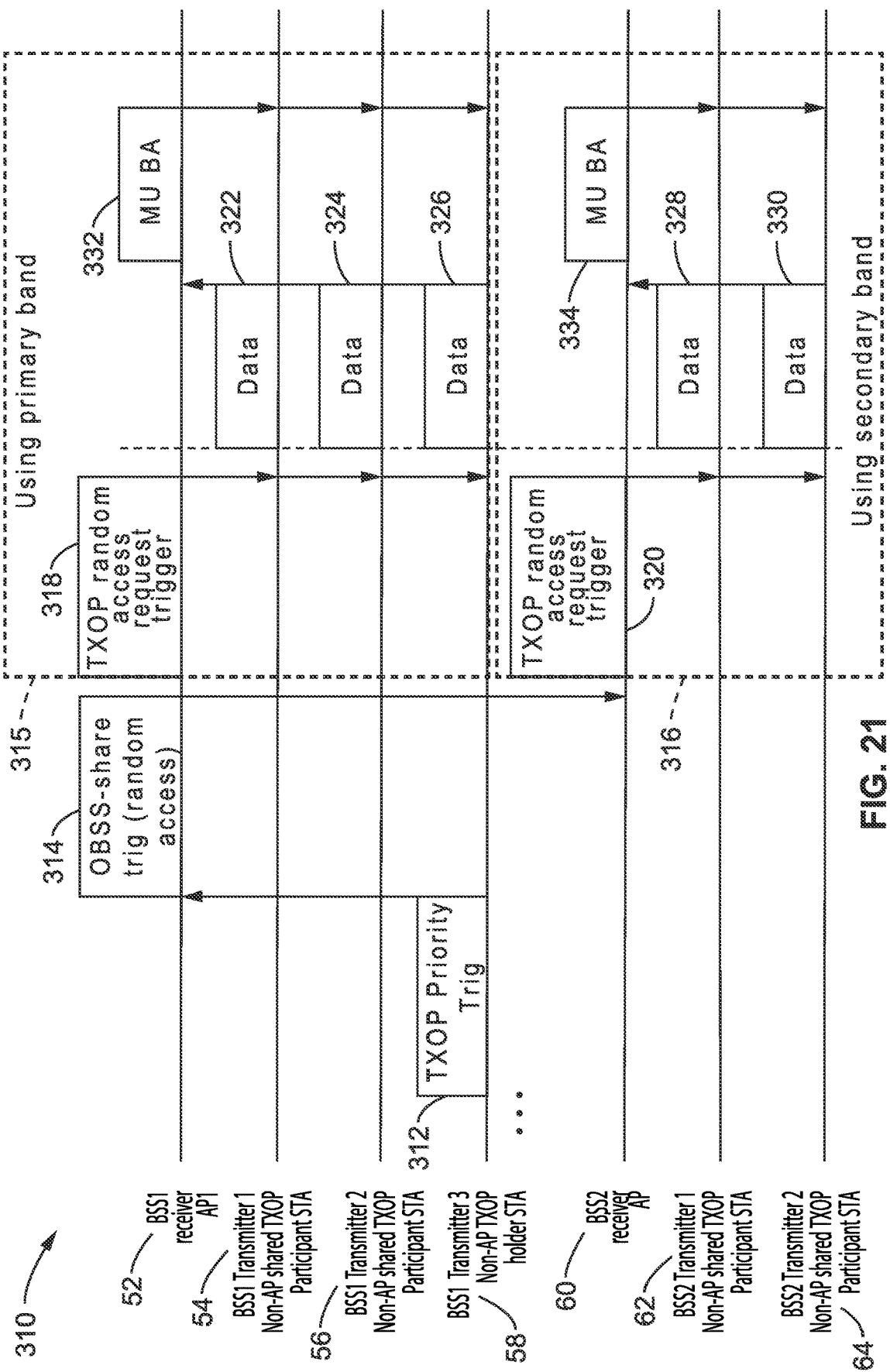
FIG. 21 is a communication sequence diagram of a TXOP schedule and access stage with random access on scheduled band for OBSS scenario, according to at least one embodiment of the present disclosure.

FIG. 21 illustrates an example embodiment 310 of the TXOP schedule and access stage with random access on the scheduled band for an OBSS scenario. This procedure doesn't require the implementation of the shared TXOP initialization procedure. The figure shows the first BSS using a primary band 315, and the second BSS using a secondary band 316. As in prior example interactions the example is shown with a first BSS (BSS1) having a receiver AP1 52, two non-AP transmitters as shared TXOP participants 54, 56, and a non-AP transmitter TXOP holder 58. In a second BSS (BSS2) is seen a receiver AP 60, and two non-AP transmitters as shared TXOP participants 62 and 64. It will be noted that for simplicity of illustration, the NAV intervals are not shown.

The non-AP TXOP holder STA first unicasts 312 a TXOP priority trigger frame to the associated AP, which indicates the reserved RU in the RU allocation subfield and the UL BW subfield, and set the priority field to 1 to indicate this is a non-AP TXOP holder STA.

After receiving the TXOP priority trigger frame, the AP of the shared TXOP holder BSS sends a OBSS-share trigger frame 314 which indicates random access being used in the shared TXOP (by setting the Random Access subfield of the Reserved Band TXOP Holder BSS field to 1) and the reserved frequency band for the shared TXOP holder BSS (by setting the Reserved Band subfield of the Reserved Band TXOP Holder BSS field), and thus, leaving the remaining frequency band for the TXOP participant BSS.

Then, the AP of the shared TXOP holder BSS broadcasts 318 the TXOP random access request trigger frame using the reserved frequency band for the shared TXOP holder BSS.

If the AP from the shared TXOP participant BSS receives the OBSS-share trigger frame, it broadcasts 320 the TXOP random access request trigger frame using the remaining frequency band for the shared TXOP participant BSS.

After receiving the TXOP random access request trigger frame, the non-AP TXOP holder STA sends the UL DATA 326 by accessing the reserved RU. The non-AP shared TXOP participant STAs randomly access the available RUs and send the UL DATA 322, 324, 328 and 330 to the associated AP.

Once the AP receives the UL DATA from the non-AP STAs, it sends back an MU-BA frame 332, 334.

Figure 22:
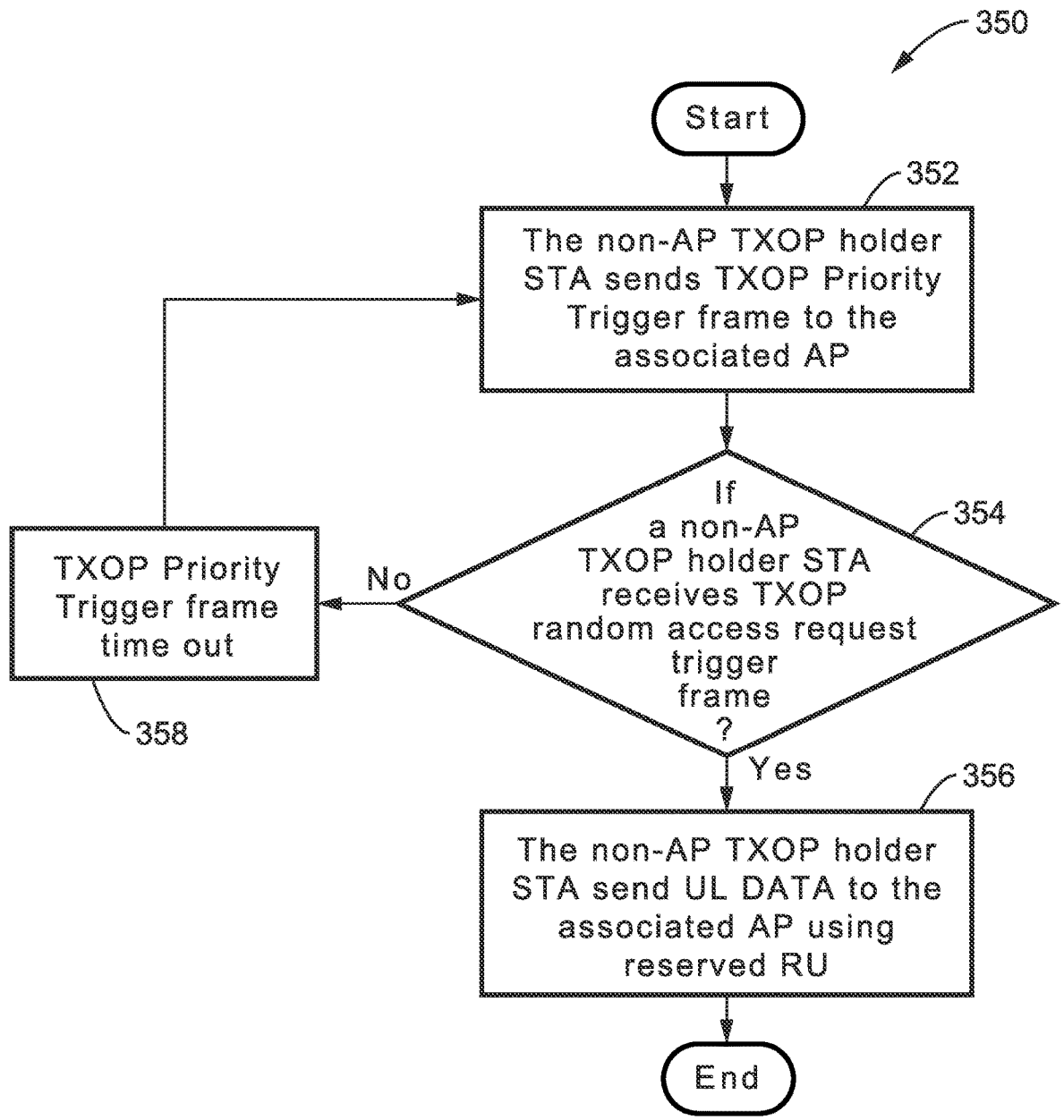
FIG. 22 is a flow diagram of TXOP schedule and access stage with random access on scheduled band for OBSS scenario, according to at least one embodiment of the present disclosure.

FIG. 22 illustrates an example embodiment 350 of a TXOP schedule and access stage with random access on a scheduled band for an OBSS scenario, which is processed on the non-AP TXOP holder STA level. The non-AP TXOP holder STA sends 352 a TXOP Priority Trigger frame to the associated AP to indicate that it has the highest priority in the shared TXOP and the reserved RU for UL DATA transmission. A check 354 determines if a non-AP TXOP holder STA receives the TXOP random access request trigger frame. If this TXOP random access request trigger frame is not received before the TXOP Priority Trigger frame time out, then block 358 is reached and then it will retransmit the TXOP Priority Trigger frame, as seen going back to block 352. Otherwise, the non-AP TXOP holder STA sends 356 UL DATA to the associated AP using the reserved RU.

Figure 23:
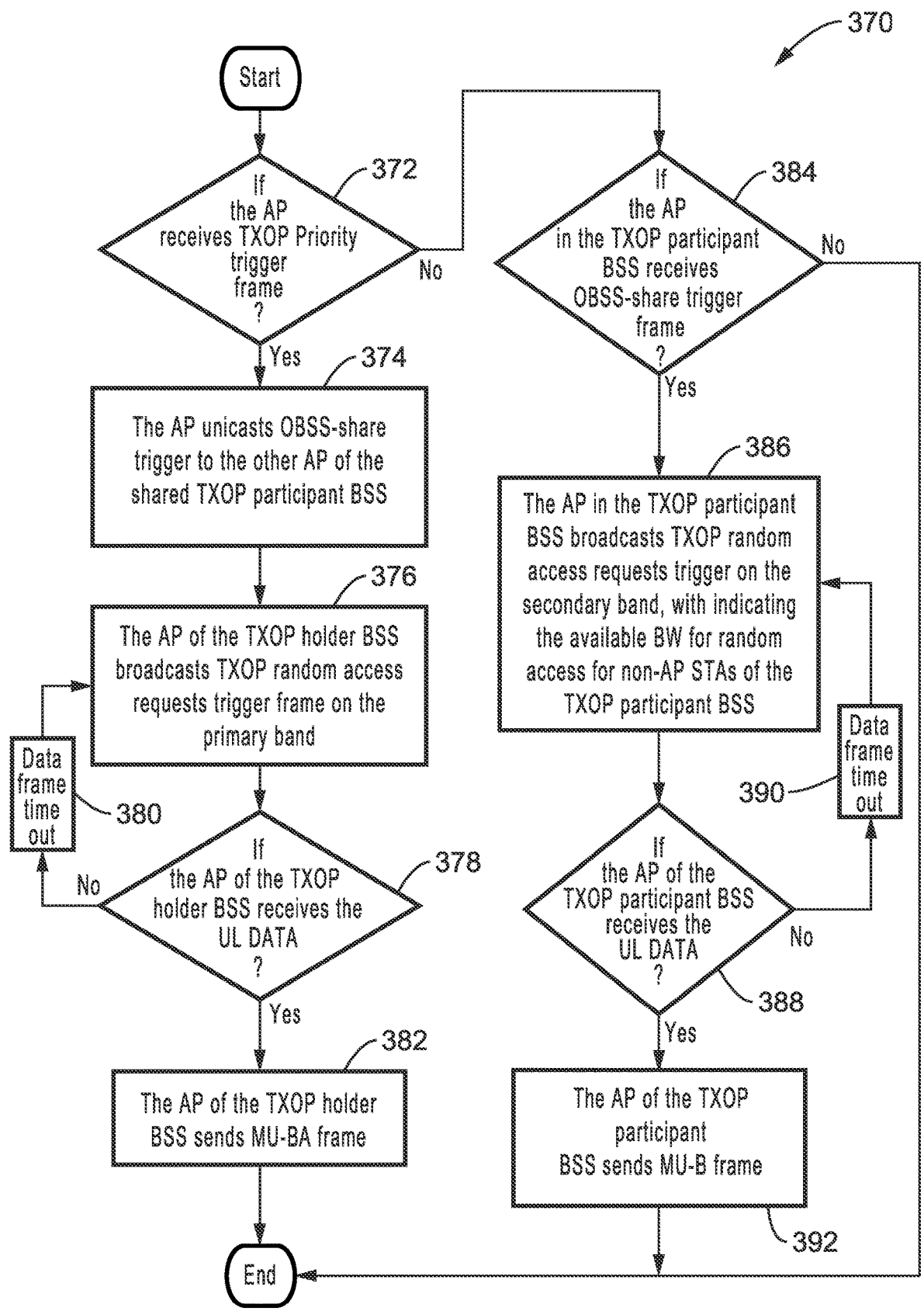
FIG. 23 is a flow diagram of a TXOP schedule and access stage with random access on the scheduled band for an OBSS scenario, which is processed on the AP level, according to at least one embodiment of the present disclosure.

FIG. 23 illustrates an example embodiment 370 of a TXOP schedule and access stage with random access on a scheduled band for an OBSS scenario, which is processed on the AP level.

A check is made 372 for receiving the TXOP priority trigger frame. If it is not received, then execution moves to the check at block 384 which determines if the AP in the TXOP participant BSS received an OBSS-share trigger frame.

If the AP receives TXOP Priority trigger frame, then this is the BSS of the TXOP holder STA, and execution reaches block 374 with the STA unicasting an OBSS-share trigger frame to the other AP of the shared TXOP participant BSS, and indicates the remaining frequency band for the shared TXOP participant BSS.

The AP in the shared TXOP holder BSS broadcasts 376 a TXOP random access requests trigger in the primary band (reserved for the shared TXOP holder BSS) with indicating the available BW for random access for the TXOP holder BSS.

A check is made 378 to determine if the AP receives the UL DATA. If the AP from the shared TXOP holder BSS receives the UL DATA, then the AP sends 382 an MU-BA frame using the reserved band, and the process ends. Otherwise, block 380 is reached with a Data frame time out, and the AP re-broadcasts 376 the TXOP random access request trigger frame, as in block 376.

Returning now to block 384 which determines if an OBSS share trigger frame was received. If the trigger frame was not received, then the process ends. Otherwise, after receiving the trigger frame, then at block 386 it broadcasts a TXOP random access requests trigger in the secondary band (remaining frequency band for the shared TXOP participant BSS), and indicates the available BW for random access for the TXOP participant BSS.

A check 388 is made for receiving the UL DATA. If the AP from the shared TXOP participant BSS received the UL DATA, the AP sends 392 an MU-BA frame using the band for the TXOP participant BSS, and the process ends. Otherwise, if the UL data is not received then a Data frame time out occurs 390, and the AP re-broadcasts 386 the TXOP random access request trigger frame.

Figure 24:
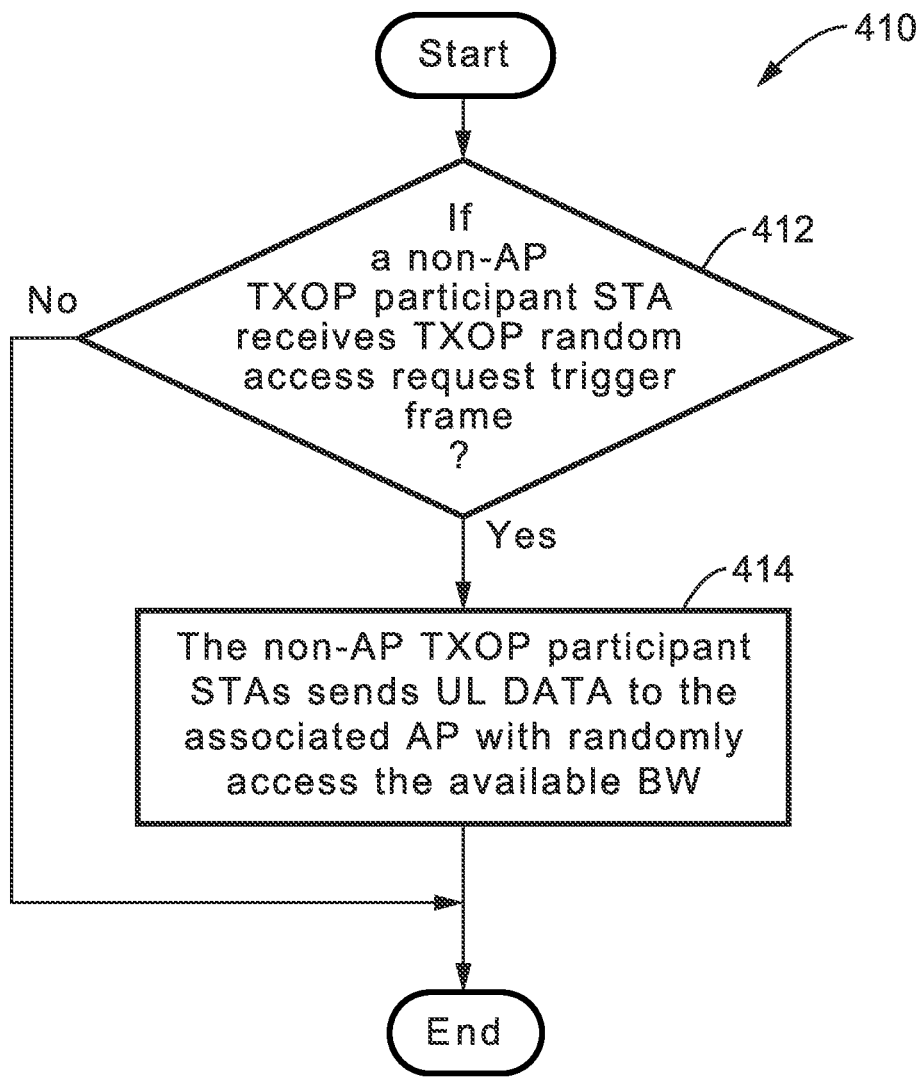
FIG. 24 is a flow diagram of a TXOP schedule and access stage with random access on scheduled band for OBSS scenario, which is processed on non-AP shared TXOP participant STA level, according to at least one embodiment of the present disclosure.

FIG. 24 illustrates an example embodiment 410 of a TXOP schedule and access stage with random access on a scheduled band for an OBSS scenario, which is processed on the non-AP shared TXOP participant STA level. A check is made 412 to determine if a TXOP random access request trigger frame has been received. If a non-AP TXOP participant STA receives the TXOP random access request trigger frame, it sends 414 the UL DATA to the associated AP and randomly accesses the available BW, before the process ends. Otherwise, if it is determined at block 412 that the trigger frame was not received, then the process ends.

7.3.2. TXOP Schedule and Access Stage w/Basic Trigger On Scheduled Band

Figure 25:
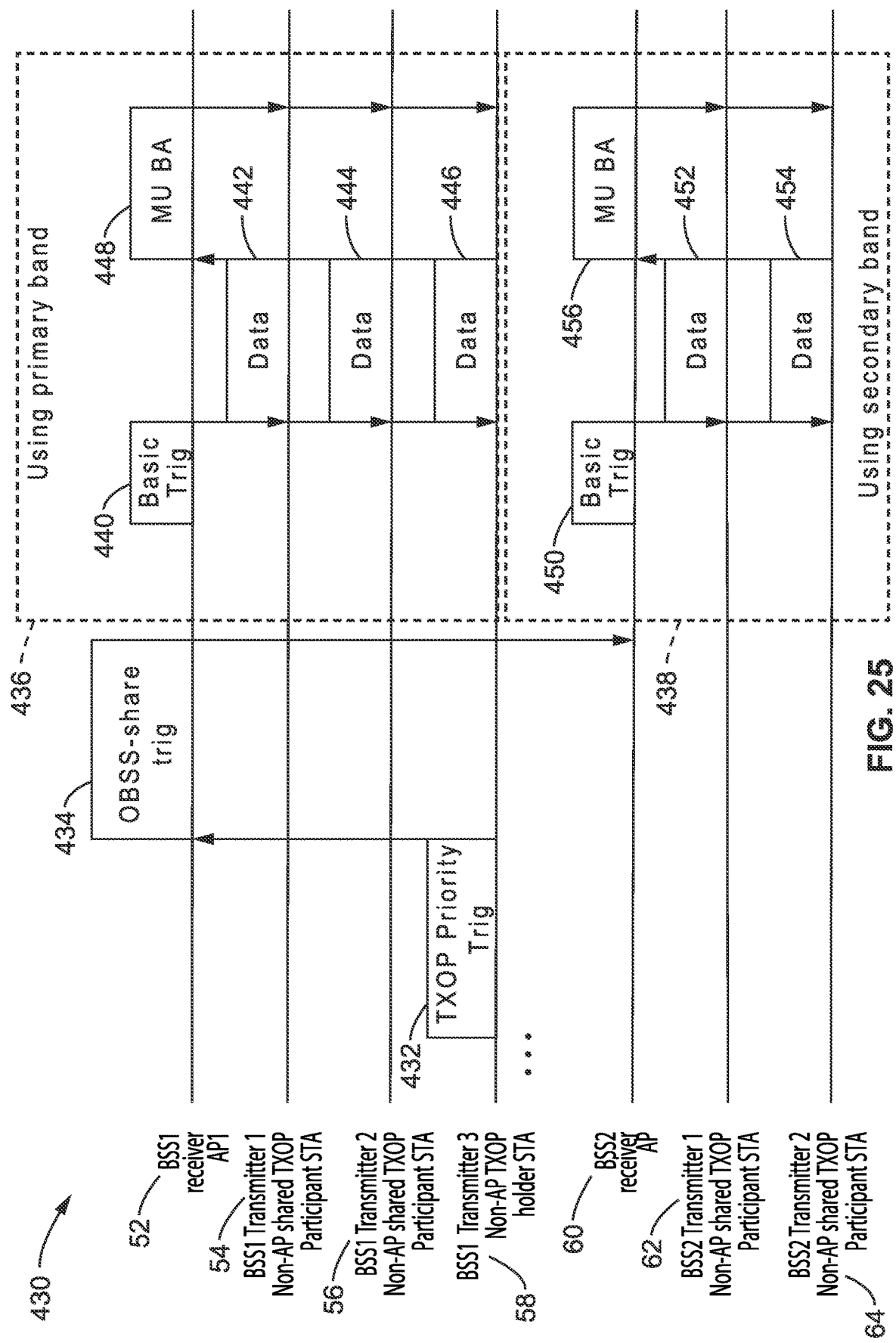
FIG. 25 is a communication sequence diagram of a TXOP schedule and access stage with basic trigger on scheduled band for OBSS scenario, according to at least one embodiment of the present disclosure.

FIG. 25 illustrates an example embodiment 430 of a TXOP schedule and access stage with basic trigger on a scheduled band for an OBSS scenario. This procedure doesn't require a shared TXOP initialization procedure. As in prior example interactions the figure depicts a first BSS (BSS1) having a receiver AP1 52, two non-AP transmitters as shared TXOP participants 54, 56, and a non-AP transmitter TXOP holder 58. In a second BSS (BSS2) is seen a receiver AP 60, and two non-AP transmitters as shared TXOP participants 62 and 64. It will be noted that for simplicity of illustration, the NAV intervals are not shown.

In each BSS, the AP and STAs periodically exchange buffer status and traffic priority information with BSRP and BSR frames. The non-AP TXOP holder STA first unicasts 432 a TXOP priority trigger frame to the associated AP, containing an indication of the reserved RU in the RU allocation subfield and the UL BW subfield, and sets the priority field to 1 to indicate that this is a non-AP TXOP holder STA.

After receiving the TXOP priority trigger frame, the AP of the TXOP holder BSS unicasts 434 an OBSS-share trigger frame to the other AP of the shared TXOP participant BSS, and indicates the reserved frequency band for the shared TXOP holder BSS (by setting the Reserved Band subfield of the Reserved Band TXOP Holder BSS field), and thus leaves the remaining frequency band for the TXOP participant BSS.

The AP in the shared TXOP holder BSS uses the primary band 436 and broadcasts basic trigger frames 440 on the primary band which is the reserved band for the TXOP holder BSS. The AP in the shared TXOP participant BSS broadcasts basic trigger frames 450 on the secondary band 438 (the remaining band for the share TXOP participant BSS). The basic trigger frame indicates the RU assignment for the non-AP shared TXOP participant STAs.

Once non-AP TXOP participant STAs receive a basic trigger frame, they send UL DATA 442, 444, 452 and 454 to the associated AP with assigned RU, while the TXOP holder STA sends UL DATA 446 in its reserved RU.

Once the UL DATA is received by the APs from the shared TXOP holder BSS/shared TXOP participant BSS each send an MU-BA frame 448, 456 using the band for the shared TXOP holder BSS/the shared TXOP participant BSS, respectively.

Figure 26:
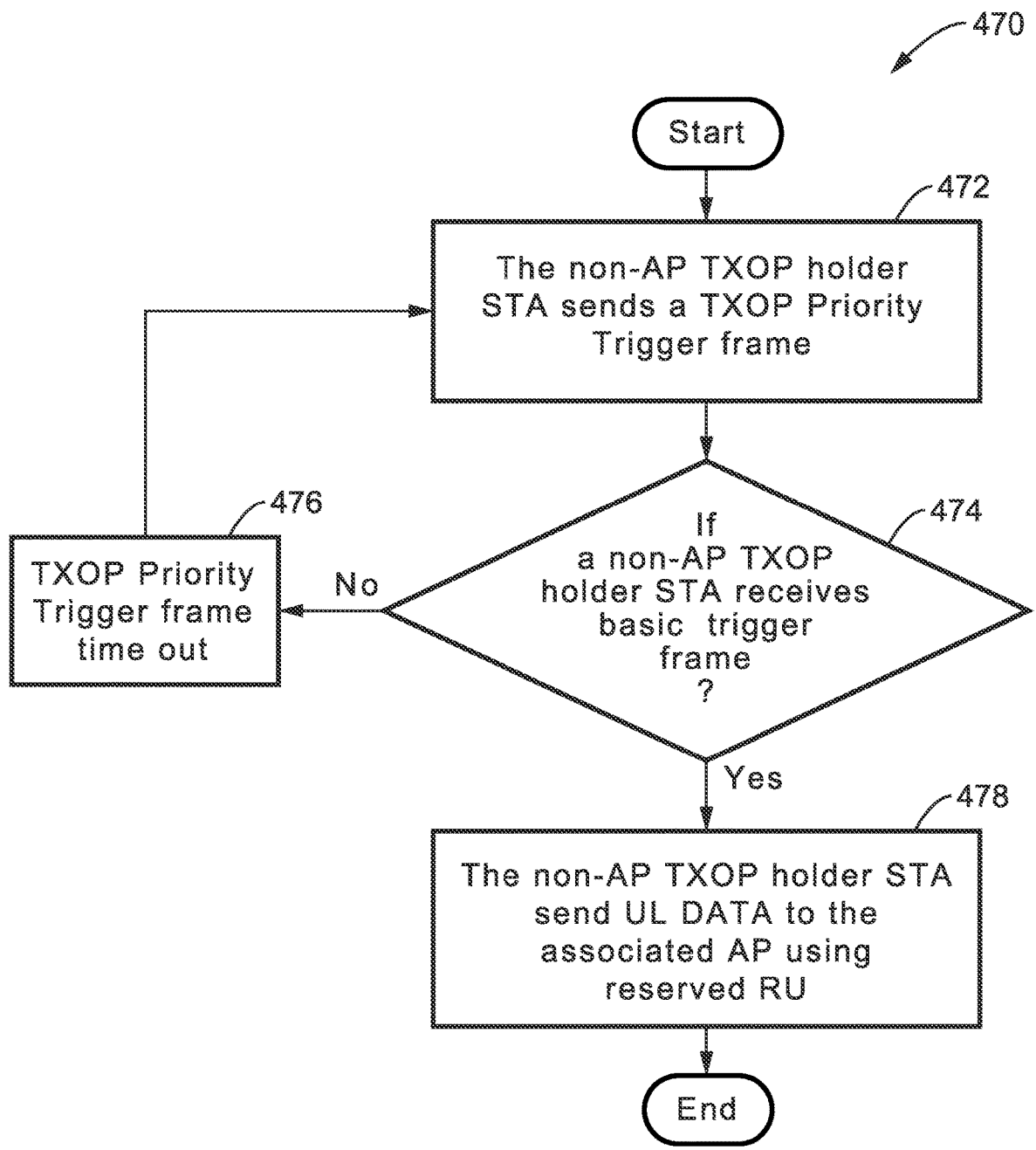
FIG. 26 is a flow diagram of a TXOP schedule and access stage with basic trigger on scheduled band for OBSS scenario, according to at least one embodiment of the present disclosure.

FIG. 26 illustrates an example embodiment 470 of a TXOP schedule and access stage with a basic trigger on a scheduled band for an OBSS scenario, which is processed at the non-AP TXOP holder STA level.

The non-AP TXOP holder STA sends 472 a TXOP Priority Trigger frame to the associated AP to indicate that it has the highest priority in the following shared TXOP and indicates the reserved RU for UL DATA transmission.

A check 474 determines if the non-AP TXOP holder STA receives the basic trigger frame. If the basic trigger frame is not received before the TXOP Priority Trigger frame times out, then execution reaches timeout block 476, and execution returns to block 472 to retransmit the TXOP Priority Trigger frame. Otherwise, if the trigger frame is received, then execution reaches block 478 with the non-AP TXOP holder STA sending UL DATA to the associated AP using the reserved RU.

Figure 27:
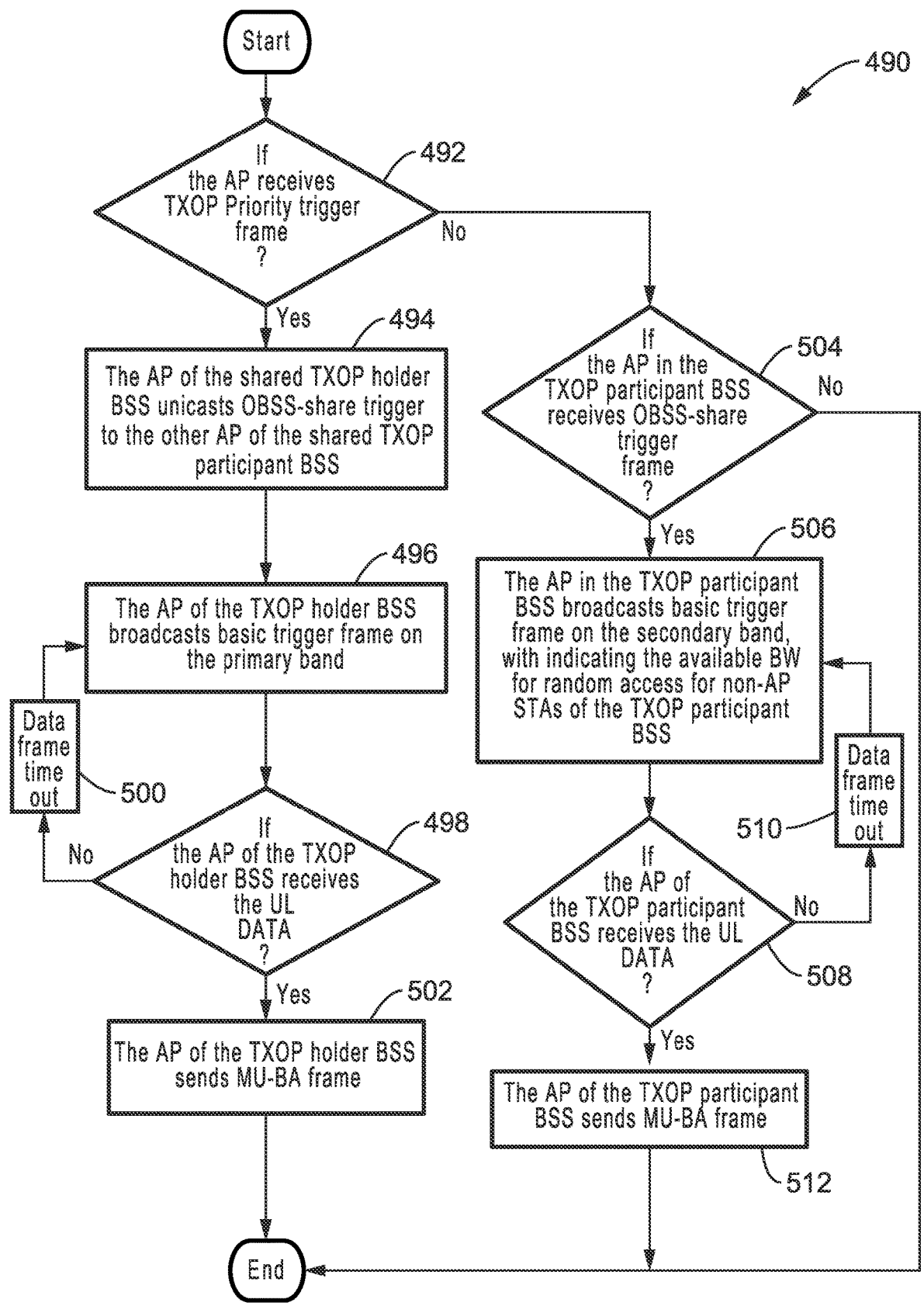
FIG. 27 is a flow diagram of a TXOP schedule and access stage with basic trigger on scheduled band for OBSS scenario, according to at least one embodiment of the present disclosure.

FIG. 27 illustrates an example embodiment 490 of a TXOP schedule and access stage with basic trigger on scheduled band for OBSS scenario, which is processed on AP level.

A check 492 determines whether a TXOP priority trigger frame has been received. If it has not been received then execution moves to block 504 for a different check.

If the TXOP priority trigger frame is received, then this is the AP of the shared TXOP holder BSS and the AP unicasts 494 an OBSS-share trigger frame to the other AP of the shared TXOP participant BSS, and indicates the reserved frequency band for the shared TXOP holder BSS, and thus, leaves the remaining frequency band for the TXOP participant BSS.

The AP in the shared TXOP holder BSS broadcasts 496 a basic trigger frame on the primary band (reserved band for TXOP holder BSS), and indicates the RU assignment for the non-AP shared TXOP participant STAs.

A check is made 498 if the AP from the shared TXOP holder BSS receives the UL DATA. If it has received the UL DATA, then the AP sends 502 an MU-BA frame using the reserved band. Otherwise, if at block 498 the UL DATA was not received within a Data frame time out period, then a data time out occurs 500, and the AP re-broadcasts the basic trigger frame by execution moving back to block 496.

If the frame received at block 492 was not a TXOP priority trigger frame, then block 504 was reached. In block 504 a check determines if the AP received an OBSS-share trigger frame. If this frame was not received then processing ends. Otherwise, if this frame was received, then this AP station is in the shared TXOP participant BSS. The AP broadcasts 506 a basic trigger in the secondary band (remaining frequency band for the shared TXOP participant BSS), with indicating the RU assignment for the non-AP shared TXOP participant STAs in the TXOP participant BSS.

A check is made in block 508 to determine if the AP receives the UL DATA. If the UL DATA was received, then the AP sends 512 MU-BA frame using the band for the TXOP participant BSS. Otherwise, if it was determined in block 508 that UL data was not received within a Data frame time out period, then execution reaches time out block 510 and the AP seeks to re-broadcast the basic trigger frame, such as returning to block 506.

Figure 28:
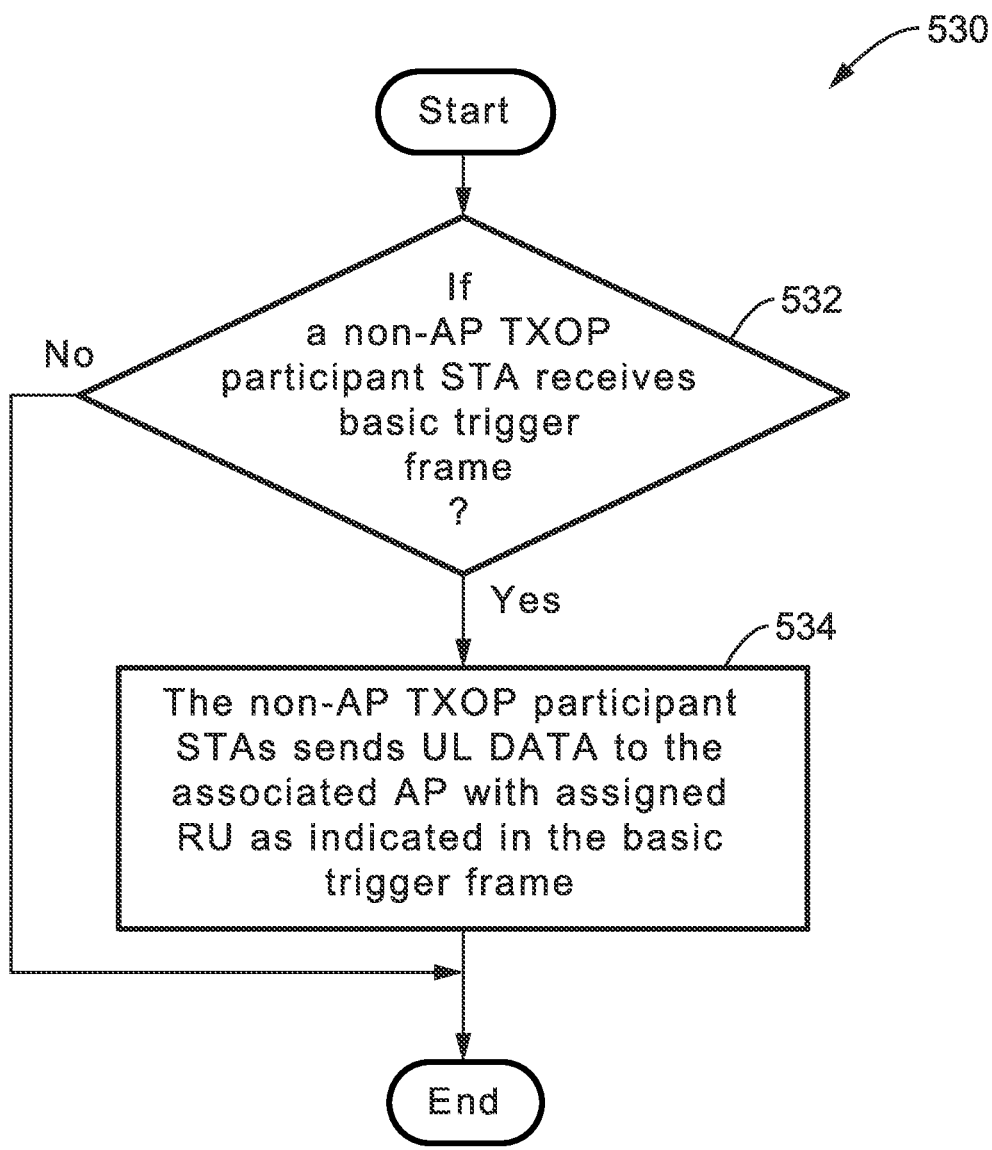
FIG. 28 is a flow diagram of a TXOP schedule and access stage with basic trigger on scheduled band for OBSS scenario, according to at least one embodiment of the present disclosure.

FIG. 28 illustrates an example embodiment 530 of a TXOP schedule and access stage with a basic trigger on a scheduled band for an OBSS scenario, which is processed at a non-AP shared TXOP participant STA level. If a non-AP TXOP participant STA receives 532 a basic trigger frame, then block 534 is reached and it sends UL DATA to the associated AP with the assigned RU.

Figure 29:
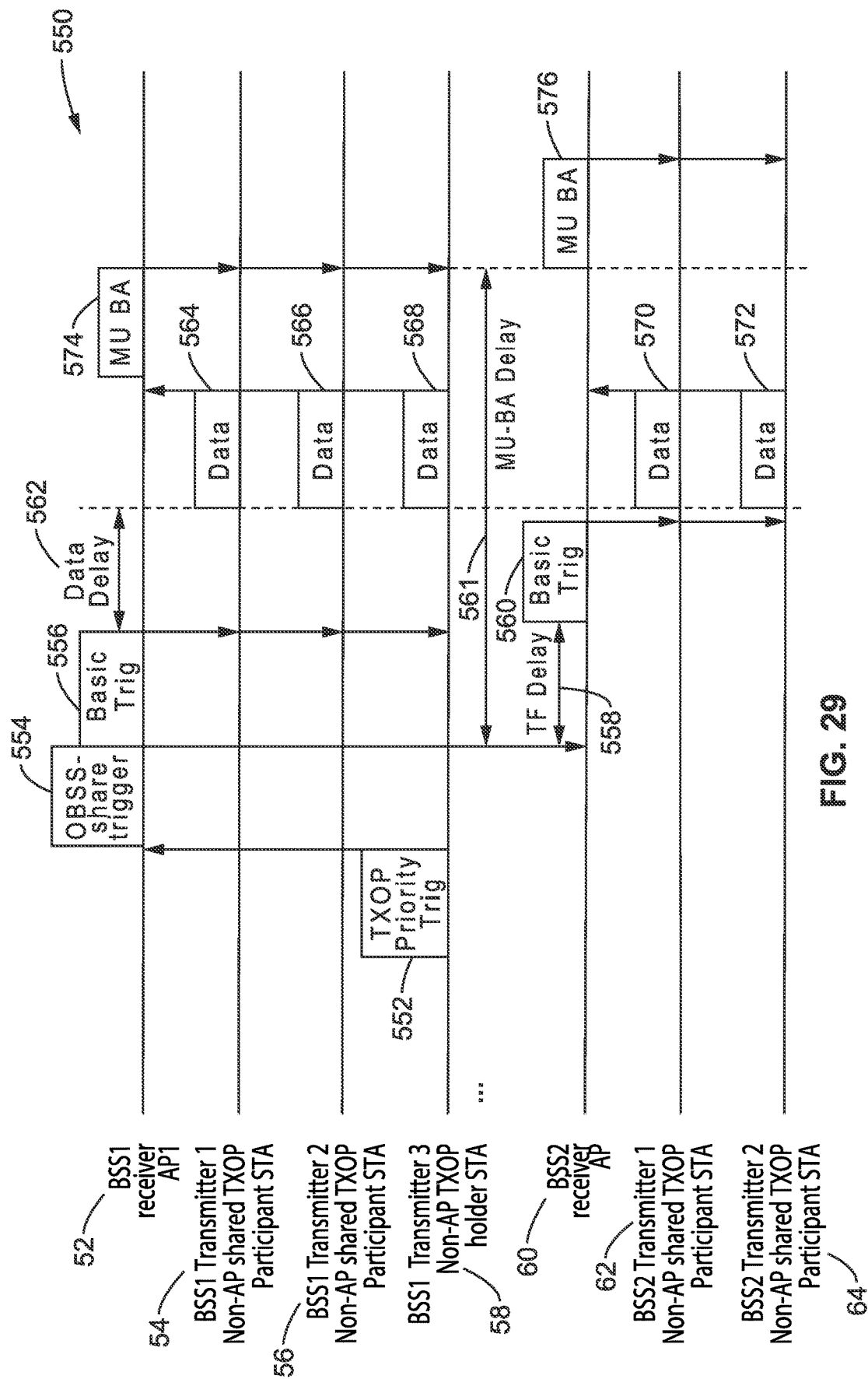
FIG. 29 is a communication sequence diagram of TXOP schedule and access stage with basic trigger transmission with time shifting for OBSS scenario, according to at least one embodiment of the present disclosure.

7.3.3. TXOP Schedule and Access Stage with Basic Trigger Transmission w/Time Shifting FIG. 29 illustrates an example embodiment 550 of a TXOP schedule and access stage with basic trigger transmission with time shifting for an OBSS scenario. This procedure doesn't require the implementation of a shared TXOP initialization procedure. As in prior example interactions the figure shows a first BSS (BSS1) having a receiver AP1 52, two non-AP transmitters as shared TXOP participants 54, 56, and a non-AP transmitter TXOP holder 58. In a second BSS (BSS2) is seen a receiver AP 60, and two non-AP transmitters as shared TXOP participants 62 and 64. It will be noted that for simplicity of illustration, the NAV intervals are not shown.

In each BSS, the AP and STAs periodically exchange buffer status and traffic priority information with BSRP and BSR frames.

The non-AP TXOP holder STA first unicasts 552 a TXOP priority trigger frame to the associated AP, which indicates the reserved RU for this non-AP TXOP holder STA. After the AP receives the TXOP Priority trigger frame, it unicasts an OBSS-share trigger frame 554 to the other AP of the shared TXOP participant BSS, and indicates the TF delay 558 (set in the TF Delay field) and the MU-BA delay 561 (set in the MU-BA Delay field) for transmission scheduling in the shared TXOP participant BSS. Then, the AP broadcasts a basic trigger frame 556, indicating the RU assignment for the non-AP shared TXOP participant STAs in the share TXOP holder BSS and the corresponding Data delay duration (set in the Data Delay field).

For the AP in the shared TXOP participant BSS receives an OBSS-share trigger frame, after the Trigger Frame (TF) Delay 558 it broadcasts a basic trigger frame 560, and indicates the RU assignment for the non-AP shared TXOP participant STAs in the shared TXOP participant BSS.

If a non-AP TXOP participant STA or the non-AP TXOP holder STA receives basic trigger frame, it checks the Data Delay 562 duration indicated in the basic trigger. After the Data Delay duration, it sends UL DATA 564, 566 or 568 to the associated AP with the assigned or reserved RU. The participant STAs in the BSS of the shared TXOP participant also send their UL DATA 570, 572 to the associated AP.

Once it receives the UL DATA, the AP from the shared TXOP holder BSS immediately sends a MU-BA frame 574. The AP from the shared TXOP participant BSS also sends a MU-BA frame 576 after the MU-BA delay since it receives the OBSS-share trigger frame.

Figure 30:
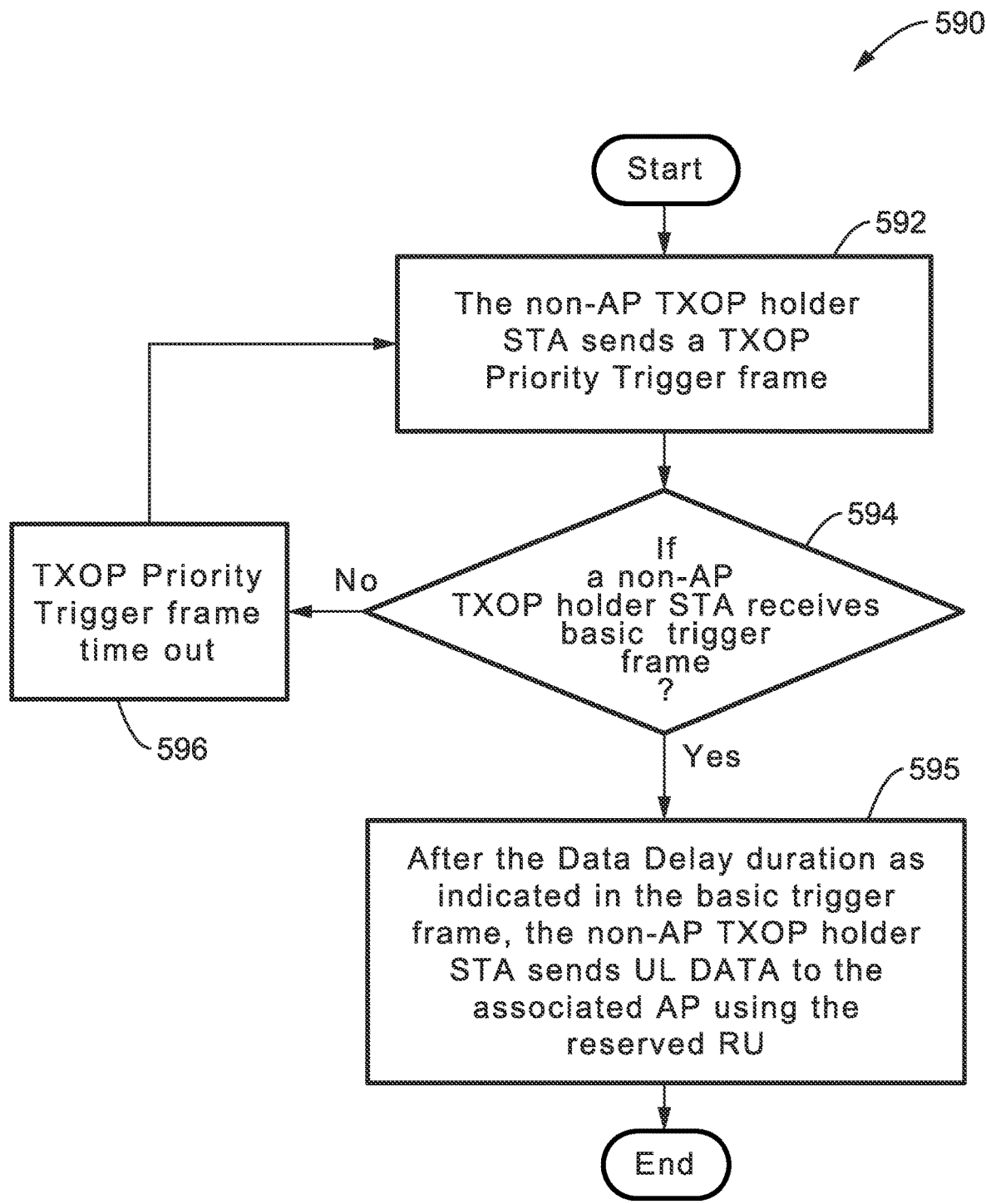
FIG. 30 is a flow diagram of a TXOP schedule and access stage with basic trigger transmission with time shifting, which is processed on non-AP TXOP holder STA level, according to at least one embodiment of the present disclosure.

FIG. 30 illustrates an example embodiment 590 of a TXOP schedule and access stage having a basic trigger transmission with time shifting, which is processed on a non-AP TXOP holder STA level. The non-AP TXOP holder STA sends 592 a TXOP Priority Trigger frame to the associated AP to indicate that it has the highest priority in the following shared TXOP and the reserved RU for UL DATA transmission.

A check 594 is made for receiving the basic trigger frame. If a non-AP TXOP holder STA doesn't receive the basic trigger frame before TXOP Priority Trigger frame time out, then timeout block 596 is reached, after which the STA will retransmit the TXOP Priority Trigger frame, shown by returning to block 592. Otherwise, after receiving the basic trigger frame the non-AP TXOP holder STA sends 598 UL DATA to the associated AP using the reserved RU, after first waiting for the DATA Delay duration as indicated in the basic trigger frame.

Figure 31:
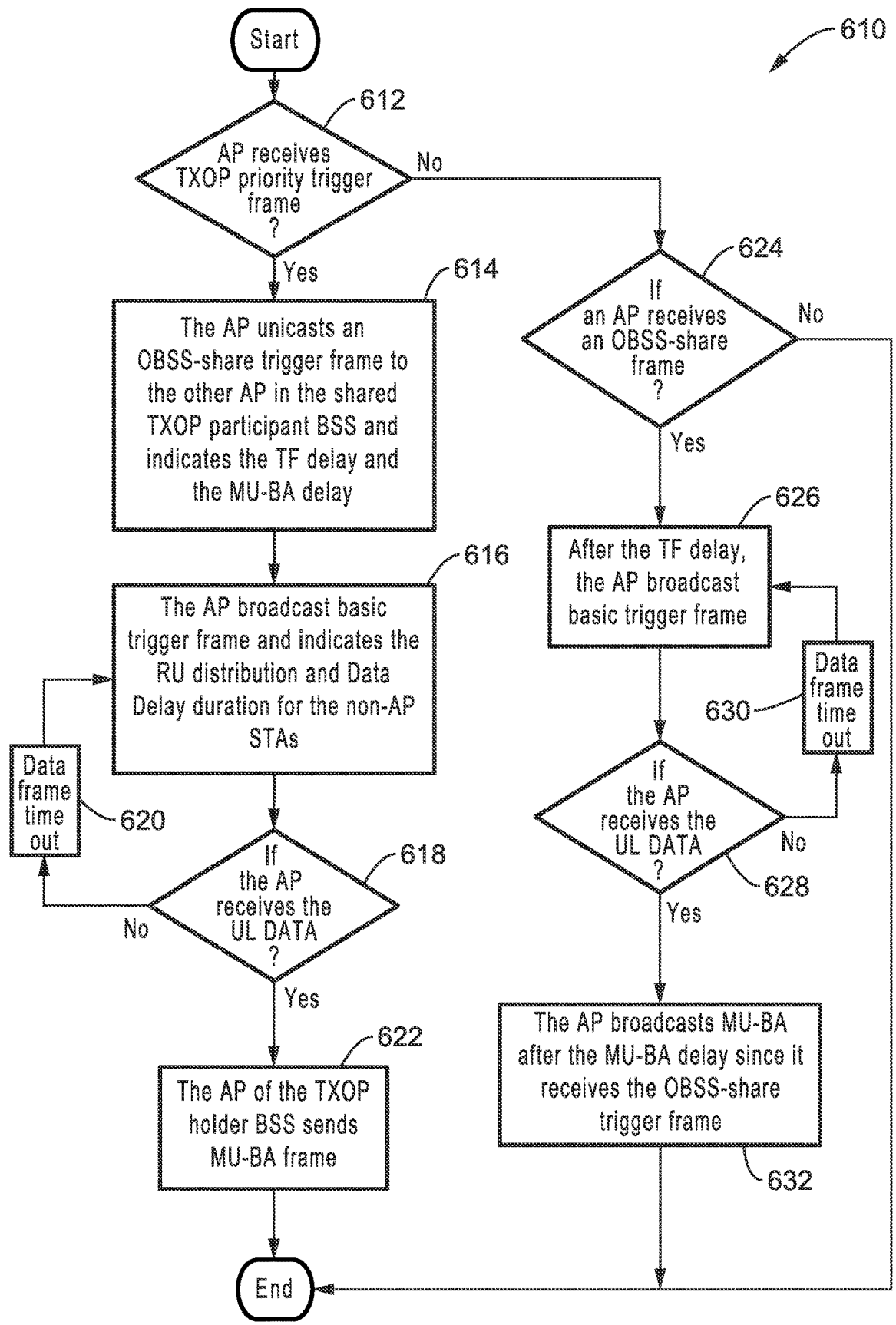
FIG. 31 is a flow diagram of a TXOP schedule and access stage with basic trigger on a scheduled band for an OBSS scenario, which is processed on the AP level, according to at least one embodiment of the present disclosure.

FIG. 31 illustrates an example embodiment 610 of a TXOP schedule and access stage with basic trigger on a scheduled band for an OBSS scenario, which is processed at the AP level.

A check is made 612 to determine if a TXOP Priority trigger frame has been received. If the AP has received the TXOP Priority trigger frame, then at block 614 it unicasts an OBSS-share trigger frame to the other AP of the shared TXOP participant BSS, and indicates the TF delay and the MU-BA delay for transmission scheduling in the shared TXOP participant BSS.

The AP in the shared TXOP holder BSS broadcasts 616 a basic trigger frame, indicating the RU assignment for the non-AP shared TXOP participant STAs and the Data delay duration.

A check is made 618 to determine if UL DATA has been received. If the UL DATA is not received within a given time period, then a DATA frame time out 620 occurs, and the AP re-broadcast the basic trigger frame, such as by execution returning to block 616. Otherwise, if it is determined at block 618 that UL DATA has been received, then the AP from the shared TXOP holder BSS sends 622 an MU-BA frame immediately.

Returning to block 612, if a priority trigger frame was not received, then execution moves to block 624 with a check for the AP receiving an OBSS-share frame. If the OBSS share frame is not received, then execution ends. Otherwise, if the OBSS-share frame was received, then this AP is determined to be the AP of a shared TXOP participant BSS, which after the TF Delay broadcasts 626 a basic trigger frame, and indicates the RU assignment for the non-AP shared TXOP participant STAs in the TXOP participant BSS.

A check is made 628 to determine if UL DATA has been received. If the UL DATA is not received within a given time period, then a DATA frame time out 630 occurs, and the AP re-broadcast the basic trigger frame, such as by execution returning to block 626. However, if the AP from the shared TXOP participant BSS receives the UL DATA, it sends 632 an MU-BA frame after the MU-BA delay since it receives the OBSS-share trigger frame.

Figure 32:
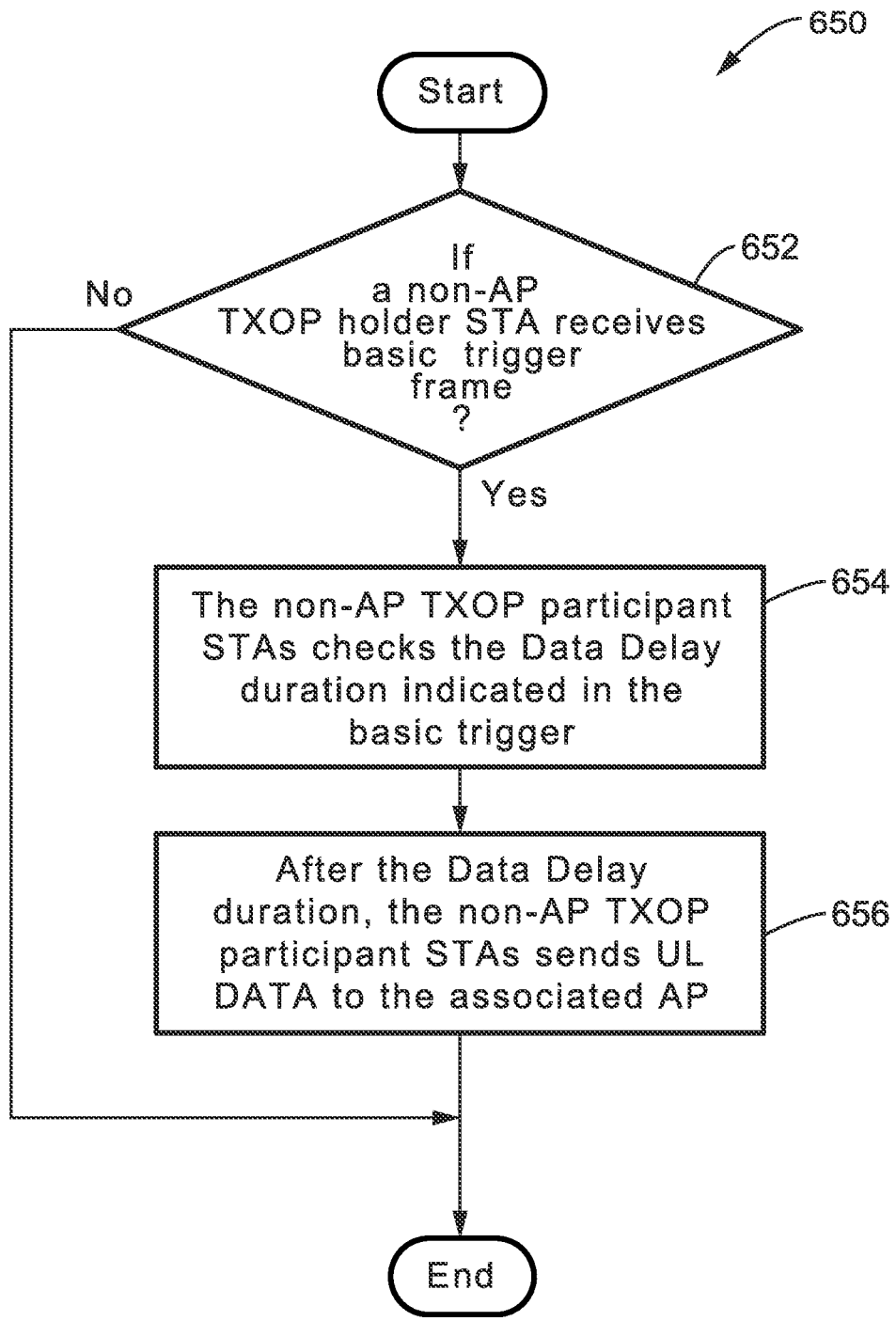
FIG. 32 is a flow diagram of a TXOP schedule and access stage with basic trigger transmission with time shifting, which is processed on the non-AP shared TXOP participant STA level, according to at least one embodiment of the present disclosure.

FIG. 32 illustrates an example embodiment 650 of a TXOP schedule and access stage having a basic trigger transmission with time shifting, which is processed at the non-AP shared TXOP participant STA level.

A check 652 determines if the non-AP TXOP participant STA has received a basic trigger frame. If the trigger frame is not received, then that ends the process. Otherwise, when a non-AP TXOP participant STA receives the basic trigger frame, execution reaches block 654 with a check on the Data Delay duration indicated in the basic trigger. After the Data Delay duration has passed, the STAs send 656 their UL DATA to the associated AP with assigned RU.

7.3.4. TXOP Schedule and Access Stage w/Unicast TXOP Access Request Trigger and Time Shift in Scheduler (Triggered by non-AP TXOP Holder)

Figure 33:
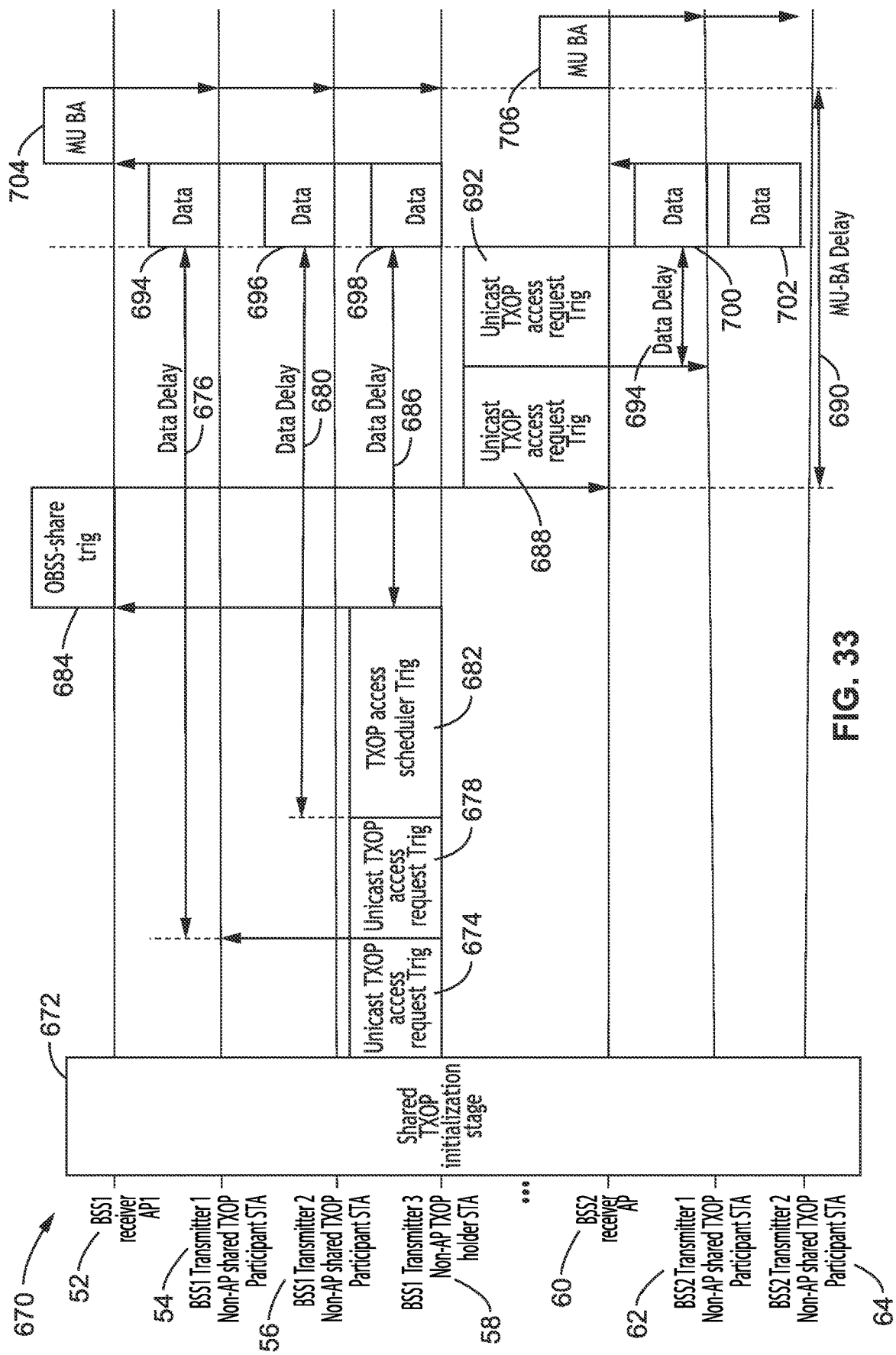
FIG. 33 is a communication sequence diagram of a TXOP schedule and access stage with unicast TXOP access request trigger and time shift in the scheduler, according to at least one embodiment of the present disclosure.

FIG. 33 illustrates an example embodiment 670 of a frame exchange process in the TXOP schedule and access stage with a unicast TXOP access request trigger and time shift in the scheduler. As in prior example interactions the figure shows a first BSS (BSS1) having a receiver AP1 52, two non-AP transmitters as shared TXOP participants 54, 56, and a non-AP transmitter TXOP holder 58. In a second BSS (BSS2) is seen a receiver AP 60, and two non-AP transmitters as shared TXOP participants 62 and 64. It will be noted that for simplicity of illustration, the NAV intervals are not shown.

This process requests the implementation of the shared TXOP initialization procedure 672.

The non-AP TXOP holder STA sends the Unicast TXOP access request trigger frame 674, 678 (with the Single BSS subfield of the User Info field set to 0) to each non-AP shared TXOP participant STAs in the shared TXOP holder BSS, and indicates the assigned RU (as indicated in the RU Allocation subfield of the User Info field together with the UL BW subfield of the Common Info field) and the corresponding Data Delay 676, 680 (as defined in the Data Delay subfield of the User Info field) to start the UL DATA transmission for each of them. Then, the non-AP TXOP holder STA sends a TXOP access scheduler trigger frame 682 (with the Single BSS subfield of the User Info field set to 0) to the associated AP and indicates the RUs assigned for the TXOP holder BSS (as indicated in the RU Allocation subfield of the User Info field together with the UL BW subfield of the Common Info field) and the updated Data Delay duration 686 (as set in the Data Delay subfield of the User Info field) for the shared TXOP participant BSS.

After the AP of the shared TXOP holder BSS receives a TXOP access scheduler trigger frame, it unicasts an OBSS-share trigger frame 684 to the other AP of the shared TXOP participant BSS, and indicates the updated Data Delay, the available frequency band and the MU-BA Delay for the transmission in the shared TXOP participant BSS.

The AP of the shared TXOP participant BSS receives the OBSS-share trigger frame, it allocates the RU for each non-AP shared TXOP participant STA based on the available frequency band. Then, it sends the Unicast TXOP access request trigger frame 688, 692 to each non-AP shared TXOP participant STA indicating the updated Data Delay 694 and the assigned RU.

After the requisite data delays 686, 680 and 676, the non-AP stations send UL DATA 694, 696 and 698 to the AP of their BSS. In the OBSS the non-AP TXOP participant STAs send UL DATA 700, 702 using the reserved RU after the corresponding Data Delay 694 since the reception of the TXOP access scheduler Trigger frame. The non-AP TXOP participant STA sends UL DATA to the associated AP in the assigned RU after the corresponding Data Delay indicated in the unicast TXOP access request trigger frame.

The AP of the shared TXOP holder BSS broadcasts an MU-BA frame 704 after receiving the UL DATA immediately. If the AP of the shared TXOP participant BSS receives UL DATA, it broadcasts MU-BA 706 after the MU-BA Delay 690 which references the time since the reception of the OBSS-share trigger frame.

Figure 34:
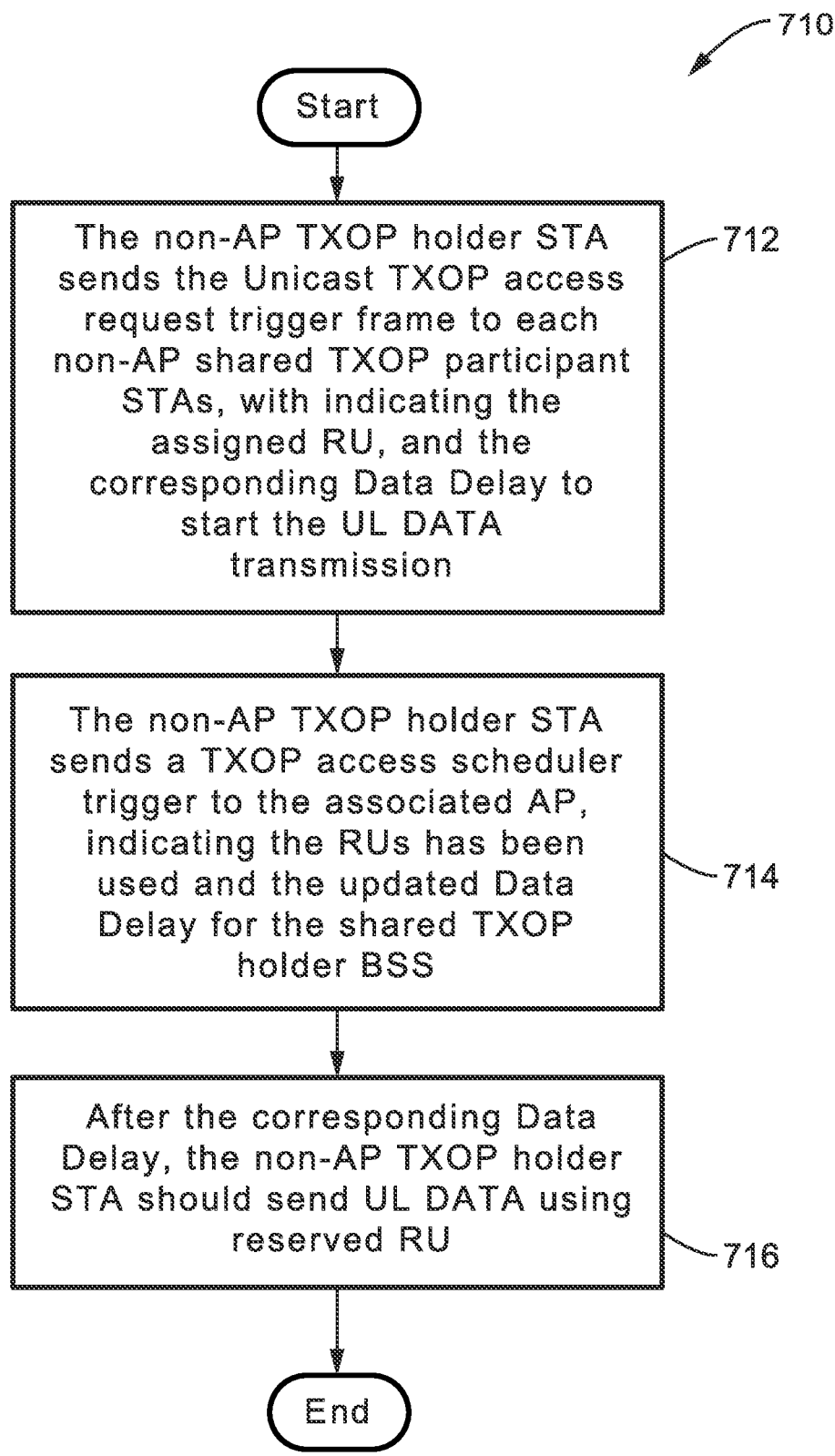
FIG. 34 is a flow diagram of a TXOP schedule and access stage with a unicast TXOP access request trigger and a time shift in the scheduler, which is processed on non-AP TXOP holder STA level, according to at least one embodiment of the present disclosure.

FIG. 34 illustrates an example embodiment 710 of a TXOP schedule and access stage having unicast TXOP access request trigger and time shifting in the scheduler, which is processed on the non-AP TXOP holder STA level.

The non-AP TXOP holder STA sends 712 the Unicast TXOP access request trigger frame to each non-AP shared TXOP participant STA indicating the assigned RU, and the corresponding Data Delay to start UL DATA transmissions.

Then, the non-AP TXOP holder STA sends 714 a TXOP access scheduler trigger frame to the associated AP and indicates the RUs that are to be used and the updated Data Delay for the shared TXOP holder BSS.

Block 716 is reached which awaits a Data Delay for the non-AP TXOP holder STA, as determined from the time since the TXOP access scheduler trigger frame was sent, after which the non-AP TXOP holder STA sends UL DATA using the reserved RU.

Figure 35:
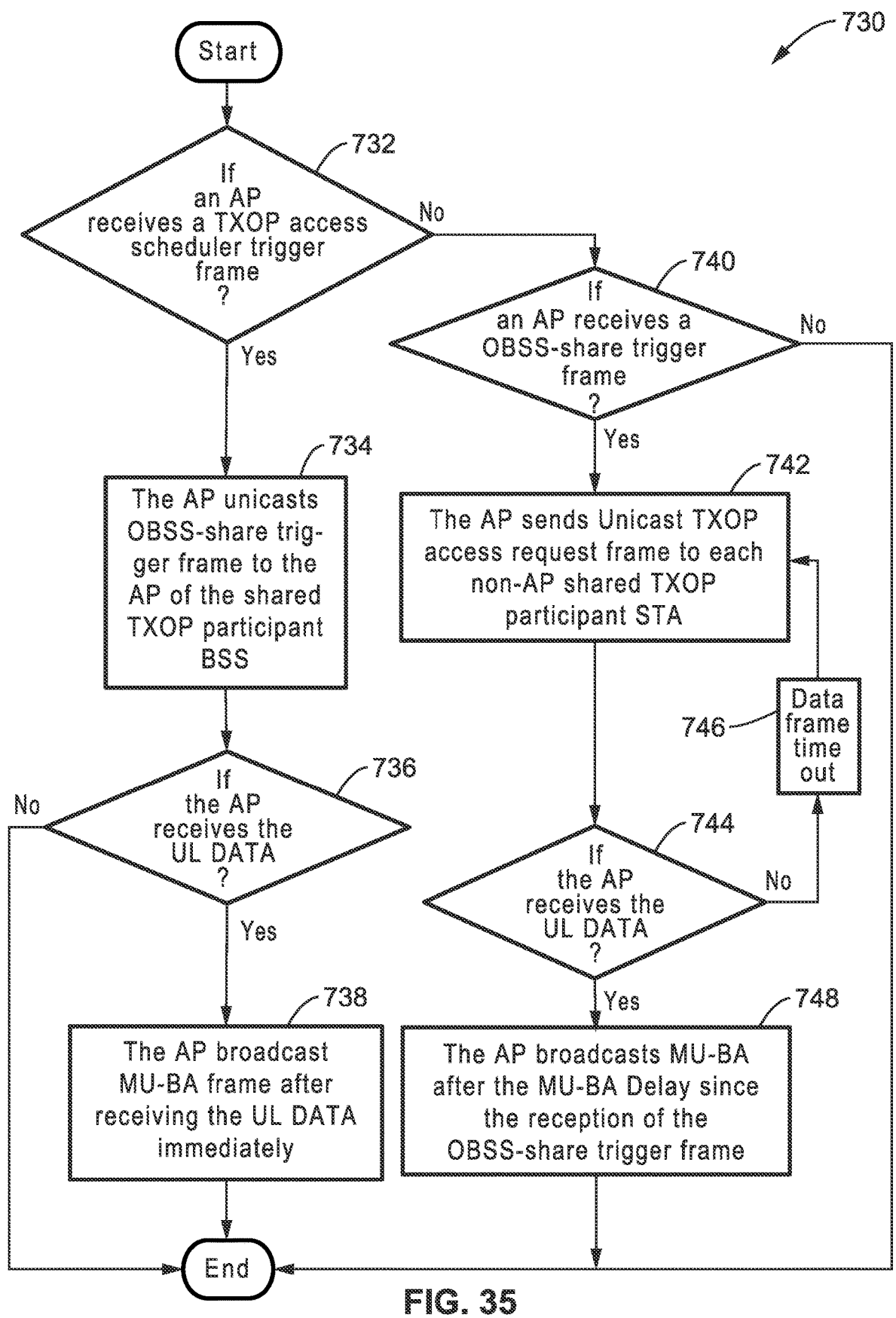
FIG. 35 is a flow diagram of a TXOP schedule and access stage with a unicast TXOP access request trigger and time shift in the scheduler, which is processed on the AP level, according to at least one embodiment of the present disclosure.

FIG. 35 illustrates an example embodiment 730 of a TXOP schedule and access stage having a unicast TXOP access request trigger and time shifting in the scheduler, which is processed at the AP level.

A check 732 is made to determine if a TXOP access scheduler trigger frame has been received. If the AP receives a TXOP access scheduler trigger frame, then it is known that this is the AP of shared TXOP holder BSS, and it unicasts 734 an OBSS-share trigger frame to the AP of the shared TXOP participant BSS, indicating the updated Data Delay, the available frequency band and the MU-BA Delay for the transmission in the shared TXOP participant BSS.

A check 736 is made to determine if UL DATA has been received. If the UL DATA is not received, then the process ends. Otherwise, after the UL DATA is received, then at block 738, the AP of the shared TXOP holder BSS broadcasts a MU-BA frame.

Returning to block 732, if the frame was not a TXOP access trigger frame, then execution moves to block 740 to determine if an OBSS-share trigger frame was received. If this OBSS-share trigger frame was not received, then the process ends.

Otherwise, after the AP of the shared TXOP participant BSS receives a OBSS-share trigger frame, block 742 is reached where the AP allocates the RU for each non-AP shared TXOP participant STA based on the available frequency band, and then send Unicast TXOP access request Trigger frame with indicating the updated Data Delay and the assigned RU for each non-AP shared TXOP participant STA.

A check 744 is made to determine if UL DATA has been received. If the UL DATA is not received within the requisite time period, then a data frame time out 746 occurs, and execution returns to block 742 for another Unicasting of the TXOP access request frame.

Otherwise, if the AP of the shared TXOP participant BSS receives UL DATA, it broadcasts 748 MU-BA after the MU-BA Delay since the reception of the OBSS-share trigger frame.

Figure 36:
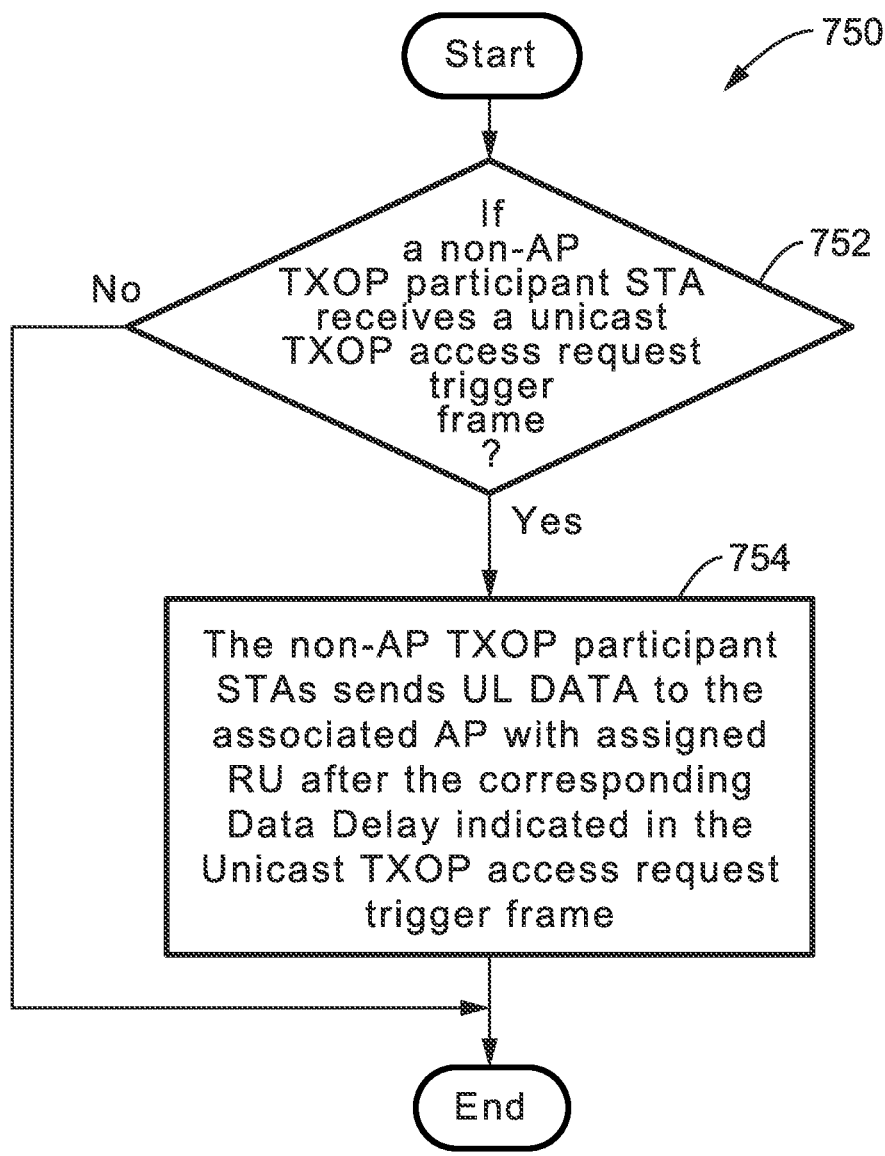
FIG. 36 is a flow diagram of a TXOP schedule and access stage with a unicast TXOP access request trigger and time shift in the scheduler, which is processed at the non-AP TXOP participant STA level, according to at least one embodiment of the present disclosure.

FIG. 36 illustrates an example embodiment 750 of a TXOP schedule and access stage having unicast TXOP access request trigger and time shifting in the scheduler, which is processed at the non-AP TXOP participant STA level.

A check 752 determines if a non-AP TXOP participant STA has received a unicast TXOP access request trigger frame. If the non-AP TXOP participant STA has received the unicast TXOP access request trigger frame, then it sends 754 UL DATA to the associated AP with assigned RU after the corresponding Data Delay indicated in the unicast TXOP access request trigger frame.

7.3.5. TXOP Schedule and Access Stage w/Unicast TXOP Access Request Trigger and Time Shift in Scheduler (Triggered by AP)

Figure 37:
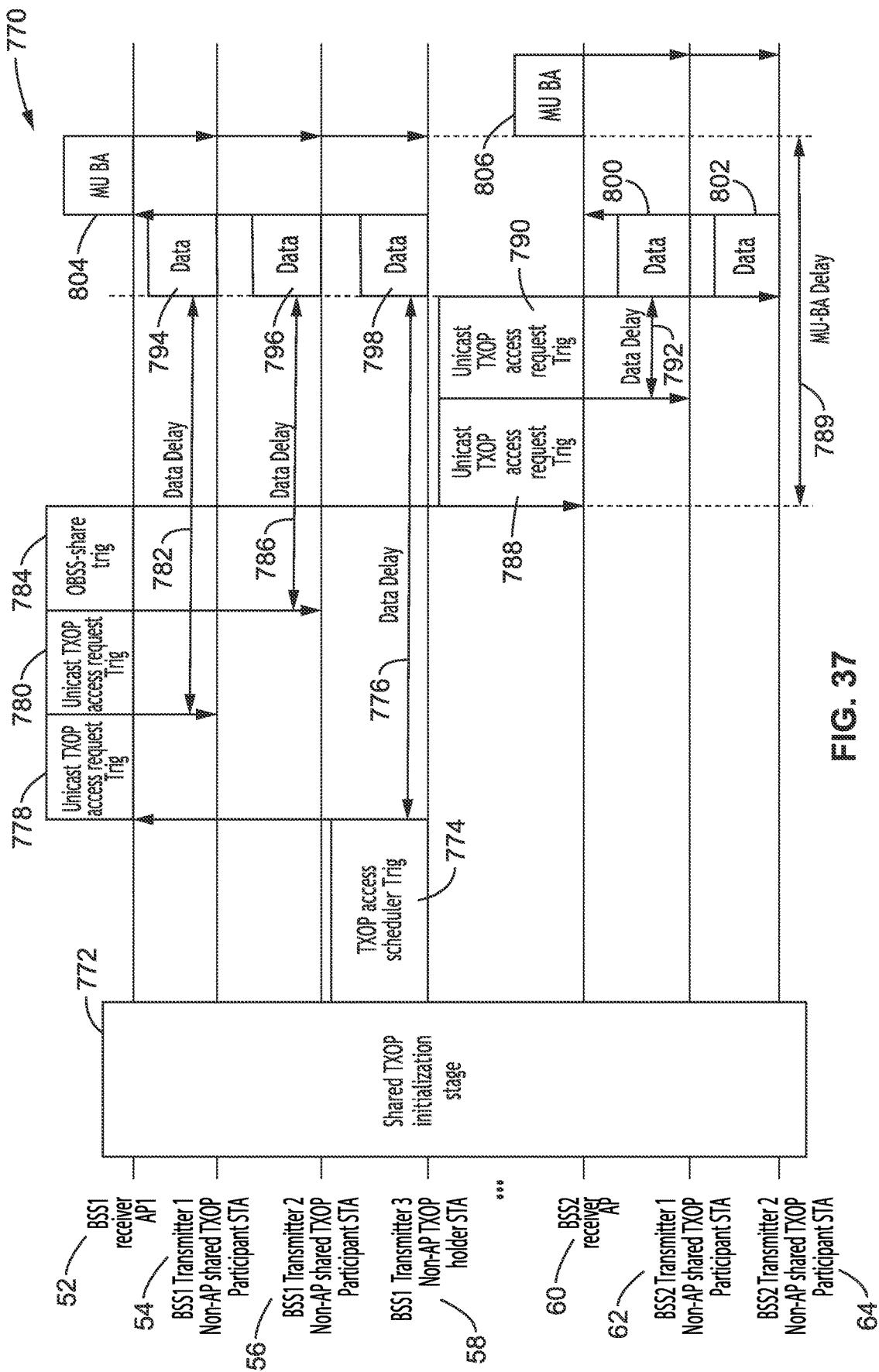
FIG. 37 is a communication sequence diagram of a unicast TXOP access request trigger (triggered by AP) and a time shift in the scheduler, according to at least one embodiment of the present disclosure.

FIG. 37 illustrates an example embodiment 770 of a TXOP schedule and access stage having unicast TXOP access request trigger (triggered by AP) and time shifting in the scheduler. As in prior example interactions the figure shows a first BSS (BSS1) having a receiver AP1 52, two non-AP transmitters as shared TXOP participants 54, 56, and a non-AP transmitter TXOP holder 58. In a second BSS (BSS2) is seen a receiver AP 60, and two non-AP transmitters as shared TXOP participants 62 and 64. It will be noted that for simplicity of illustration, the NAV intervals are not shown.

This process requests the implementation of the shared TXOP initialization procedure 772. The non-AP TXOP holder STA sends a TXOP access scheduler trigger frame 774 to the associated AP and indicates the reserved RU for itself and the assigned RU and the corresponding Data Delay 776 for each non-AP shared TXOP participant STA in the TXOP holder BSS.

Once the AP of the shared TXOP holder BSS receives the TXOP access scheduler trigger frame, it sends a Unicast TXOP access request trigger frame 778, 780 to each non-AP shared TXOP participant STA indicating the assigned RU and the corresponding Data Delay 782, 786 to start UL DATA transmission. Then, it unicasts an OBSS-share trigger frame 784 to the AP of the shared TXOP participant BSS, and indicates an updated Data Delay 776, the available frequency band and the MU-BA Delay for the transmission in the shared TXOP participant BSS.

After the AP of the shared TXOP participant BSS receives an OBSS-share trigger frame, it allocates the RU for each non-AP shared TXOP participant STA of the shared TXOP participant BSS based on the available frequency band. Then the AP sends a Unicast TXOP access request Trigger frame 788, 790 to each non-AP shared TXOP participant STA indicating the corresponding updated Data Delay 792 and the assigned RU.

The non-AP TXOP holder STA sends UL DATA 798 using the reserved RU after the corresponding Data Delay since the reception of the TXOP access scheduler Trigger frame. The non-AP TXOP participant STAs send UL DATA 794, 796, 800, 802 to the associated APs with assigned RU after the corresponding Data Delay indicated in the unicast TXOP access request trigger frame.

The AP of the shared TXOP holder BSS broadcasts a MU-BA frame 804 after receiving the UL DATA. If the AP of the shared TXOP participant BSS receives UL DATA, it also broadcasts MU-BA 806 after the MU-BA Delay 789, registered from the time since reception of the OBSS-share trigger frame.

Figure 38:
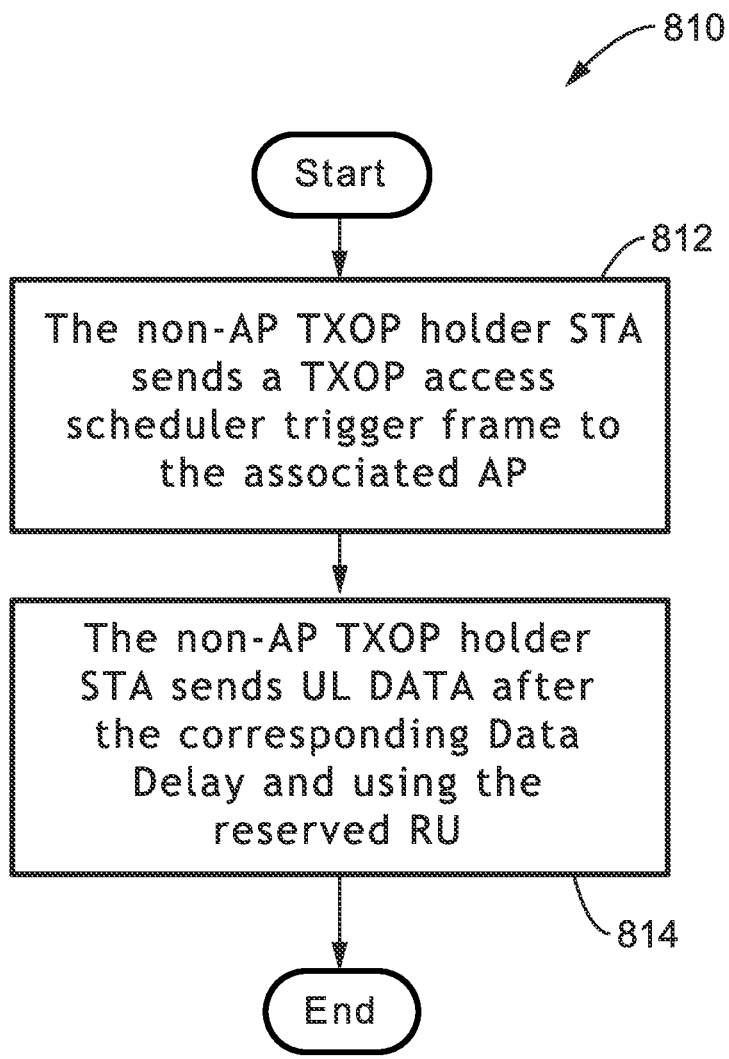
FIG. 38 is a flow diagram of a TXOP schedule and access stage with a unicast TXOP access request trigger (triggered by AP) and a time shift in the scheduler, which is processed at the non-AP TXOP holder STA level, according to at least one embodiment of the present disclosure.

FIG. 38 illustrates an example embodiment 810 of a TXOP schedule and access stage having a unicast TXOP access request trigger (triggered by AP) and time shifting in the scheduler, which is processed at the non-AP TXOP holder STA level. The non-AP TXOP holder STA sends 812 a TXOP access scheduler trigger frame to the associated AP indicating the reserved RU for itself and the assigned RU and the corresponding Data Delay for each non-AP shared TXOP participant STA in the TXOP holder BSS. The non-AP TXOP holder STA then sends 814 UL DATA after the corresponding Data Delay and using the reserved RU.

Figure 39:
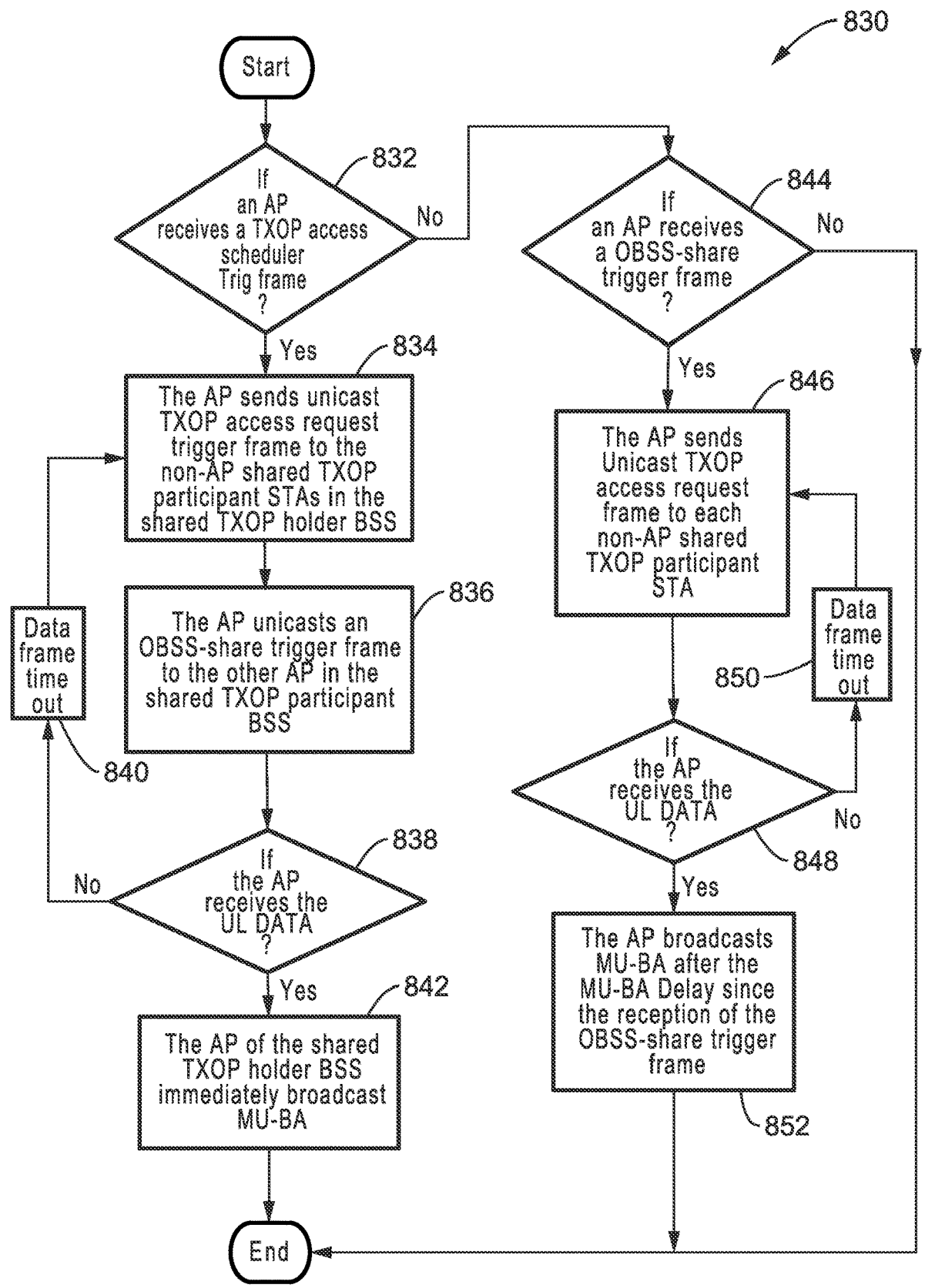
FIG. 39 is a flow diagram of a TXOP schedule and access stage with unicast TXOP access request trigger (triggered by the AP) and time shifting in the scheduler, which is processed on the AP level, according to at least one embodiment of the present disclosure.

FIG. 39 illustrates an example embodiment 830 of a TXOP schedule and access stage with a unicast TXOP access request trigger (triggered by the AP) and time shifting in the scheduler, which is processed at the AP level.

A check 832 determines if a TXOP access scheduler trigger frame has been received. If a TXOP access scheduler trigger frame has been received, then this is the AP of the shared TXOP holder BSS, and in block 834 it sends the Unicast TXOP access request trigger frame to each non-AP shared TXOP participant STA indicating the assigned RU and the corresponding Data Delay to start the UL DATA transmission.

Then it unicasts 836 an OBSS-share trigger frame to the AP of the shared TXOP participant BSS, indicating the updated Data Delay, the available frequency band and the MU-BA Delay for the transmission in the shared TXOP participant BSS.

A check 838 determines if UL DATA has been received. If the AP of the shared TXOP holder BSS does not receive the UL DATA in the requisite time period, then a data frame time out 840 occurs and the AP preferably retransmits the unicast TXOP access request trigger frame. Otherwise, if the AP of the shared TXOP holder BSS received the UL DATA, then at block 842 it immediately broadcasts a MU-BA frame.

Returning to block 832, if it is determined that frame received by the AP was not a TXOP access schedule trigger frame, then execution reaches block 844 which checks if an OBSS-share trigger frame was received. If an OBSS-share trigger frame was received, then the AP is for the shared TXOP participant BSS and at block 846 it allocates the RU for each non-AP shared TXOP participant STA based on the available frequency band, and then sends a Unicast TXOP access request Trigger frame indicating the updated Data Delay and the assigned RU for each non-AP shared TXOP participant STA.

A check 848 determines if UL DATA has been received. If the UL DATA is not received within the required time period, then a data time out 850 occurs, and the AP retransmits the unicast TXOP access request trigger frame, such as seen by returning to block 846. Otherwise, if the AP of the shared TXOP participant BSS receives UL DATA it broadcasts an MU-BA 852 after the MU-BA Delay since the reception of the OBSS-share trigger frame.

It will be noted that the flow diagram of the TXOP schedule and access stage with unicast TXOP access request trigger (triggered by the AP) and time shifting in the scheduler, which is processed on non AP shared TXOP participant STA level is that shown in FIG. 36.

7.3.6. TXOP Schedule and Access Stage w/Broadcast TXOP Access Request Trigger and Time Shift in Scheduler (Triggered by Non-AP TXOP holder)

Figure 40:
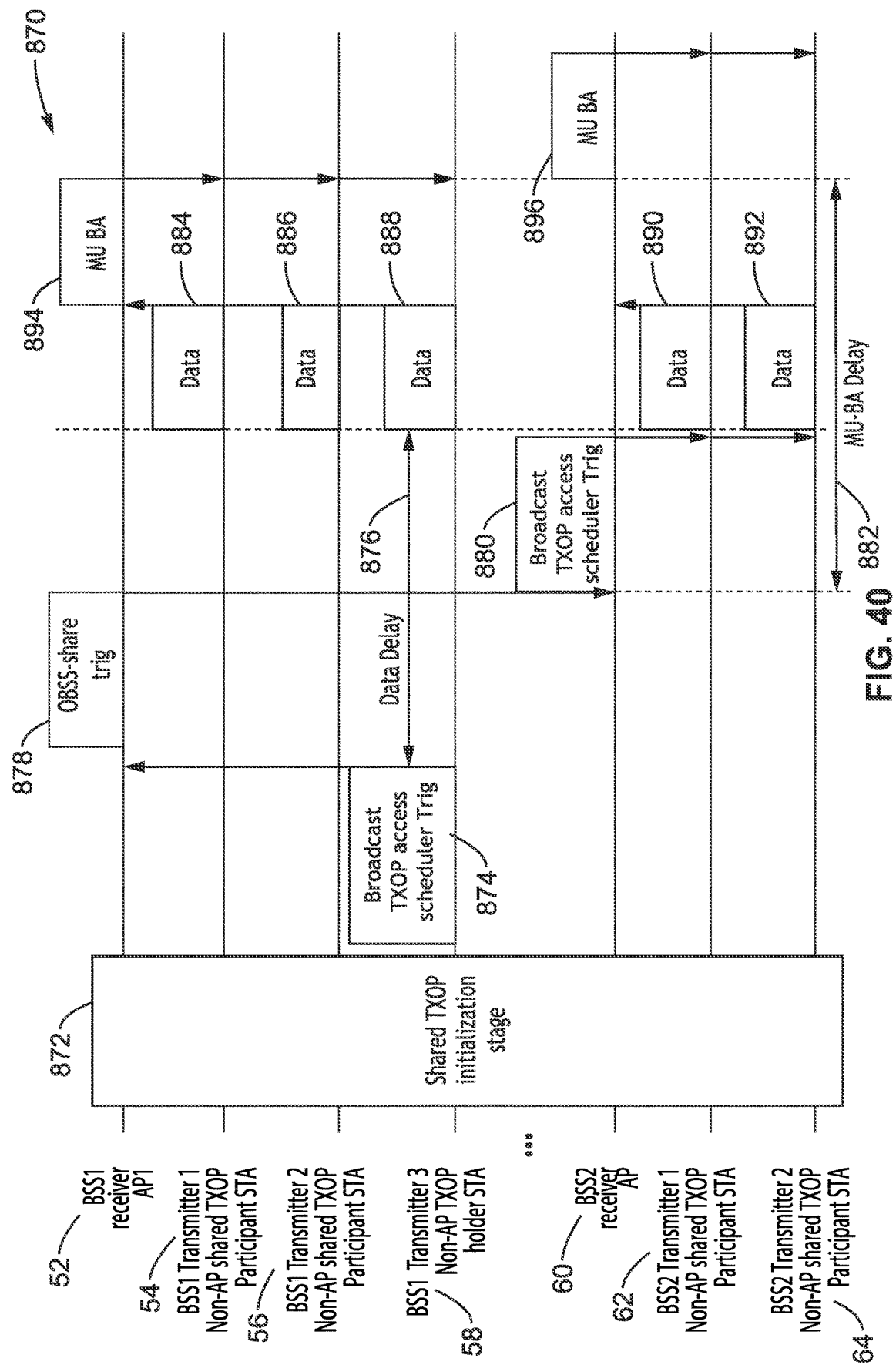
FIG. 40 is a communication sequence diagram of a TXOP schedule and access stage with a broadcast TXOP access request trigger (by the non-AP TXOP holder) and time shifting in the scheduler, according to at least one embodiment of the present disclosure.

FIG. 40 illustrates an example embodiment 870 of a frame exchange in the TXOP schedule and access stage having a broadcast TXOP access request trigger (by the non-AP TXOP holder) and time shifting in the scheduler. As in prior example interactions the figure shows a first BSS (BSS1) having a receiver AP1 52, two non-AP transmitters as shared TXOP participants 54, 56, and a non-AP transmitter TXOP holder 58. In a second BSS (BSS2) is seen a receiver AP 60, and two non-AP transmitters as shared TXOP participants 62 and 64. It will be noted that for simplicity of illustration, the NAV intervals are not shown.

This process requests the implementation of the shared TXOP initialization procedure 872. The non-AP TXOP holder STA sends a broadcast TXOP access request trigger frame 874 (with the Single BSS subfield of the User Info field set to 0), which indicates the reserved RU for itself, the scheduled RU (as indicated in the RU Allocation subfield of the User Info field together with the UL BW subfield of the Common Info field) and the corresponding Data Delay 876 (as defined in the Data Delay subfield of the User Info field) for each non-AP shared TXOP participant STA (as indicated by the AID subfield of the User Info Field) in the TXOP holder BSS.

Once the AP of the shared TXOP holder BSS receives a broadcast TXOP access request trigger frame, it unicasts an OBSS-share trigger frame 878 to the other AP in the TXOP participant BSS, and indicates the updated Data Delay, the available frequency band and the MU-BA Delay for the transmission in the shared TXOP participant BSS.

After the AP of the shared TXOP participant BSS receives a OBSS-share trigger frame, it allocates the RU for each non-AP shared TXOP participant STA based on the available frequency band, and then sends a broadcast TXOP access request trigger frame 880 indicating the updated Data Delay and the assigned RU for each non-AP shared TXOP participant STA in the shared TXOP participant BSS.

The non-AP TXOP holder STA sends UL DATA 888 after the corresponding Data Delay from the reception of the broadcast TXOP access request trigger frame and using the reserved RU. The non-AP TXOP participant STAs send UL DATA 884, 886, 890, 892 to their associated APs with assigned RU after the corresponding Data Delay indicated in the Broadcast TXOP access request trigger frame.

The AP of the shared TXOP holder BSS broadcasts a MU-BA frame 894 after receiving the UL DATA. If the AP of the shared TXOP participant BSS receives UL DATA, it broadcasts MU-BA 896 after the MU-BA Delay 882 since the reception of the OBSS-share trigger frame.

Figure 41:
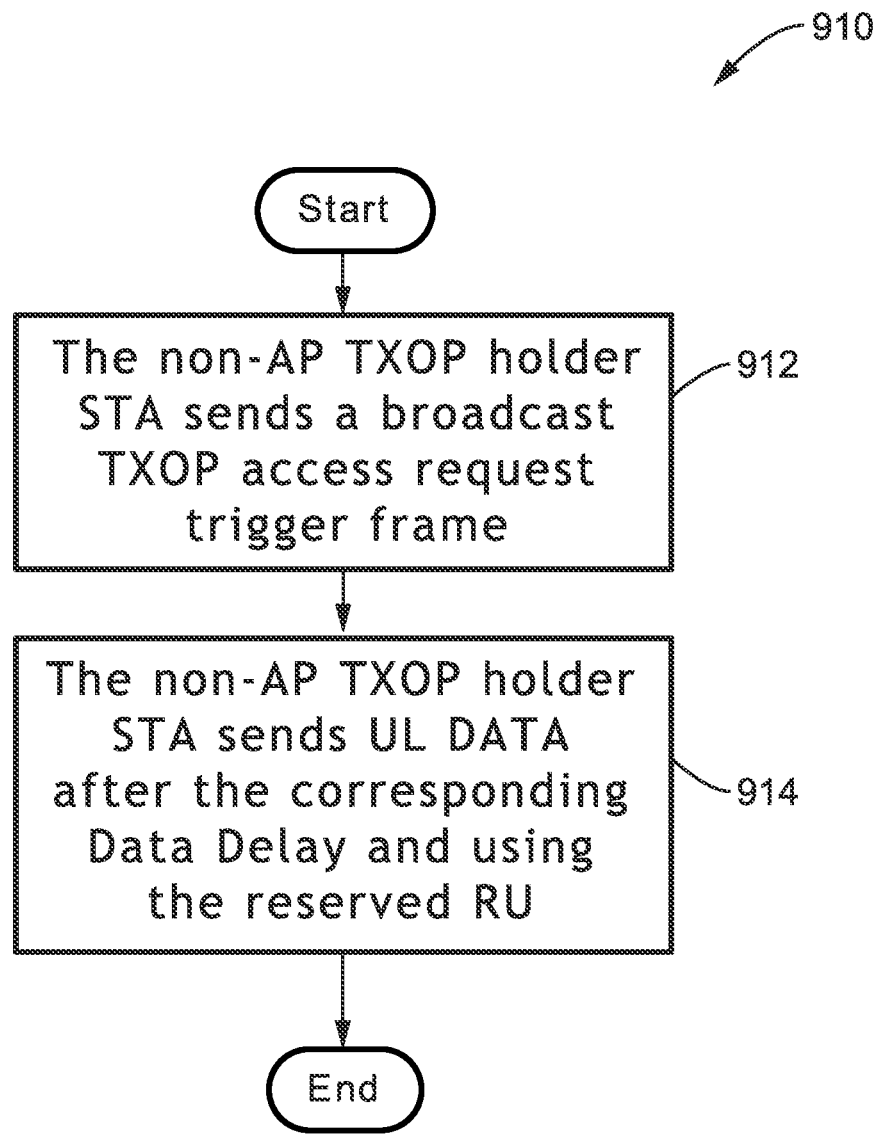
FIG. 41 is a flow diagram of a TXOP schedule and access stage with broadcast TXOP access request trigger (by the non-AP TXOP holder) and time shifting in the scheduler, which is processed on non-AP TXOP holder STA level, according to at least one embodiment of the present disclosure.

FIG. 41 illustrates an example embodiment 910 of a TXOP schedule and access stage with a broadcast TXOP access request trigger (by the non-AP TXOP holder) and time shifting in the scheduler, which is processed on non-AP TXOP holder STA level.

The non-AP TXOP holder STA sends 912 a broadcast TXOP access request trigger frame, which indicates the reserved RU for itself, the scheduled RU and the corresponding Data Delay for each non-AP shared TXOP participant STA in the TXOP holder BSS.

The non-AP TXOP holder STA then sends 914 UL DATA after the corresponding Data Delay from the reception of the broadcast TXOP access request trigger frame and using the reserved RU.

Figure 42:
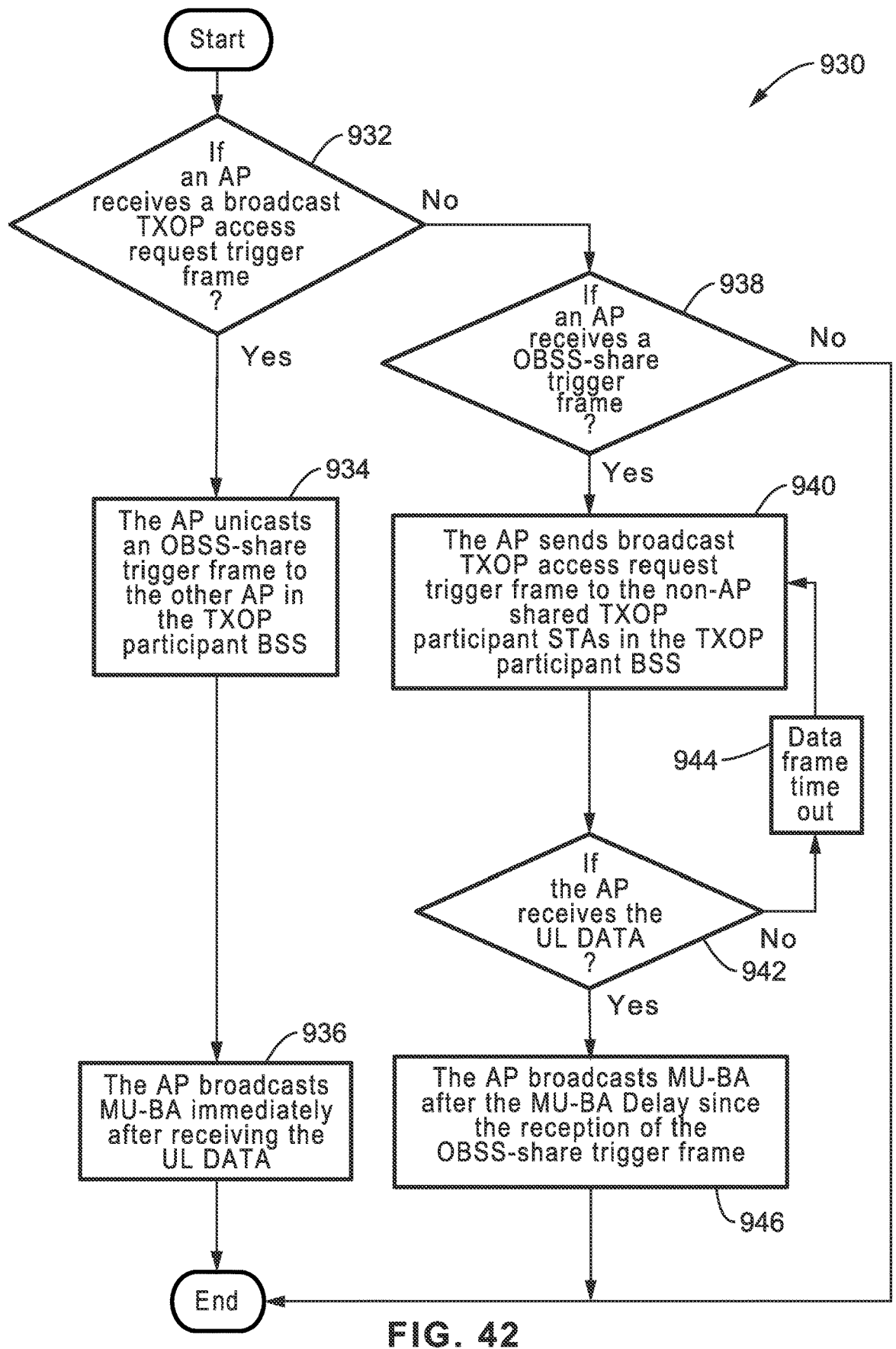
FIG. 42 is a flow diagram of a TXOP schedule and access stage with a broadcast TXOP access request trigger (by the non-AP TXOP holder) and time shifting in the scheduler, which is processed on the AP level, according to at least one embodiment of the present disclosure.

FIG. 42 illustrates an example embodiment 930 of a TXOP schedule and access stage with a broadcast TXOP access request trigger (by the non-AP TXOP holder) and time shifting in the scheduler, which is processed at the AP level.

A received frame is checked 932 to determine if it is a broadcast TXOP access request trigger frame. If it is a broadcast TXOP access request trigger frame, then this is the AP of the shared TXOP holder BSS and the AP unicasts 934 an OBSS-share trigger frame to the other AP in the TXOP participant BSS, and indicates the updated Data Delay, the available frequency band and the MU-BA Delay for the transmission in the shared TXOP participant BSS. The AP of the shared TXOP holder BSS broadcasts 936 a MU-BA frame after receiving the UL DATA.

Returning to block 932, if the TXOP access request trigger frame is not received, then the frame is checked in block 938 to determine if the frame is an OBSS-share trigger frame. If it is not, then this processing is complete. Otherwise, if the frame is an OBSS-share trigger frame, then this AP is an AP of the shared TXOP participant BSS which receives an OBSS-share trigger frame, it allocates the RU for each non-AP shared TXOP participant STA based on the available frequency band, and then sends 940 a broadcast TXOP access request trigger frame including an indication of the updated Data Delay and the assigned RU for each non-AP shared TXOP participant STA in the shared TXOP participant BSS.

A check 942 determines if UL DATA has been received. If the data is not received in the requisite time period then a data frame time out 944 occurs and the TXOP access request trigger frame is rebroadcast, such as by returning to block 940 as shown.

If the AP of the shared TXOP participant BSS receives UL DATA, then the AP broadcasts 946 MU-BA after the MU-BA Delay since the reception of the OBSS-share trigger frame.

Figure 43:
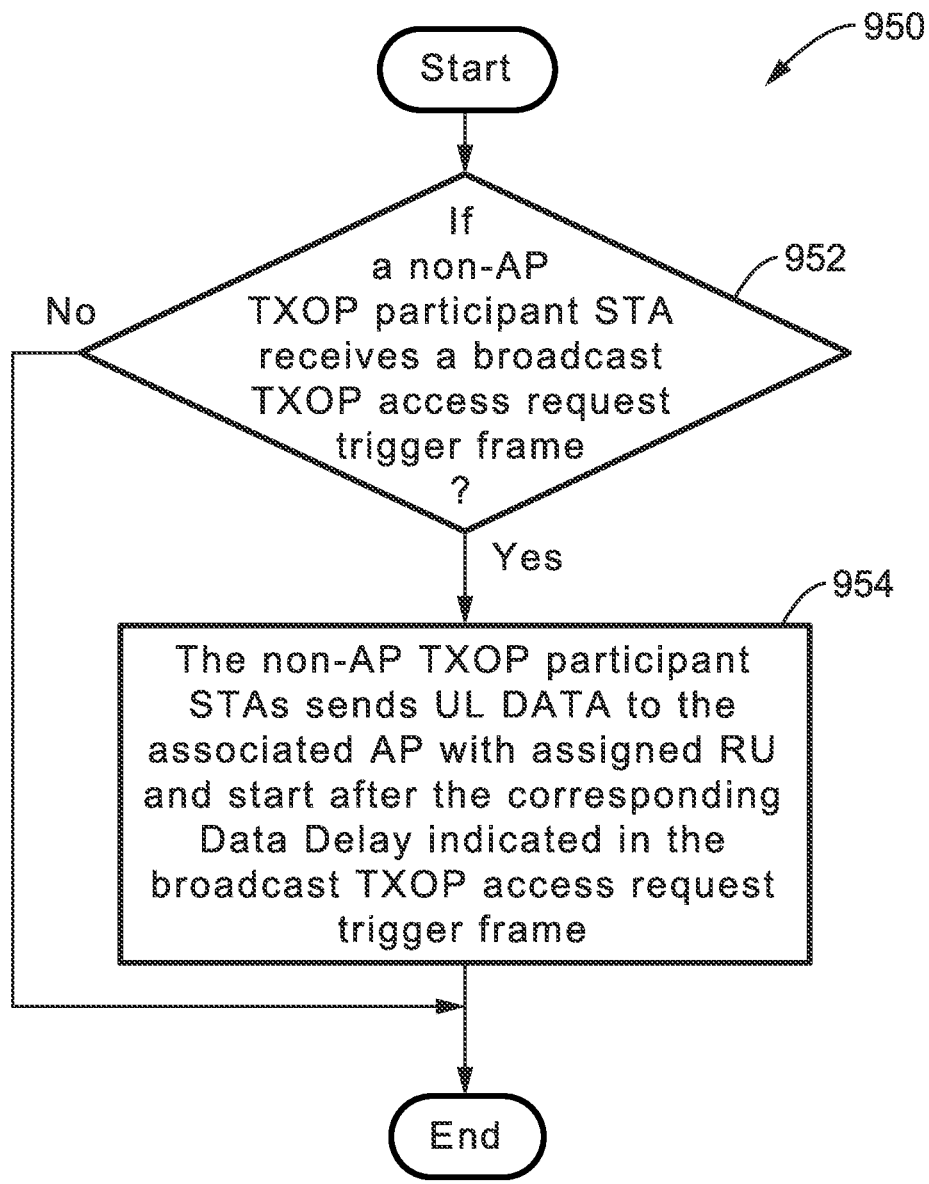
FIG. 43 is a flow diagram of a TXOP schedule and access stage with a broadcast TXOP access request trigger (by the non-AP TXOP holder) and time shifting in the scheduler, which is processed at the non-AP TXOP participant STA level, according to at least one embodiment of the present disclosure.

FIG. 43 illustrates an example embodiment 950 of a TXOP schedule and access stage with broadcast TXOP access request trigger (by the non-AP TXOP holder) and time shifting in the scheduler, which is processed at the non-AP TXOP participant STA level.

A check is made 952 to determine if a TXOP access request trigger frame is received by the non-AP TXOP participant STA. If the condition is met, then at block 954 the non-AP TXOP participant STA sends UL DATA to the associated AP with assigned RU to start after the corresponding Data Delay indicated in the broadcast TXOP access request trigger frame.

7.3.7. TXOP Schedule and Access Stage w/Broadcast TXOP Access Request Trigger and Time Shift in Scheduler (Triggered by AP)

Figure 44:
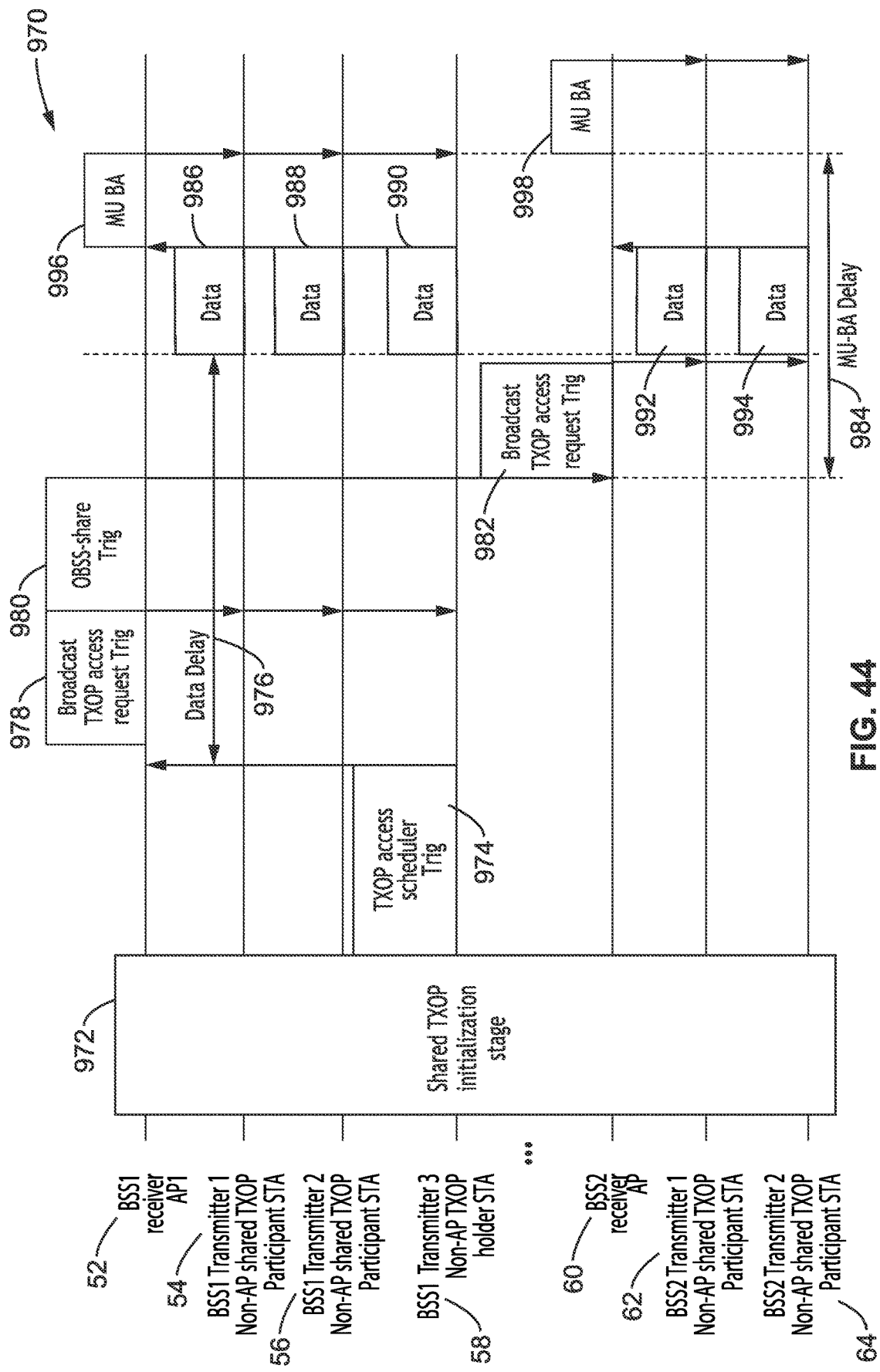
FIG. 44 is a communication sequence diagram of a frame exchange process in the TXOP schedule and access stage with a broadcast TXOP access request trigger (by AP) and time shift in the scheduler, according to at least one embodiment of the present disclosure.

FIG. 44 illustrates an example embodiment 970 of a frame exchange process in the TXOP schedule and access stage having a broadcast TXOP access request trigger (by AP) and time shifting in the scheduler. As in prior example interactions the figure shows a first BSS (BSS1) having a receiver AP1 52, two non-AP transmitters as shared TXOP participants 54, 56, and a non-AP transmitter TXOP holder 58. In a second BSS (BSS2) is seen a receiver AP 60, and two non-AP transmitters as shared TXOP participants 62 and 64. It will be noted that for simplicity of illustration, the NAV intervals are not shown.

This process requests the implementation of the shared TXOP initialization procedure 972.

The non-AP TXOP holder STA sends a TXOP access scheduler trigger frame 974 (with the Single BSS subfield of the User Info field set to 0) to the associated AP with indicating the reserved RU for itself and the assigned RU (as indicated in the RU Allocation subfield of the User Info field together with the UL BW subfield of the Common Info field) and the corresponding Data Delay 976 (as defined in the Data Delay subfield of the User Info field) for each non-AP shared TXOP participant STA (as indicated by the AID subfield of the User Info Field) in the TXOP holder BSS.

Once the AP of the shared TXOP holder BSS receives a TXOP access scheduler trigger frame, it sends a broadcast TXOP access request trigger frame 978 (with the Single BSS subfield of the User Info field set to 0) that indicating the updated Data Delay (as defined in the Data Delay subfield of the User Info field) and the assigned RU (as indicated in the RU Allocation subfield of the User Info field together with the UL BW subfield of the Common Info field) for each non-AP shared TXOP participant STA in the shared TXOP holder BSS. Then, it unicasts an OBSS-share trigger frame 980 to the other AP in the TXOP participant BSS, including an indication of the updated Data Delay, the available frequency band and the MU-BA Delay 984 for the transmission in the shared TXOP participant BSS.

After the AP of the shared TXOP participant BSS receives a OBSS-share trigger frame, it allocates the RU for each non-AP shared TXOP participant STA based on the available frequency band, and then sends a broadcast TXOP access request trigger frame 982 indicating the updated Data Delay and the assigned RU for each non-AP shared TXOP participant STA in the shared TXOP participant BSS.

The non-AP TXOP holder STA sends UL DATA 990 after the corresponding Data Delay from the reception of the broadcast TXOP access request trigger frame and using the reserved RU. The non-AP TXOP participant STAs send UL DATA 986, 988, 992, 994 to the associated APs with assigned RU after the corresponding Data Delay indicated in the Broadcast TXOP access request trigger frame.

The AP of the shared TXOP holder BSS broadcasts a MU-BA frame 996 after receiving the UL DATA. If the AP of the shared TXOP participant BSS receives UL DATA, it also broadcasts a MU-BA frame 998 after the MU-BA Delay since the reception of the OBSS-share trigger frame.

Figure 45:
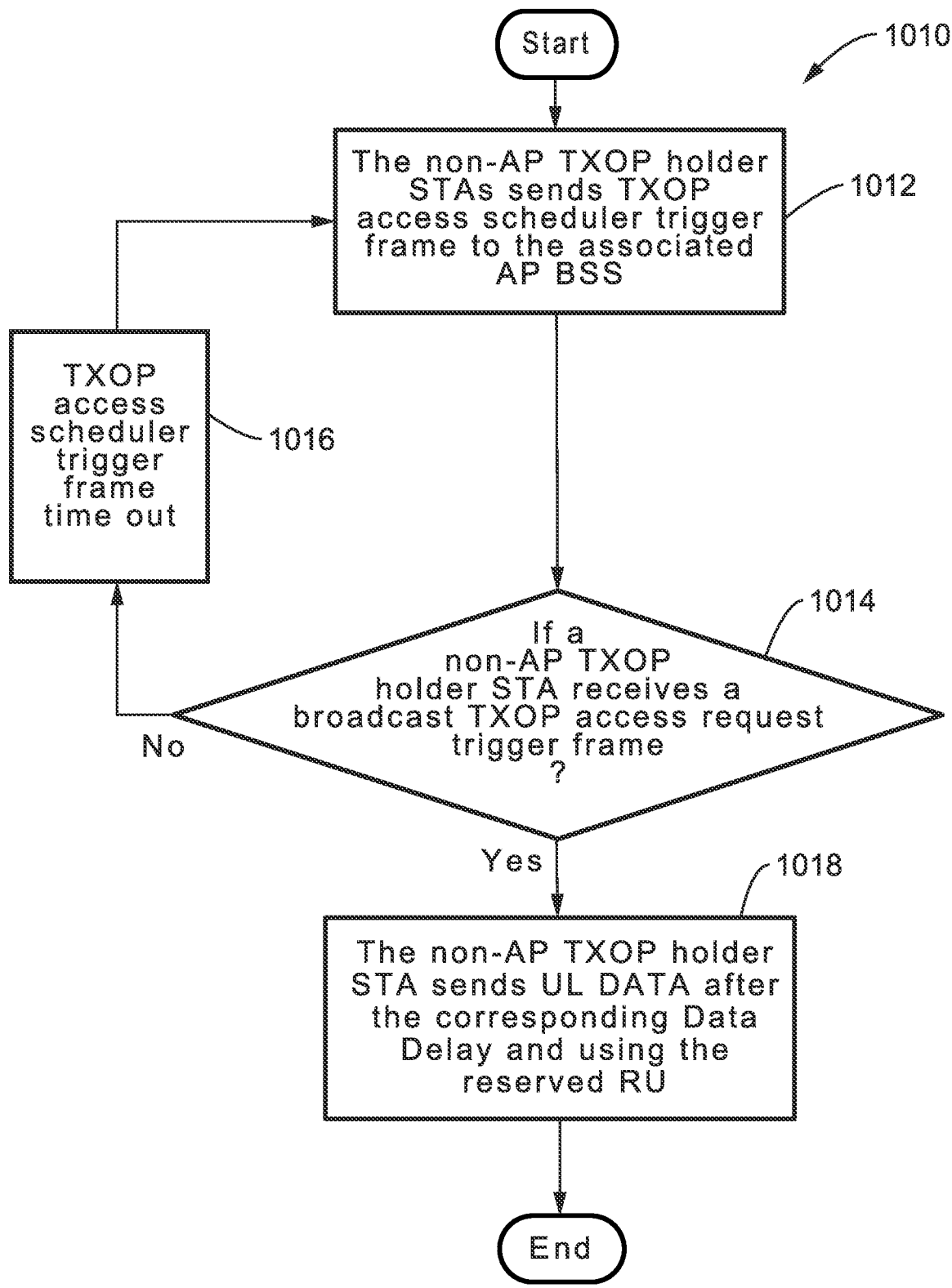
FIG. 45 is a flow diagram of a TXOP schedule and access stage with broadcast TXOP access request trigger (by the AP) and time shifting in the scheduler, which is processed on non-AP TXOP holder STA level, according to at least one embodiment of the present disclosure.

FIG. 45 illustrates an example embodiment 1010 of a TXOP schedule and access stage having a broadcast TXOP access request trigger (by the AP) with time shifting in the scheduler, which is processed at the non-AP TXOP holder STA level.

The non-AP TXOP holder STA sends 1012 a TXOP access scheduler trigger frame to the associated AP indicating the reserved RU for itself and the assigned RU and the corresponding Data Delay for each non-AP shared TXOP participant STA in the TXOP holder BSS.

Check 1014 determines if a broadcast TXOP access request trigger frame has been received by this non-AP TXOP holder STA. If the trigger frame has not been received within the time out interval, then a timeout 1016 occurs, after which the TXOP access scheduler trigger frame is resent, such as seen in block 1012.

If the broadcast TXOP access request trigger frame has been received, then at block 1018 the non-AP TXOP holder STA sends UL DATA after the corresponding Data Delay which is determined from the reception of the broadcast TXOP access request trigger frame to the using of the reserved RU.

Figure 46:
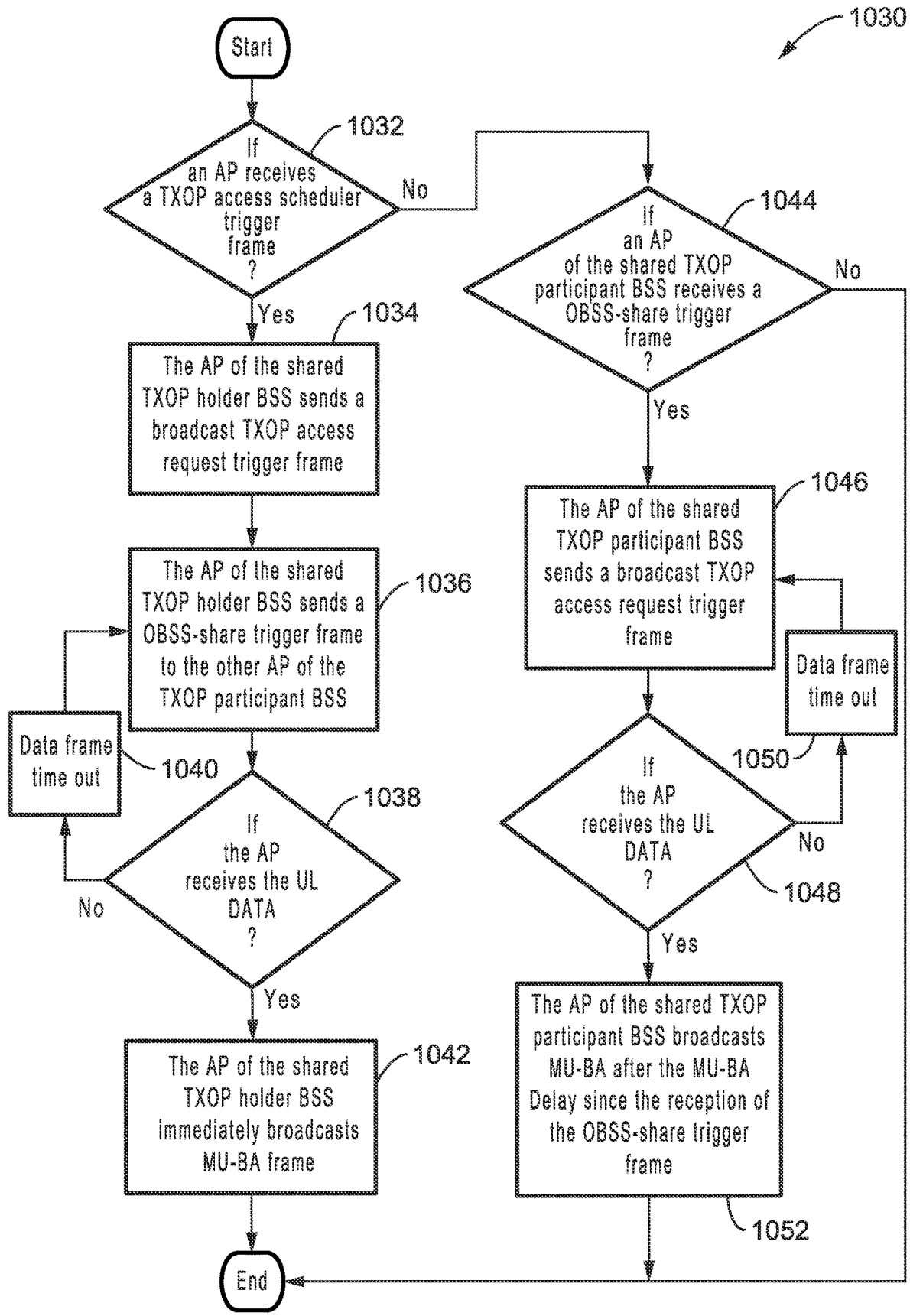
FIG. 46 is a flow diagram of a TXOP schedule and access stage with a broadcast TXOP access request trigger (by the AP) and time shifting in the scheduler, which is processed at the AP level, according to at least one embodiment of the present disclosure.

FIG. 46 illustrates an example embodiment 1030 of a TXOP schedule and access stage having a broadcast TXOP access request trigger (by the AP) and performing time shifting in the scheduler, which is processed at the AP level.

A check 1032 determines if a TXOP access scheduler trigger frame has been received by the AP. If the condition is met, then this AP is the AP of the shared TXOP holder BSS which sends 1034 a broadcast TXOP access request trigger frame indicating an updated Data Delay and the assigned RU for each non-AP shared TXOP participant STA in the shared TXOP holder BSS.

Then the AP of the shared TXOP holder BSS unicasts 1036 an OBSS-share trigger frame to the other AP in the TXOP participant BSS, and indicates an updated Data Delay, available frequency band and the MU-BA Delay for transmission in the shared TXOP participant BSS.

A check 1038 determines if UL DATA has been received. If UL DATA has not been received during the time out interval, then a data frame time out 1040 occurs and the AP should retransmit 1036 the broadcast TXOP access request trigger frame. If the condition at block 1038 is met with the AP of the shared TXOP holder BSS having timely received UL DATA, then the AP broadcasts 1042 a MU-BA frame immediately.

Returning to block 1032 if the frame received is not a TXOP access scheduler frame, then at block 1044 a check is made to determine if the frame is an OBSS-share trigger frame. If the condition is not met then the processing ends. Otherwise, the AP has received an OBSS-share trigger frame and thus it is the AP of the shared TXOP participant BSS, and at block 1046 it allocates the RU for each non-AP shared TXOP participant STA based on the available frequency band, and then sends a broadcast TXOP access request trigger frame indicating an updated Data Delay and assigned RU for each non-AP shared TXOP participant STA in the shared TXOP participant BSS.

A check 1048 determines if UL DATA has been received. If the UL DATA is not received during the time out interval, then a data frame time out 1050 occurs and processing returns to block 1046 to rebroadcast the TXOP access request trigger frame. Otherwise, if the AP of the shared TXOP participant BSS receives UL DATA, it broadcasts 1052 MU-BA after the MU-BA Delay since the reception of the OBSS-share trigger frame.

It should be appreciated that the flow diagram of the TXOP schedule and access stage with broadcast TXOP access request trigger (by AP) and time shifting in the scheduler, is processed on non-AP shared TXOP participant STA level is same as the one shown in FIG. 43.

7.4. Overview of Semi-Static Scenario

In this scenario, two stages are designed including the shared TXOP setup stage and the TXOP schedule and access stage.

In the shared TXOP setup stage, each non-AP STA exchanges the share offer/request information of the shared TXOP with the AP. In addition to this, each potential non-AP TXOP holder STA also announces the RU allocation for other non-AP shared TXOP participant STAs and exchanges this allocation configuration information with other non-AP STAs through the coordination of the associated AP.

The semi-static configuration is performed at the beginning stage, and allows bypassing the complex scheduling process in the TXOP schedule and access stage. The semi-static configuration can be reset or repeat at anytime. The non-AP STAs directly access the TXOP channel with assigned RUs as configured in the shared TXOP setup stage. In the semi-static scenario, the APs of different BSSs are involved as the coordinator.

In the semi-static scenario, the described protocol has two stages: (1) a shared TXOP setup stage which includes share offer/request setup substage and TXOP holder configuration setup substage, and (2) a TXOP access stage which can be achieved by TXOP schedule and access stage with time shifting or TXOP schedule and access stage on scheduled bands.

7.4.1. Share Offer/Request Setup Substage of Semi-Static Protocol

Figure 47:
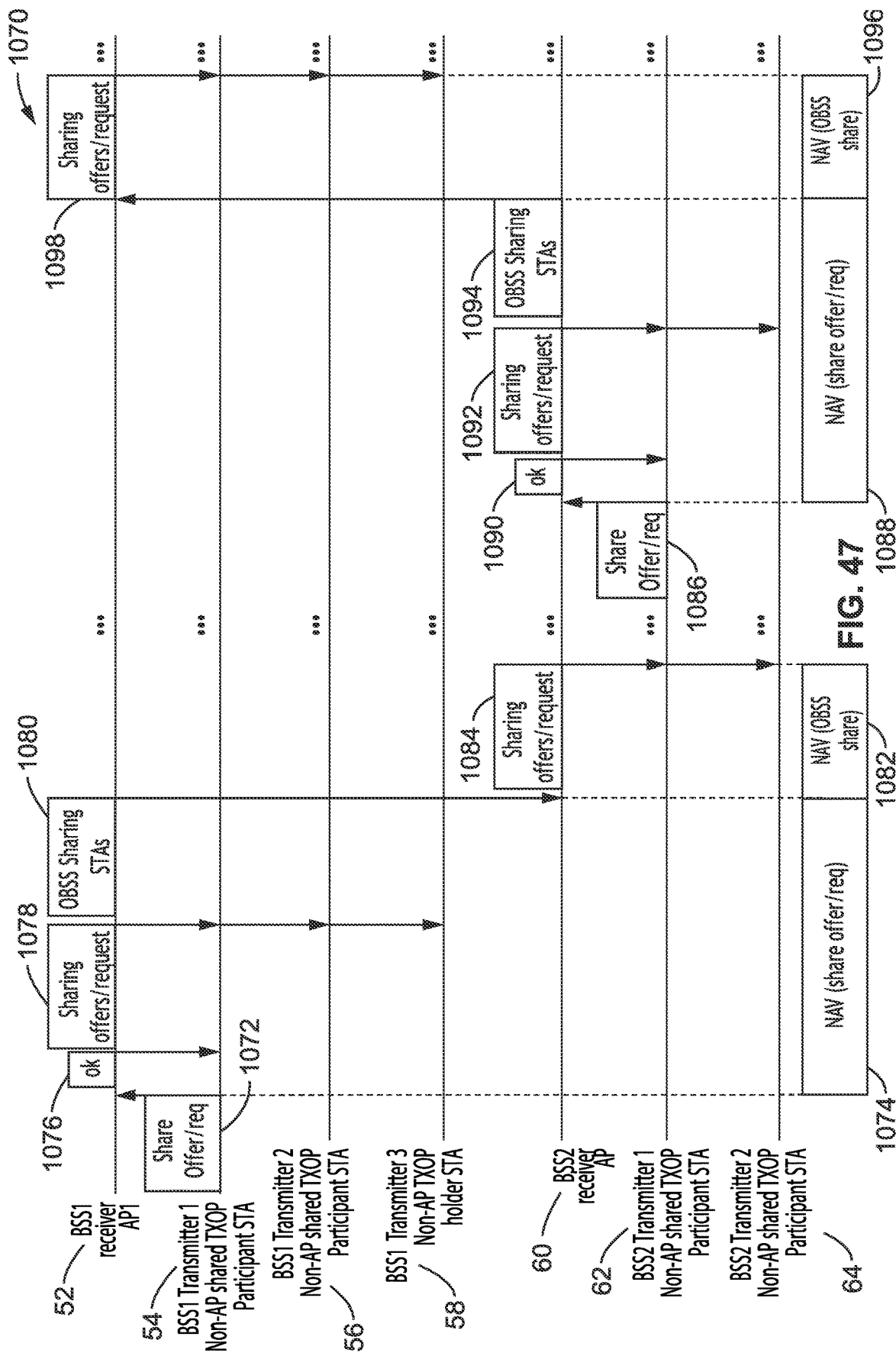
FIG. 47 is a communication sequence diagram of a frame exchange sequence in the share offer/request setup substage of the semi-static protocol for OBSS scenario, according to at least one embodiment of the present disclosure.

FIG. 47 illustrates an example embodiment 1070 of a frame exchange sequence in the share offer/request setup substage of the semi-static protocol for OBSS scenario.

As in prior example interactions the figure shows a first BSS (BSS1) having a receiver AP1 52, two non-AP transmitters as shared TXOP participants 54, 56, and a non-AP transmitter TXOP holder 58. In a second BSS (BSS2) is seen a receiver AP 60, and two non-AP transmitters as shared TXOP participants 62 and 64.

A non-AP STA sends a management frame, such as authentication/association request frame or any other frames that have TXOP share offer/request information embedded in them, 1072 to the associated AP and indicates that it is willing to offer or request a shared TXOP as well as indicating the TXOP access resource it offers or requests, respectively, and a NAV (share-offer/request) 1074 interval commences. An AP receives a Share Offer/Request frame from the non-AP STA and retains the shareability information while sending back a response frame 1076 to the non-AP STA. Then the AP broadcasts a Sharing offer/request frame 1078 to update the latest shareability information to all non-AP STAs in its own BSS (BSS1). After that, the AP unicasts an OBSS Sharing STAs frame 1080 to another AP (AP2) of the other BSS (BSS2) indicating the non-AP STAs shareability of BSS1, and a NAV (OBSS Share) 1082 commences.

Once AP2 receives an OBSS Sharing STAs frame, it broadcasts a Sharing offer/request frame 1084 to updates the latest shareability information of non-AP STAs of BSS1 to all non-AP STAs of BSS2.

The right side of the figure then shows one of the non-AP TXOP participant STAs sending a Share offer/request frame 1086 to the AP starting a NAV (share offer/request) interval 1088, which sends back response frame 1090, and then communicates the Sharing offers/requests 1092 followed by an OBSS Sharing STAs frame 1094, at which time a NAV (OBSS share) 1096 commences, and the AP in the BSS of the shared TXOP holder then sends out Sharing offers/request 1098.

Figure 48:
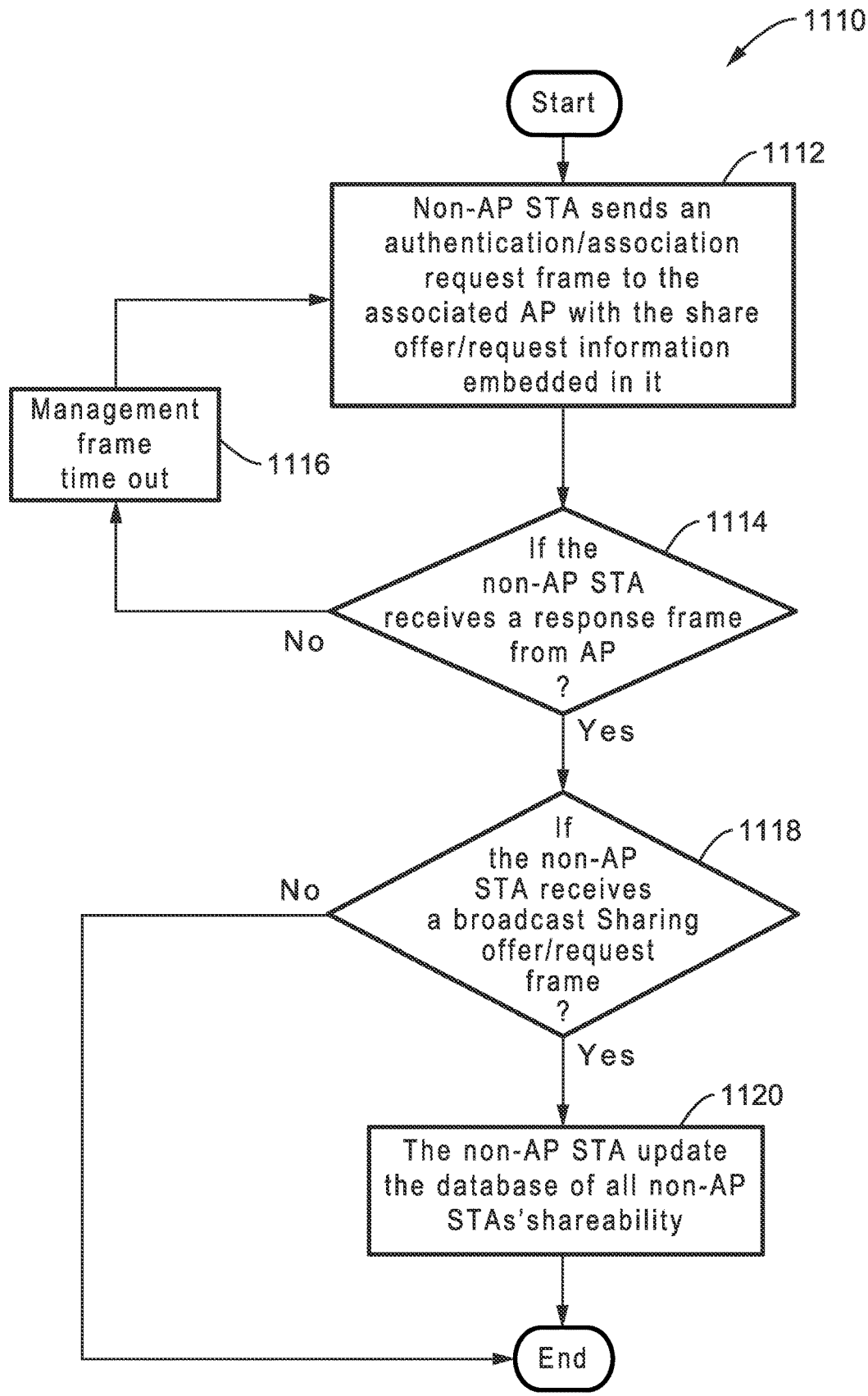
FIG. 48 is a flow diagram of a share offer/request setup substage of the semi-static protocol for OBSS scenario, which is processed at the non-AP STA level, according to at least one embodiment of the present disclosure.

FIG. 48 illustrates an example embodiment 1110 of a share offer/request setup substage of the semi-static protocol for an OBSS scenario, which is processed at the non-AP STA level. A non-AP STA sends 1112 a management frame (e.g., authentication/association request frame) to the associated AP with the share offer/request information embedded in it. A check 1114 determines if a response has been received from the AP within a time out interval. If the non-AP STA doesn't receive any feedback from the associated AP within the management frame timeout, then a management frame time out occurs 1116 and the non-AP STA retransmits the management frame at block 1112.

Otherwise, if the condition is met and the non-AP STA received a response from the AP, then a check is made 1118 to determine if a broadcast Sharing offer/request frame has been received from the AP. If the condition is not met, then this processing ends. Otherwise, a broadcast Sharing offer/request frame has been received from the AP, and the non-AP STA updates shareability 1120 for all other non-AP STAs.

Figure 49:
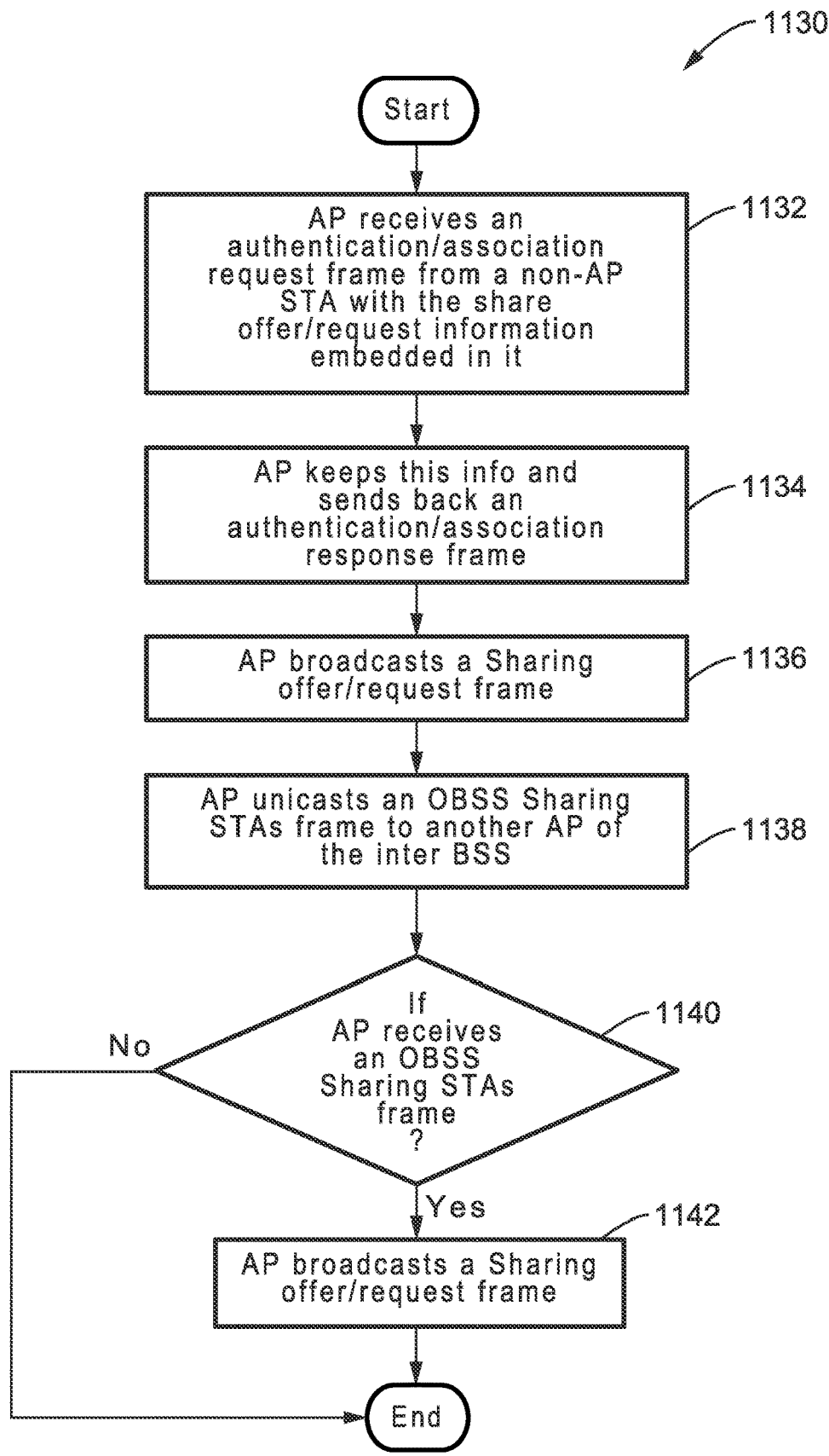
FIG. 49 is a flow diagram of a share offer/request setup substage of the semi-static protocol for OBSS scenario, which is processed at the AP level, according to at least one embodiment of the present disclosure.

FIG. 49 illustrates an example embodiment 1130 of a share offer/request setup substage of the semi-static protocol for an OBSS scenario, which is processed at the AP level. The AP receives 1132 a management frame (e.g., authentication/association request frame) from a non-AP STA with the share offer/request information embedded in it. The AP retains 1134 the shareability information and sends back a response frame (e.g., authentication/association response frame) to the non-AP STA.

Then the AP broadcasts 1136 a Sharing offer/request frame to update the latest shareability information to all non-AP STAs in its BSS (BSS1). After that, the AP unicasts 1138 an OBSS Sharing STAs frame to another AP (AP2) of the other BSS (BSS2) indicating the non-AP STAs shareability of BSS1.

A check 1140 determines if an OBSS Sharing STAs frame has been received. If the condition is not met then processing ends. Otherwise, once AP2 receives the OBSS Sharing STAs frame, it broadcasts 1142 a Sharing offer/request frame to update the latest shareability information of non-AP STAs in BSS1 to all non-AP STAs of BSS2.

7.4.2. TXOP Holder Config Setup Substage of Semi-Static Protocol

Figure 50:
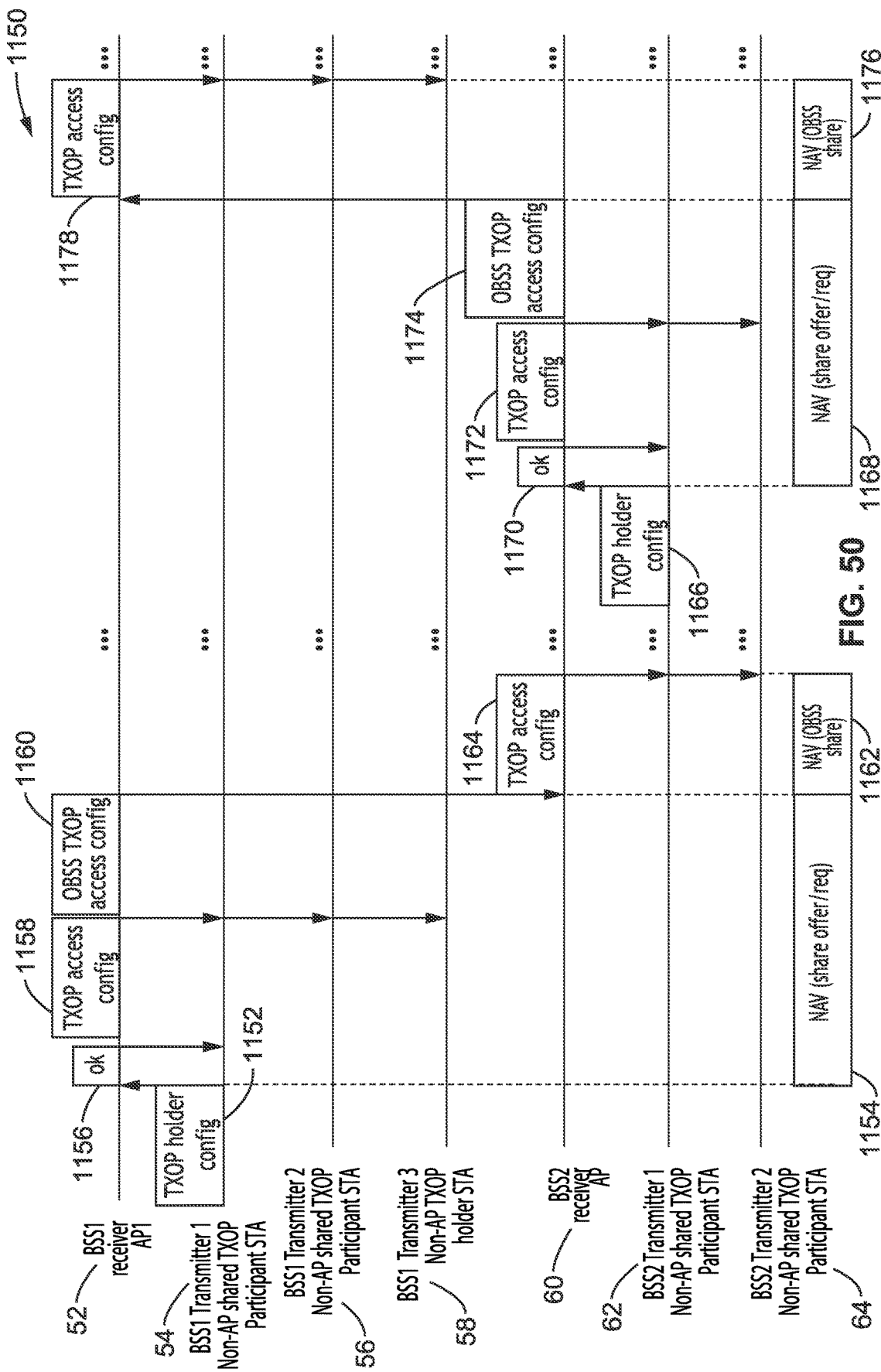
FIG. 50 is a communication sequence diagram of a frame exchange process in the TXOP holder configuration setup substage of the semi-static protocol for OBSS scenario, according to at least one embodiment of the present disclosure.

FIG. 50 illustrates an example embodiment 1150 of a frame exchange process in the TXOP holder configuration setup substage of the semi-static protocol for OBSS scenario.

As in prior example interactions the figure shows a first BSS (BSS1) having a receiver AP1 52, two non-AP transmitters as shared TXOP participants 54, 56, and a non-AP transmitter TXOP holder 58. In a second BSS (BSS2) is seen a receiver AP 60, and two non-AP transmitters as shared TXOP participants 62 and 64.

The potential non-AP TXOP holder STA first sends a TXOP holder configuration frame 1152 to the associated AP, and indicates the schedule and distribution of RUs to other non-AP shared TXOP participant STAs. A NAV (share offer/request) 1154 commences.

After the AP receives a TXOP holder configuration frame from the non-AP STA, the AP retains the shared TXOP access scheduling information and sends back a response frame 1156 to the non-AP STA. Then, the AP broadcasts a TXOP access configuration frame 1158 to update the latest TXOP access scheduling information to all non-AP STAs in its BSS (BSS1). After that, the AP unicasts an OBSS TXOP access configuration frame 1160 to another AP (AP2) of the other BSS (BSS2), indicating the shared TXOP access scheduling of BSS1. A NAV (OBSS share) 1162 commences.

Once AP2 receives the OBSS TXOP access configuration frame, it broadcasts a TXOP access configuration frame 1164 to update the latest shared TXOP access scheduling information of non-AP STAs of BSS1 to all non-AP STAs of BSS2.

Then one of the non-AP TXOP participant STAs send a TXOP holder configuration frame 1166 to the AP of BSS2 and a NAV (share offer/request) 1168 commences. The AP returns a response frame 1170, and then sends a TXOP access configuration frame 1172, followed by an OBSS TXOP access configuration frame 1174, and a NAV (OBSS share) interval 1176 commences. Upon receiving this OBSS TXOP access configuration frame the AP in the BSS1 sends out a TXOP access configuration frame 1178.

Figure 51:
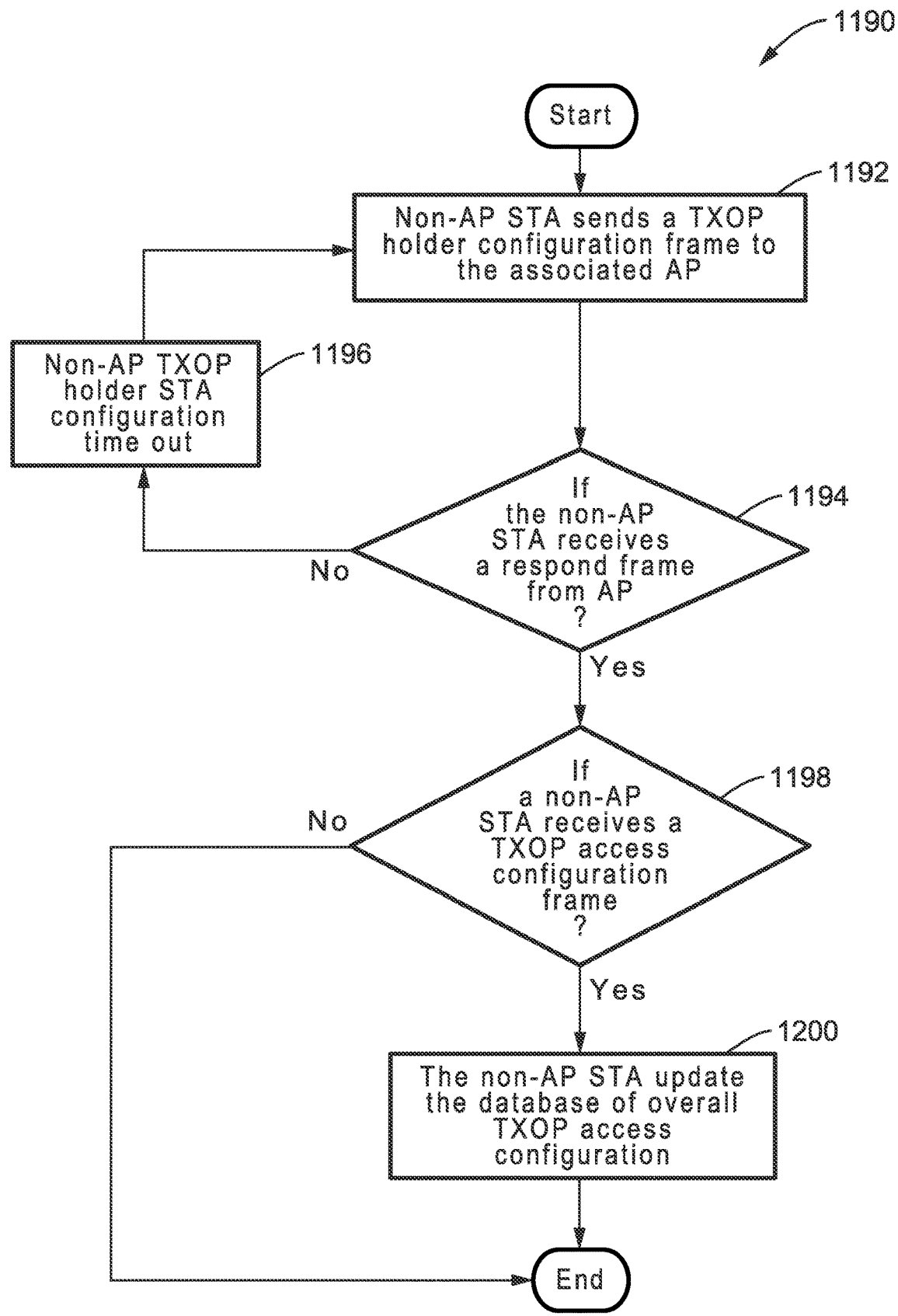
FIG. 51 is a flow diagram of a TXOP holder configuration setup substage of the semi-static protocol for an OBSS scenario, which is processed at the non-AP STA level, according to at least one embodiment of the present disclosure.

FIG. 51 illustrates an example embodiment 1190 of a TXOP holder configuration setup substage of the semi-static protocol for an OBSS scenario, which is processed at the non-AP STA level.

A non-AP STA sends 1192 a TXOP holder configuration frame to the associated AP, and indicates the schedule and distribution of RUs to other non-AP shared TXOP participant STAs.

A check 1194 determines if a response frame has been received from the AP by this non-AP STA. If the non-AP STA doesn't receive any feedback from the associated AP before the TXOP holder STA configuration frame time outs, then a time out 1196 occurs and the non-AP TXOP holder STA retransmits the TXOP holder configuration frame, such as by returning to block 1192.

If the non-AP STA receives a response from the AP, then a check 1198 determines if a TXOP access configuration frame has been received. If the condition is not met, then the process ends. Otherwise, the TXOP access configuration frame has been received and the non-AP STA updates 1200 the database of overall TXOP access configuration.

Figure 52:
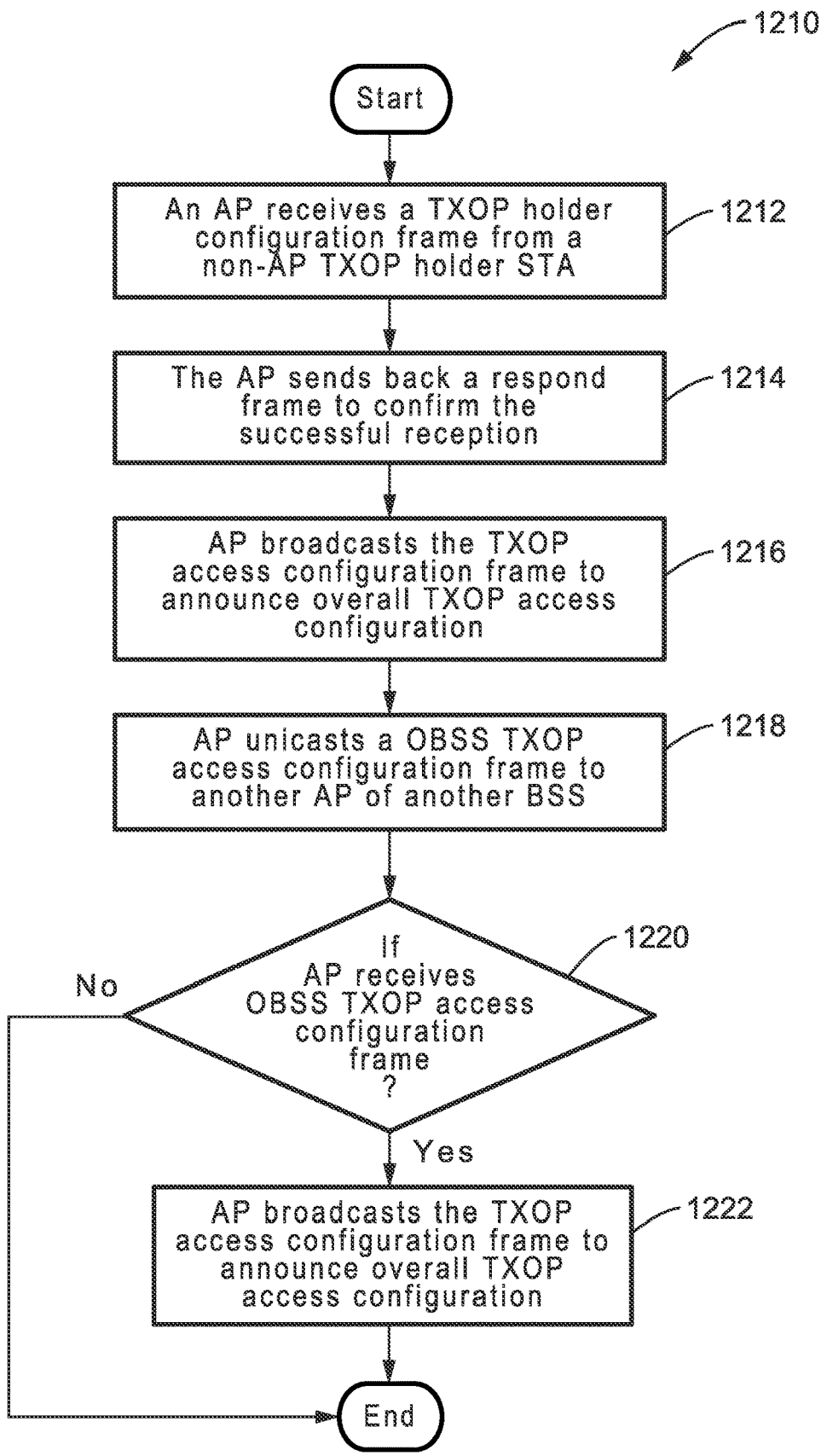
FIG. 52 is a flow diagram of a TXOP holder configuration setup substage of the semi-static protocol for an OBSS scenario, which is processed at the AP level, according to at least one embodiment of the present disclosure.

FIG. 52 illustrates an example embodiment 1210 of a TXOP holder configuration setup substage of the semi-static protocol for an OBSS scenario, which is processed at the AP level.

An AP receives 1212 a TXOP holder configuration frame from a non-AP STA, and retains shared TXOP access scheduling information and sends back 1214 a response frame to the non-AP STA. Then the AP broadcasts 1216 a TXOP access configuration frame to update the latest TXOP access scheduling information to all non-AP STAs in its BSS (BSS1). After that, the AP unicasts 1218 an OBSS TXOP access configuration frame to another AP (AP2) of the other BSS (BSS2) indicating the shared TXOP access scheduling of BSS1.

A check 1220 determines if the AP of BSS2 received the OBSS TXOP access configuration frame. If the condition is not met then processing ends. Otherwise, the AP has received the OBSS TXOP access configuration frame, and it broadcasts 1222 a TXOP access configuration frame to update the latest shared TXOP access scheduling information of non-AP STAs of BSS1 to all non-AP STAs of BSS2.

7.5.1. TXOP Schedule and Access Stage w/Time Shifting

Figure 53:
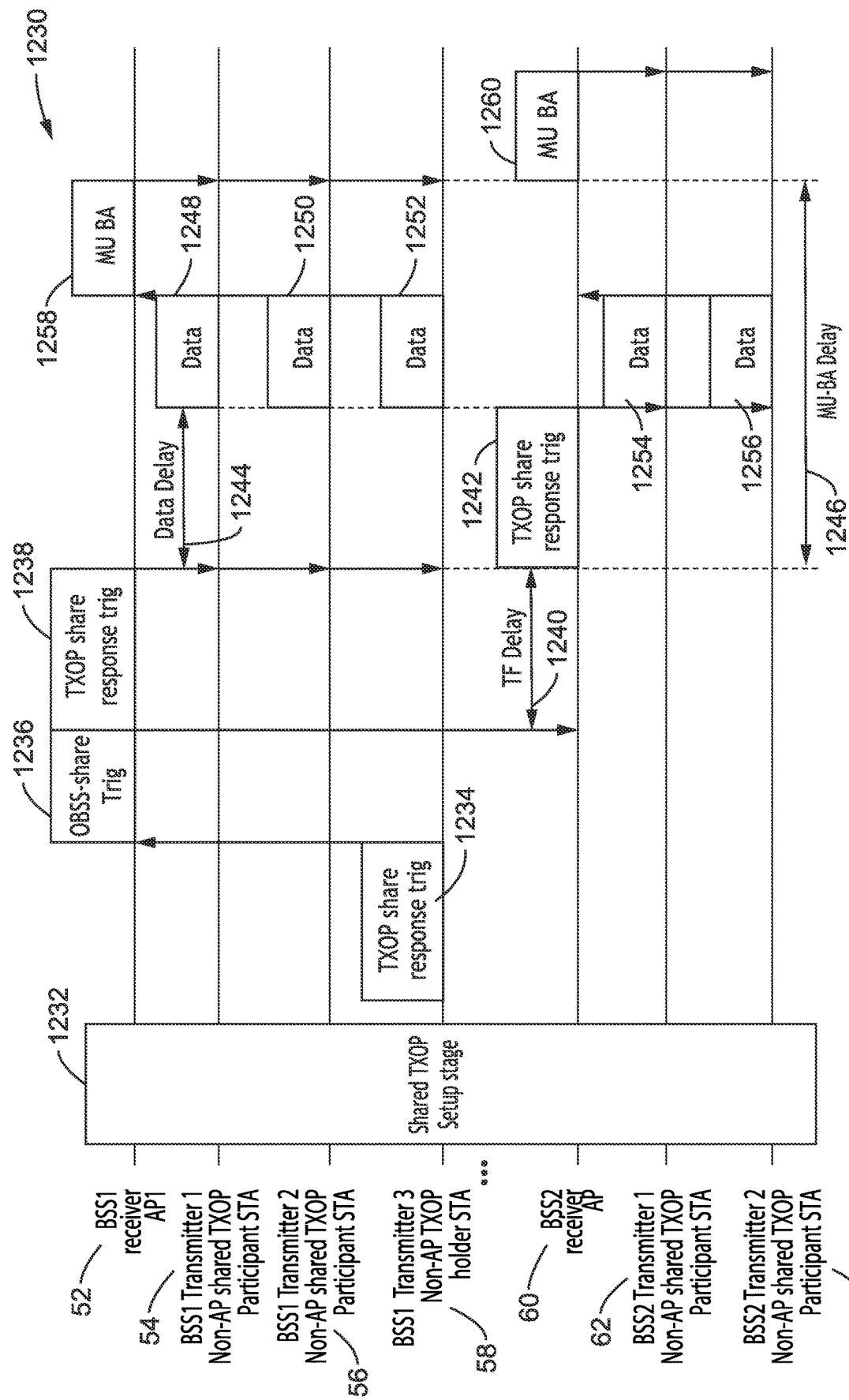
FIG. 53 is a communication sequence diagram of a semi-static protocol of the TXOP schedule and access stage with time shifting for an OBSS scenario, according to at least one embodiment of the present disclosure.

FIG. 53 illustrates an example embodiment 1230 of a semi-static protocol of the TXOP schedule and access stage with time shifting for an OBSS scenario.

As in prior example interactions the figure shows a first BSS (BSS1) having a receiver AP1 52, two non-AP transmitters as shared TXOP participants 54, 56, and a non-AP transmitter TXOP holder 58. In a second BSS (BSS2) is seen a receiver AP 60, and two non-AP transmitters as shared TXOP participants 62 and 64. It will be noted that for simplicity of illustration, the NAV intervals are not shown.

A TXOP setup stage is performed 1232. Then the non-AP TXOP holder STA unicasts a TXOP share request trigger frame 1234 to the associated AP, which indicates the starting of the TXOP schedule and access stage.

After the AP receives TXOP share request trigger frame, it unicasts an OBSS-share trigger frame 1236 to the other AP of the shared TXOP participant BSS, and indicates the TF delay 1240 and the MU-BA delay 1246 for transmission scheduling in the shared TXOP participant BSS. Then, the AP broadcasts a TXOP share response trigger frame 1238, indicating the Data delay duration 1244.

The AP in the shared TXOP participant BSS receives the OBSS-share trigger frame, and after the TF Delay 1240 it broadcasts TXOP share response trigger frame 1242.

If non-AP TXOP participant STAs or the non-AP TXOP holder STA receive the TXOP share response trigger frame, they checks the Data Delay duration indicated in the basic trigger. After the Data Delay duration, each send UL DATA 1248, 1250, 1252, 1254 and 1256, to the associated AP with configured RU.

Once the UL DATA has been received, the AP from the shared TXOP holder BSS sends a MU-BA frame 1258 immediately. The AP from the shared TXOP participant BSS then sends a MU-BA frame 1260 after the MU-BA delay 1246 indicating the time since it received the OBSS-share trigger frame.

Figure 54:
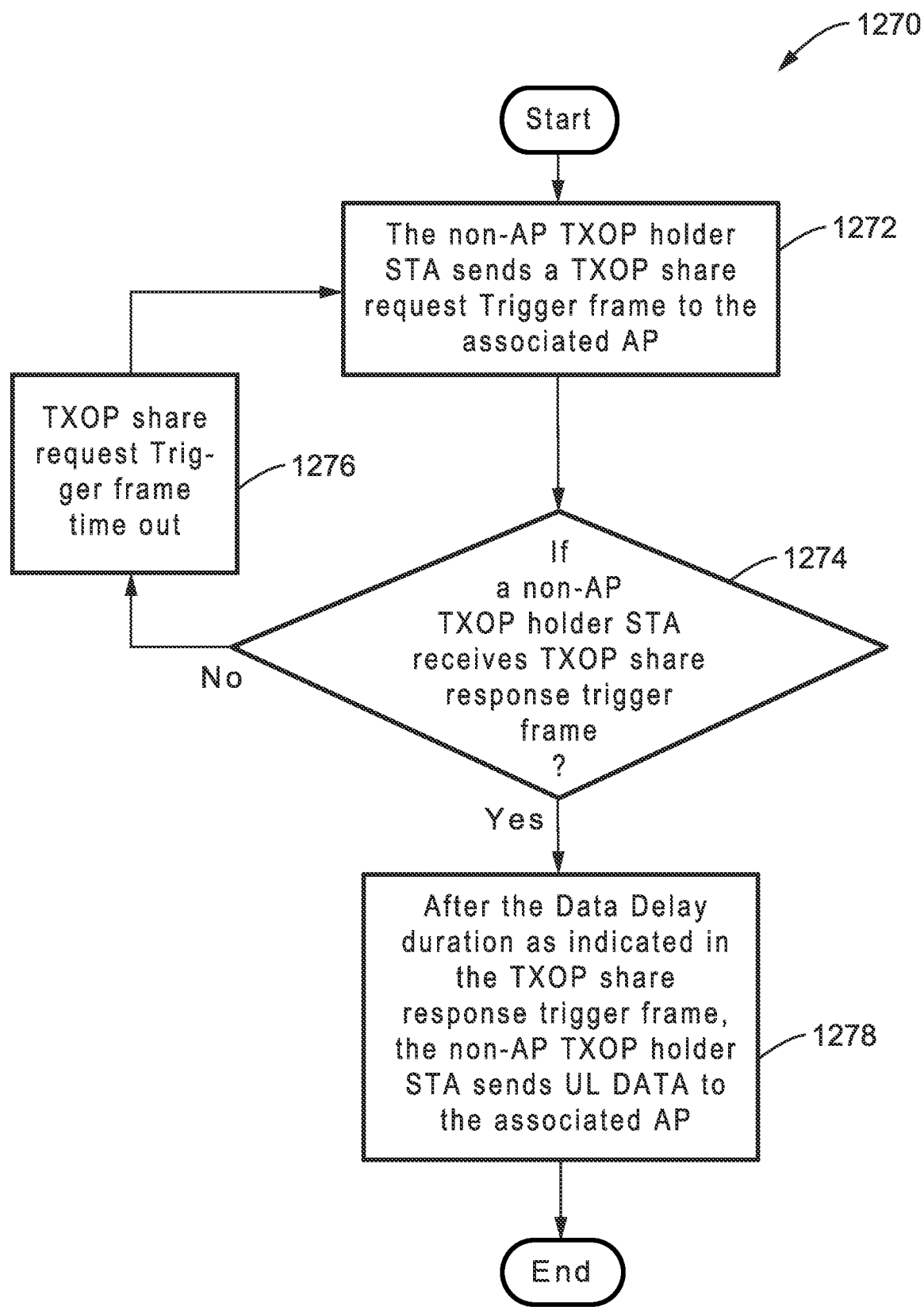
FIG. 54 is a semi-static protocol of the TXOP schedule and access stage with time shifting for an OBSS scenario, according to at least one embodiment of the present disclosure.

FIG. 54 illustrates an example embodiment 1270 of a semi-static protocol of the TXOP schedule and access stage with time shifting for an OBSS scenario, which is processed at non-AP TXOP holder STA level. The non-AP TXOP holder STA sends 1272 a TXOP share request Trigger frame to the associated AP to indicate that the TXOP access is to start.

A check 1272 determines if a TXOP share response trigger frame was received. If the condition is not met, and the non-AP TXOP holder STA didn't receive the TXOP share response trigger frame before TXOP share request trigger frame time out, then a time out occurs 1276 and the non-AP TXOP holder STA retransmits the TXOP share request trigger frame, such as by execution returning to block 1272. Otherwise, if the TXOP share response trigger frame was received, then at block 1278 after the DATA Delay duration as indicated in the TXOP share response trigger frame, then the non-AP TXOP holder STA sends UL DATA to the associated AP using the configured RU.

Figure 55:
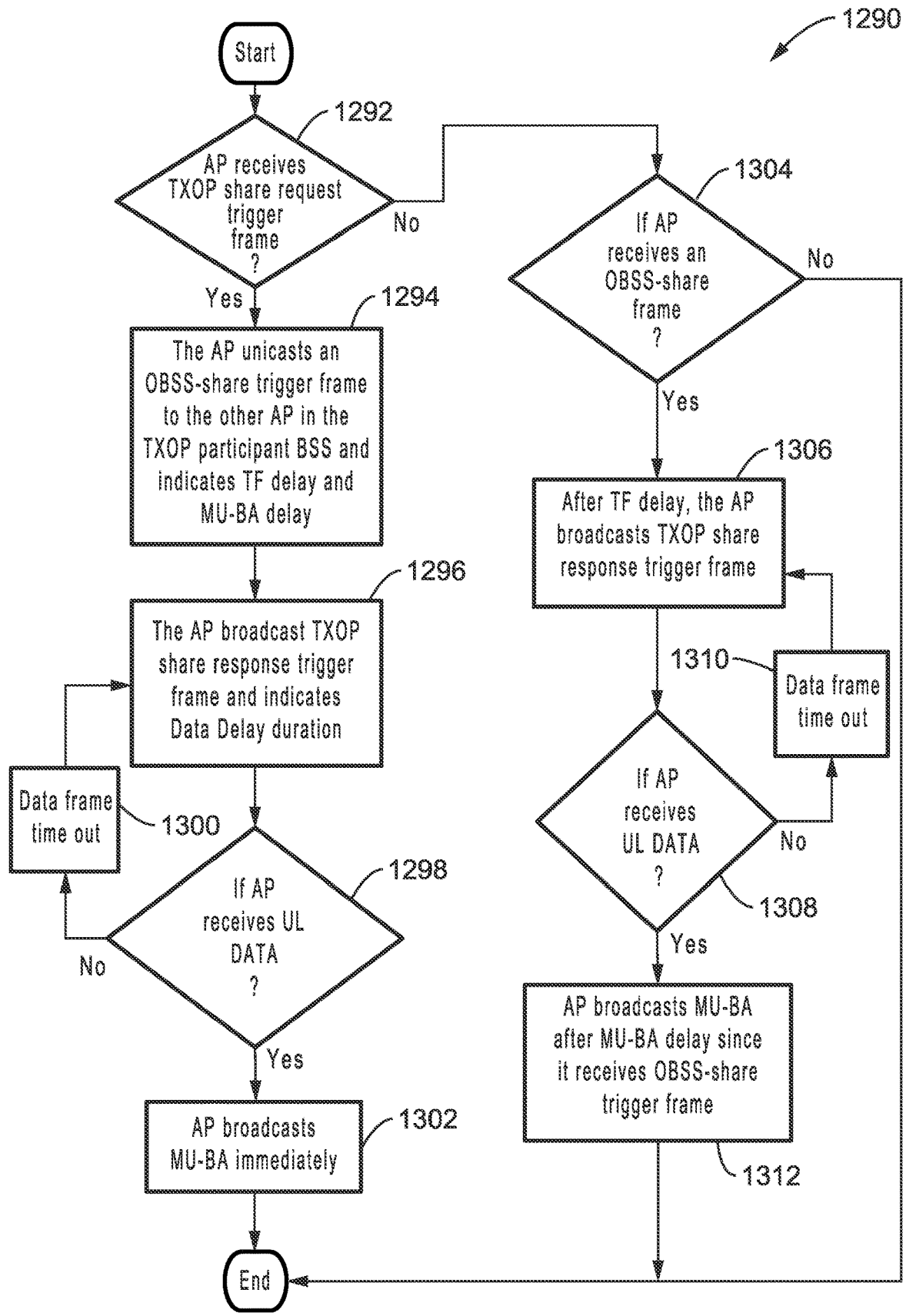
FIG. 55 is a flow diagram of a semi-static protocol of the TXOP schedule and access stage with time shifting for an OBSS scenario, which is processed on the AP level, according to at least one embodiment of the present disclosure.

FIG. 55 illustrates an example embodiment 1290 of a semi-static protocol of the TXOP schedule and access stage with time shifting for OBSS scenario, which is processed at the AP level.

A check 1292 determines if a TXOP share request trigger frame was received. If the AP receives the TXOP share request trigger frame, then this is the AP of the BSS for the shared TXOP holder, and the AP unicasts 1294 an OBSS-share trigger frame to the other AP of the shared TXOP participant BSS, and indicates the TF delay and the MU-BA delay for transmission scheduling in the shared TXOP participant BSS.

The AP in the shared TXOP holder BSS then broadcasts 1296 a TXOP share response trigger frame, indicating the Data delay duration.

A check 1298 determines if UL DATA has been received within the time out interval. If the UL DATA has not been received in time, then a data frame time out 1300 occurs, and the AP re-broadcast the TXOP share response trigger frame, such as by execution returning to block 1296.

If the AP from the shared TXOP holder BSS receives the UL DATA, it immediately sends 1302 a MU-BA frame.

Returning to block 1292, if the frame received was not a TXOP share request trigger frame, then execution reaches block 1304 which checks if the frame received was an OBSS-share trigger frame. If the condition it not met, then the frame meets neither of these conditions and this processing ends. Otherwise, since this AP received an OBSS-share trigger frame this AP is in the shared TXOP participant BSS. The AP, after the TF Delay, broadcasts 1306 a TXOP share response trigger frame, and indicates the Data Delay for the non-AP shared TXOP participant STAs in the TXOP participant BSS.

A check 1308 determines if UL DATA has been received. If the UL DATA is not received within the time out period, then a data frame timeout 1310 arises and the AP re-broadcasts the TXOP share response trigger frame. Otherwise, the AP from the shared TXOP participant BSS received the UL DATA, and it sends 1312 a MU-BA frame after the MU-BA delay since it receives the OBSS-share trigger frame.

Figure 56:
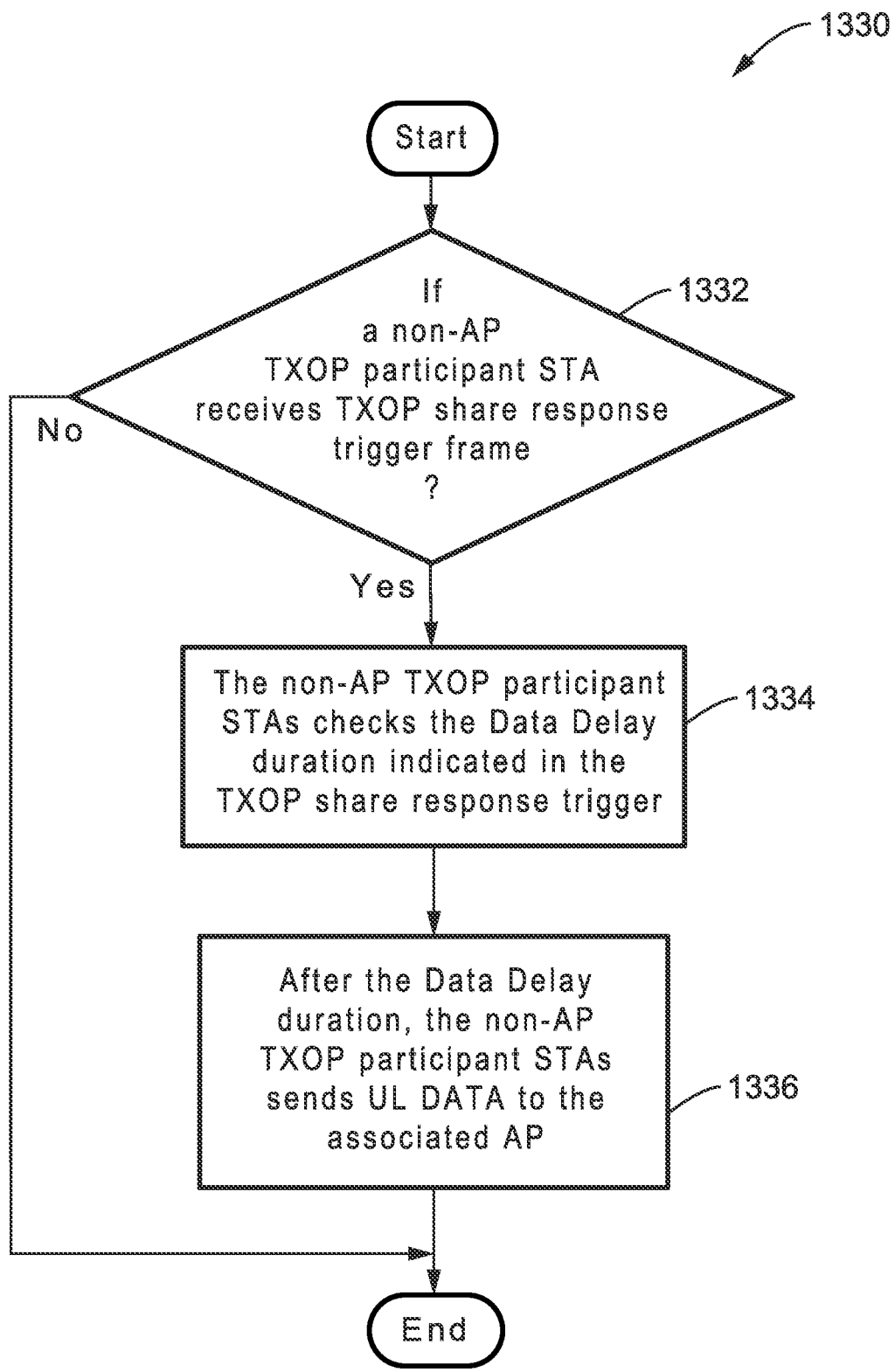
FIG. 56 is a flow diagram of a semi-static protocol of the TXOP schedule and access stage with time shifting for an OBSS scenario, which is processed at the non-AP shared TXOP participant STA level, according to at least one embodiment of the present disclosure.

FIG. 56 illustrates an example embodiment 1330 of a semi-static protocol of the TXOP schedule and access stage with time shifting for an OBSS scenario, which is processed at the non-AP shared TXOP participant STA level.

A check 1332 determines if a TXOP share response trigger frame has been received. If the condition is not met then this process ends.

If the non-AP TXOP participant STA receives the TXOP share response trigger frame, then at block 1334 it checks the Data Delay duration indicated in the TXOP share response trigger. After the Data Delay duration, it sends 1336 UL DATA to the associated AP with configured RU.

7.5.2. TXOP Schedule and Access Stage on Scheduled Bands

Figure 57:
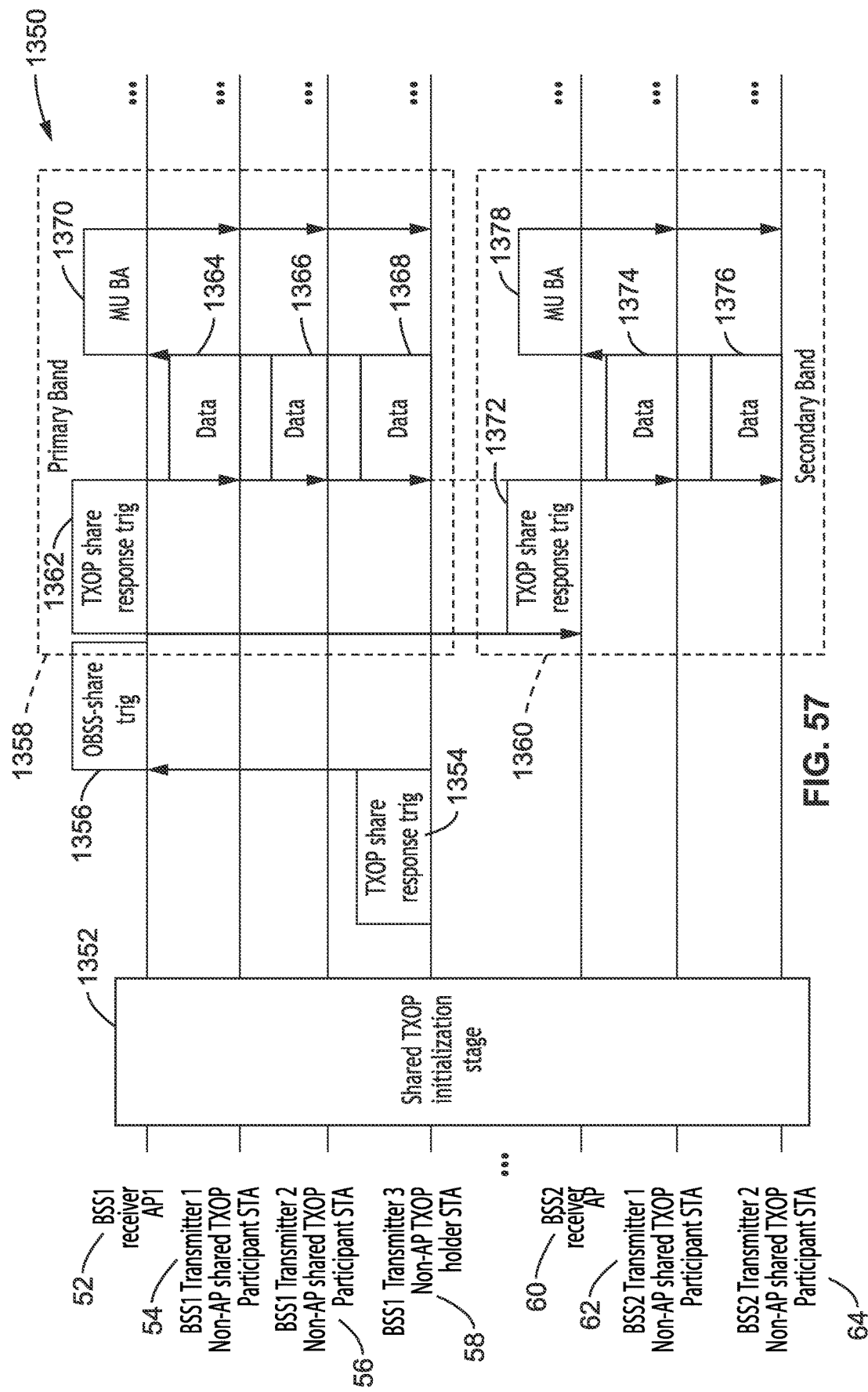
FIG. 57 is a communication sequence diagram of a semi-static protocol of the TXOP schedule and access stage on scheduled band for an OBSS scenario, according to at least one embodiment of the present disclosure.

FIG. 57 illustrates an example embodiment 1350 of a semi-static protocol of the TXOP schedule and access stage on a scheduled band for an OBSS scenario, and showing operation on a primary band 1358 and a secondary band 1360. As in prior example interactions the figure shows a first BSS (BSS1) having a receiver AP1 52, two non-AP transmitters as shared TXOP participants 54, 56, and a non-AP transmitter TXOP holder 58. In a second BSS (BSS2) is seen a receiver AP 60, and two non-AP transmitters as shared TXOP participants 62 and 64. It will be noted that for simplicity of illustration, the NAV intervals are not shown.

A shared TXOP setup 1352 is performed. Then the non-AP TXOP holder STA unicasts a TXOP share request trigger frame 1354 to the associated AP, which indicates the starting of the TXOP schedule and access stage. After the AP receives TXOP share request trigger frame, it unicasts an OBSS-share trigger frame 1356 to the other AP of the shared TXOP participant BSS, and indicates the primary band 1358 (as set in the Reserved Band TXOP holder BSS field) which is the reserved band for the shared TXOP holder BSS. Thus, the AP leaves the remaining band, which is the secondary band 1360, for the shared TXOP participant BSS. Then, the AP in the shared TXOP holder BSS broadcasts a TXOP share response trigger frame 1362 on the primary band.

If the AP in the shared TXOP participant BSS receives an OBSS-share trigger frame, it broadcasts a TXOP share response trigger frame 1372 on the secondary band.

If a non-AP TXOP participant STA or the non-AP TXOP holder STA receives the TXOP share response trigger frame, it sends UL DATA 1364, 1366, 1368, 1374 and 1376 to the associated AP with configured RU.

If the AP from the shared TXOP holder BSS receives the UL DATA, it sends an MU-BA frame 1370 on the primary band immediately. Otherwise, it should re-broadcast the TXOP share response trigger frame.

If the AP from the shared TXOP participant BSS receives the UL DATA, it sends MU-BA frame 1378 on the secondary band immediately. Otherwise, it should re-broadcast the TXOP share response trigger frame.

Figure 58:
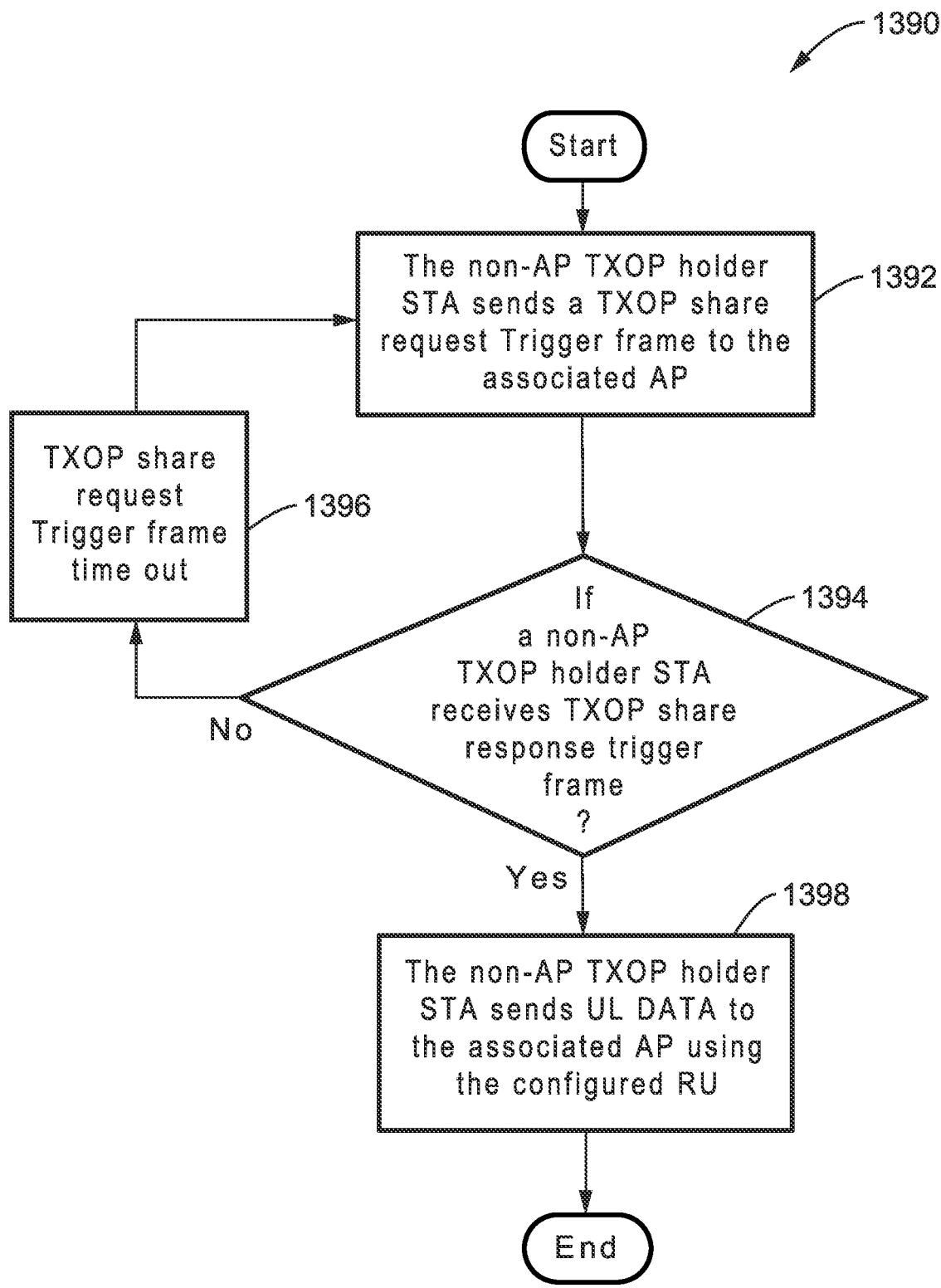
FIG. 58 is a flow diagram of a semi-static protocol of the TXOP schedule and access stage on scheduled band for an OBSS scenario, which is processed at the non-AP TXOP holder STA level, according to at least one embodiment of the present disclosure.

FIG. 58 illustrates an example embodiment 1390 of a semi-static protocol of the TXOP schedule and access stage on a scheduled band for an OBSS scenario, which is processed at the non-AP TXOP holder STA level. The non-AP TXOP holder STA sends 1392 a TXOP share request Trigger frame to the associated AP to indicate that the TXOP access should start.

A check 1394 determines if the TXOP share response trigger frame has been received. If a non-AP TXOP holder STA doesn't receive the TXOP share response trigger frame before the TXOP share request trigger frame time out, then a timeout 1396 occurs and the non-AP TXOP holder STA retransmit the TXOP share request trigger frame, shown here by returning to block 1392. Otherwise, the non-AP TXOP holder received the TXOP share response trigger frame and the STA sends 1398 UL DATA to the associated AP using the configured RU.

Figure 59:
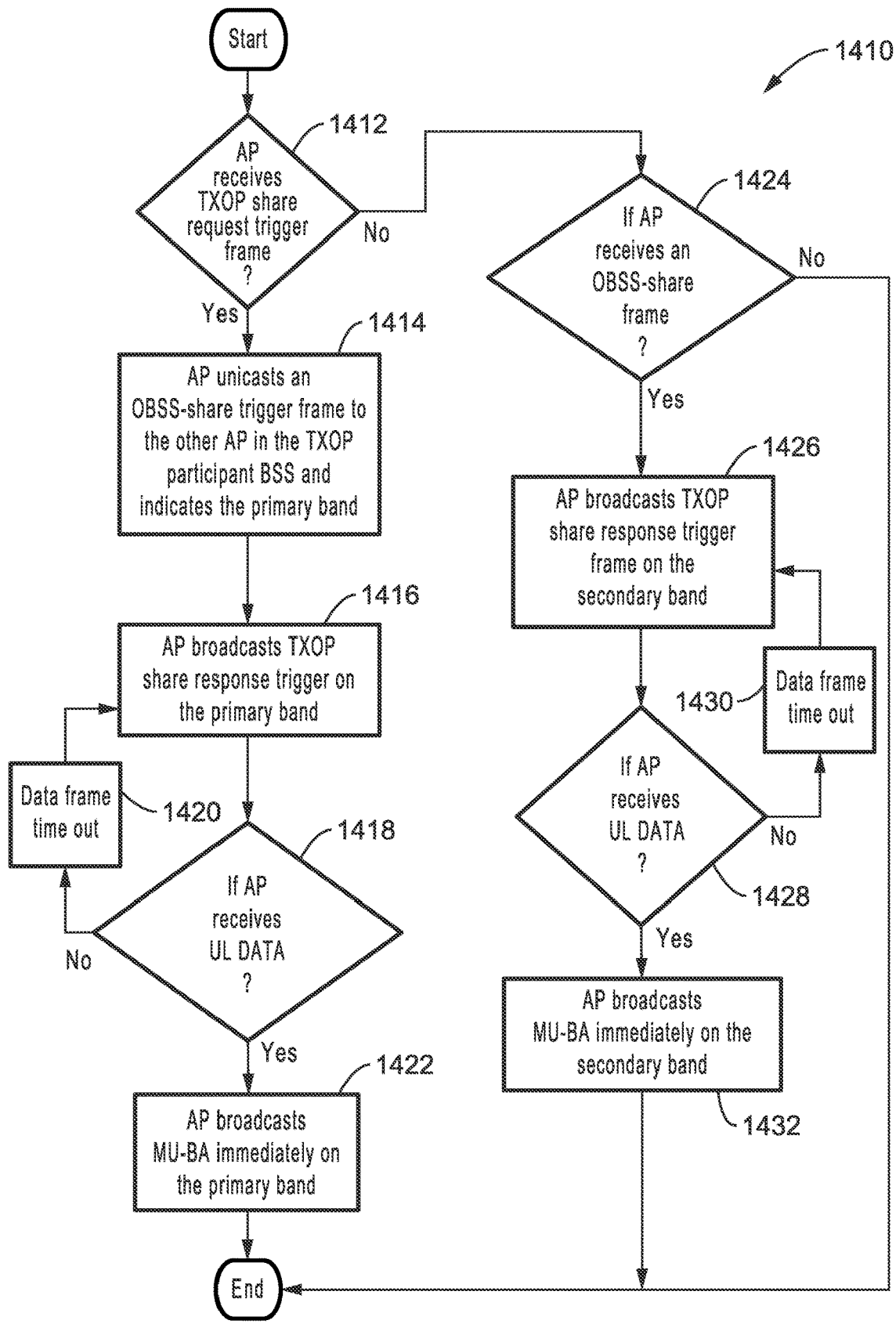
FIG. 59 is a flow diagram of a semi-static protocol of the TXOP schedule and access stage on a scheduled band for an OBSS scenario, which is processed at the AP level, according to at least one embodiment of the present disclosure.

FIG. 59 illustrates an example embodiment 1410 of a semi-static protocol of the TXOP schedule and access stage on a scheduled band for an OBSS scenario, which is processed at the AP level.

A check 1412 determines if a TXOP share request trigger frame has been received. If the AP received the TXOP share request trigger frame, it unicasts 1414 an OBSS-share trigger frame to the other AP of the shared TXOP participant BSS, and indicates the primary band which is the reserved band for the shared TXOP holder BSS. Thus the AP leaves the remaining band, which is the secondary band, for use by the shared TXOP participant BSS.

The AP in the shared TXOP holder BSS broadcasts 1416 a TXOP share response trigger frame on the primary band.

A check 1418 determines if the UL DATA has been received in the time out interval. If the condition is not met, then a data frame time out 1420 occurs, and the TXOP share response trigger is re-broadcast on the primary band, as seen here with execution returning to block 1416.

If the condition is met and the AP from the shared TXOP holder BSS received the UL DATA, then it sends 1422 a MU-BA frame on the primary band immediately.

Returning to block 1412 in the case that the TXOP share request trigger frame is not received, then a check at 1424 determines if the frame is an OBSS-share frame.

If the AP received an OBSS-share trigger frame then this AP is the AP of the shared TXOP participant BSS and it broadcasts 1426 a TXOP share response trigger frame on the secondary band.

A check 1428 determines if the UL DATA has been received in the time out interval. If the condition is not met, then a data frame time out 1430 occurs, and the TXOP share response trigger is re-broadcast on the secondary band, as seen here with execution returning to block 1426.

If the AP from the shared TXOP participant BSS receives the UL DATA, it sends 1432 a MU-BA frame on the secondary band immediately.

Figure 60:
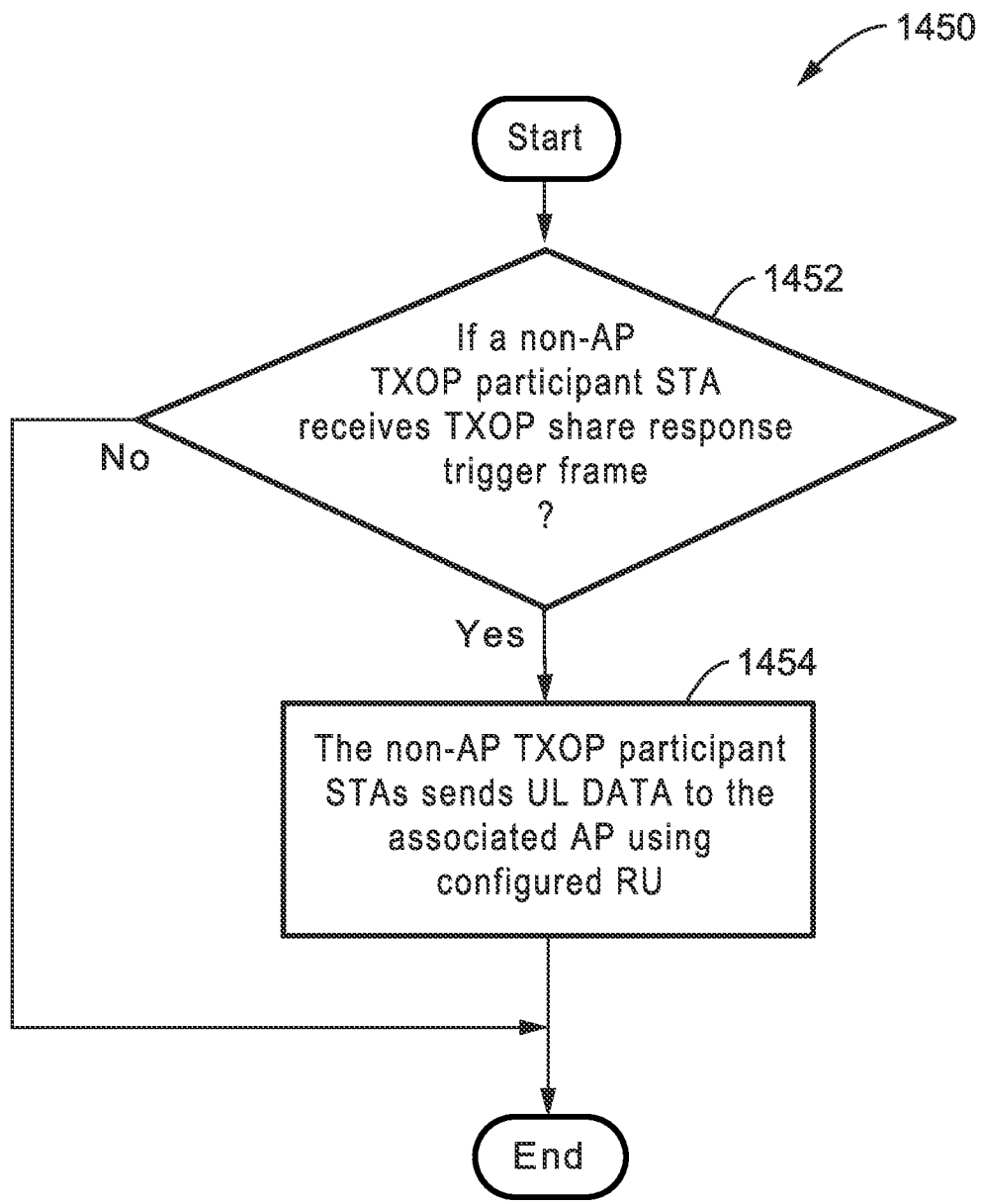
FIG. 60 is a data field diagram of a semi-static protocol of the TXOP schedule and access stage on a scheduled band for an OBSS scenario, which is processed at the non-AP shared TXOP participant STA level, according to at least one embodiment of the present disclosure.

FIG. 60 illustrates an example embodiment 1450 of a semi-static protocol of the TXOP schedule and access stage on a scheduled band for an OBSS scenario, which is processed at the non-AP shared TXOP participant STA level.

A check 1452 determines if a TXOP share response trigger frame was received. If the condition is not met, then this processing ends. Otherwise, if the non-AP TXOP participant STA receives a TXOP share response trigger frame, then at block 1454 it checks the Data Delay duration indicated in the TXOP share response trigger. After the Data Delay duration it sends UL DATA to the associated AP with configured RU.

8. Frame Format Design

In this section example frame formats are shown which extend existing 802.11 protocols according to the present disclosure. It should be appreciated that fields/subfields which are not specifically described operate according how those same field/subfields are described elsewhere, or in previous utilization on existing 802.11 standards.

8.1. STA TXOP Shareability Element

Figure 61:
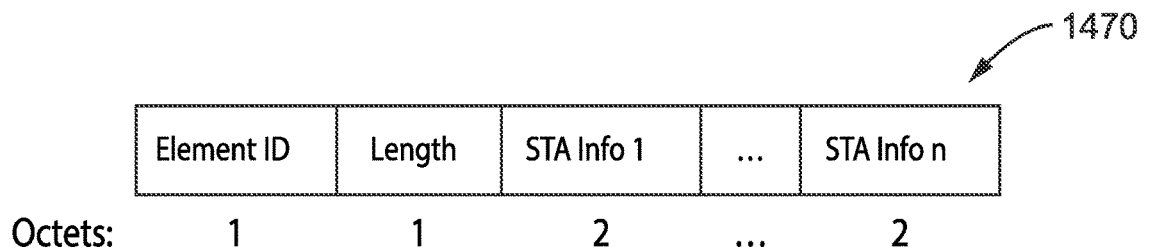
FIG. 61 is a data field diagram of a TXOP shareability element according to at least one embodiment of the present disclosure.

FIG. 61 illustrates an example embodiment 1470 of a TXOP shareability element, which is contained in the management frames, such as authentication or association request frames, authentication or association response frames, beacon frame and any other management frames that are exchanged between the AP and non-AP STA, and is used by each non-AP STA to inform the associated AP about its TXOP share offer/request information. The shareability element has the following fields. An Element ID field is an identifier for an element, in this example it has been set to a value of 8 to indicate this as a STA TXOP shareability element. If the AP receives an authentication or association request frame with the Element ID field set to 8, the AP records all the share offer/request information of each STA (as indicated in the STA Info field) and sends back an authentication or association response frame to indicate successful reception. A Length field indicates the number of octets in the element excluding Element ID and Length fields. Multiple STA information fields exist, the subfields of which are described in FIG. 62.

Figure 62:
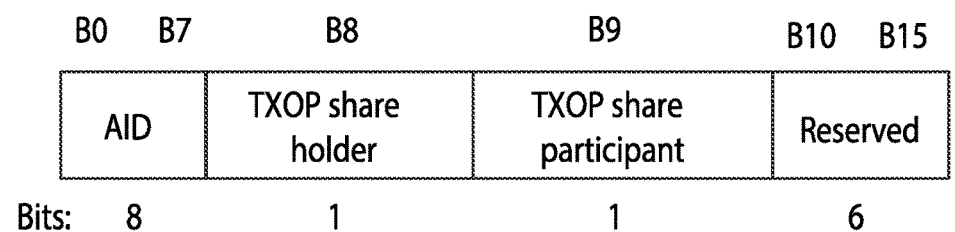
FIG. 62 is a data field diagram of an information (info) field from the TXOP shareability element seen in FIG. 61, according to at least one embodiment of the present disclosure.

FIG. 62 illustrates an example embodiment 1490 an STA Information (info) field from the TXOP shareability element seen in FIG. 61, having the following subfields. An AID subfield contains the AID of the STA for which TXOP shareability is indicated. A TXOP share holder subfield indicates the shareability of this STA as the TXOP holder. The TXOP share holder subfield is set to a first value (e.g., 1) to indicate that this STA, operating as the TXOP holder, is willing to share its TXOP with other STAs. The TXOP share holder subfield is set to a second state (e.g., 0) to indicate that this STA, operating as the TXOP holder, is not willing to share its TXOP with other STAs.

A TXOP share participant subfield indicates the shareability of this STA as the TXOP participant. The TXOP share participant subfield is set to a first state (e.g., 1) to indicate this STA, operating as the shared TXOP participant STA, is willing to join the TXOP that shared by the TXOP holder STA. Otherwise, if the TXOP share participant subfield is set to a second state (e.g., 0), it indicates that this STA, operating as the shared TXOP participant STA, is not willing to join the TXOP that is shared by the TXOP holder STA.

8.2 Sharing Offer/Request Frame

Figure 63:
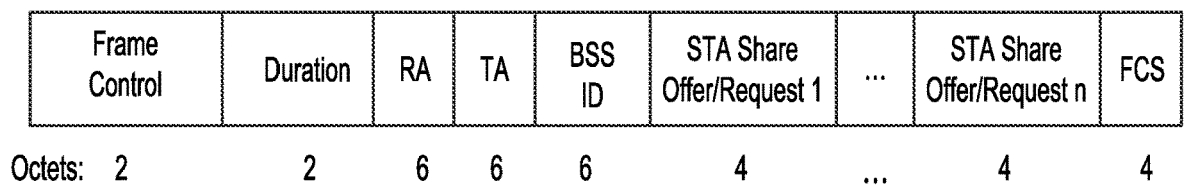
FIG. 63 is a data field diagram of a sharing offer/request frame format, according to at least one embodiment of the present disclosure.

FIG. 63 illustrates an example embodiment 1510 of a sharing offer/request frame format. A Frame control field indicates the type of frame. A Duration field contains NAV information used for CSMA/CA channel access. An RA field contains a MAC address for a recipient of the frame. A TA field contains the MAC address of the STA that transmitted the frame. A BSSID subfield is the MAC address of the AP that the non-AP STA is associated with. If the BSSID indicates the same MAC address as the TA, this indicates that the sharing offer/request frame is delivering shareability information for the non-AP STAs from the internal BSS; otherwise, it means the sharing offer/request frame is delivering shareability information for non-AP STAs from an inter BSS whose ID is indicated by the BSSID. The frame may contain multiple STA Share offer/request info fields which include TXOP share offer/request information of the non-AP STA and have subfields described in FIG. 64.

Figure 64:
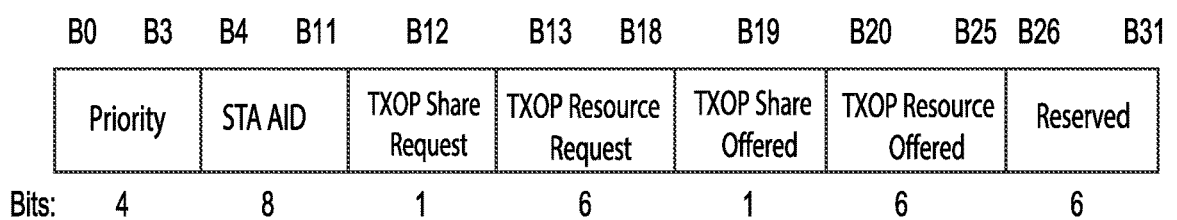
FIG. 64 is a data field diagram of the share offer/request info field seen in FIG. 63, according to at least one embodiment of the present disclosure.

FIG. 64 illustrates an example embodiment 1530 of the STA Share offer/request info field which comprises the following subfields. A Priority field indicates the priority of the traffic that is stored in the STA's buffer, and can be used by the TXOP holder or the AP for the TXOP access scheduler design. A STA AID is the AID of the non-AP TXOP participant STA. A TXOP Share Request subfield set to a first state (e.g., 1) to indicate that this STA is requesting a shared TXOP; otherwise the subfield is set to a second state (e.g., 0). When the AP receives a Share offer/request frame that has the TXOP Share Request field set as 1, the AP is made aware that the STA which sent this frame is willing to participant in the shared TXOP.

A TXOP Resource Request subfield indicates the number of continuous RUs this non-AP STA is requesting in the shared TXOP, as given in this embodiment in basic RU (26 tone); providing a valid value range from 1 to 37. The AP will broadcast this information in the sharing offer/request frame.

The TXOP Share Offered subfield is set to a first state (e.g., 1) to indicate that this STA is willing to be the non-AP TXOP holder STA and to share its TXOP with other STAs; otherwise the value is set to a second state (e.g., 0). When the AP receives a Share offer/request frame that has the TXOP Share Offered field set as 1, the AP is made aware that the STA which sent this frame is willing to share its TXOP with other STAs.

A TXOP Resource Offered subfield indicates the number of continuous RUs that this TXOP holder STA is willing to share with other STAs, in basic RU (26 tone), with valid values ranging from 1 to 37. The AP will broadcast this information in the sharing offer/request frame.

8.3. OBSS Sharing STAs Frame

Figure 65:
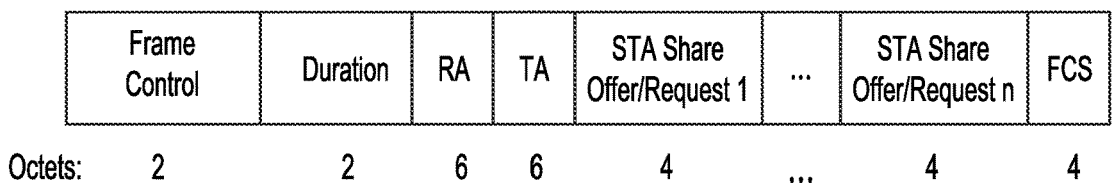
FIG. 65 is a data field diagram of an OBSS sharing STAs frame format according to at least one embodiment of the present disclosure.

FIG. 65 illustrates an example embodiment 1550 of an OBSS sharing STAs frame format. A Frame control field indicates the type of frame. A Duration field contains NAV information used for CSMA/CA channel access. An RA field indicates the received BSSID of this trigger frame. A TA field indicates the transmitted BSSID of this trigger frame.

One or more STA Share offer/request information fields can be provided in the frame, the contents of each being described in FIG. 64.

The OBSS share STAs frame is sent from an AP to another AP. Once the AP receives the OBSS sharing STAs frame, it will check the non-AP STA's share offer/request information as well as the transmitted BSSID, and broadcasts this information within its BSS.

8.4. MU-RTS-Share

Figure 66:
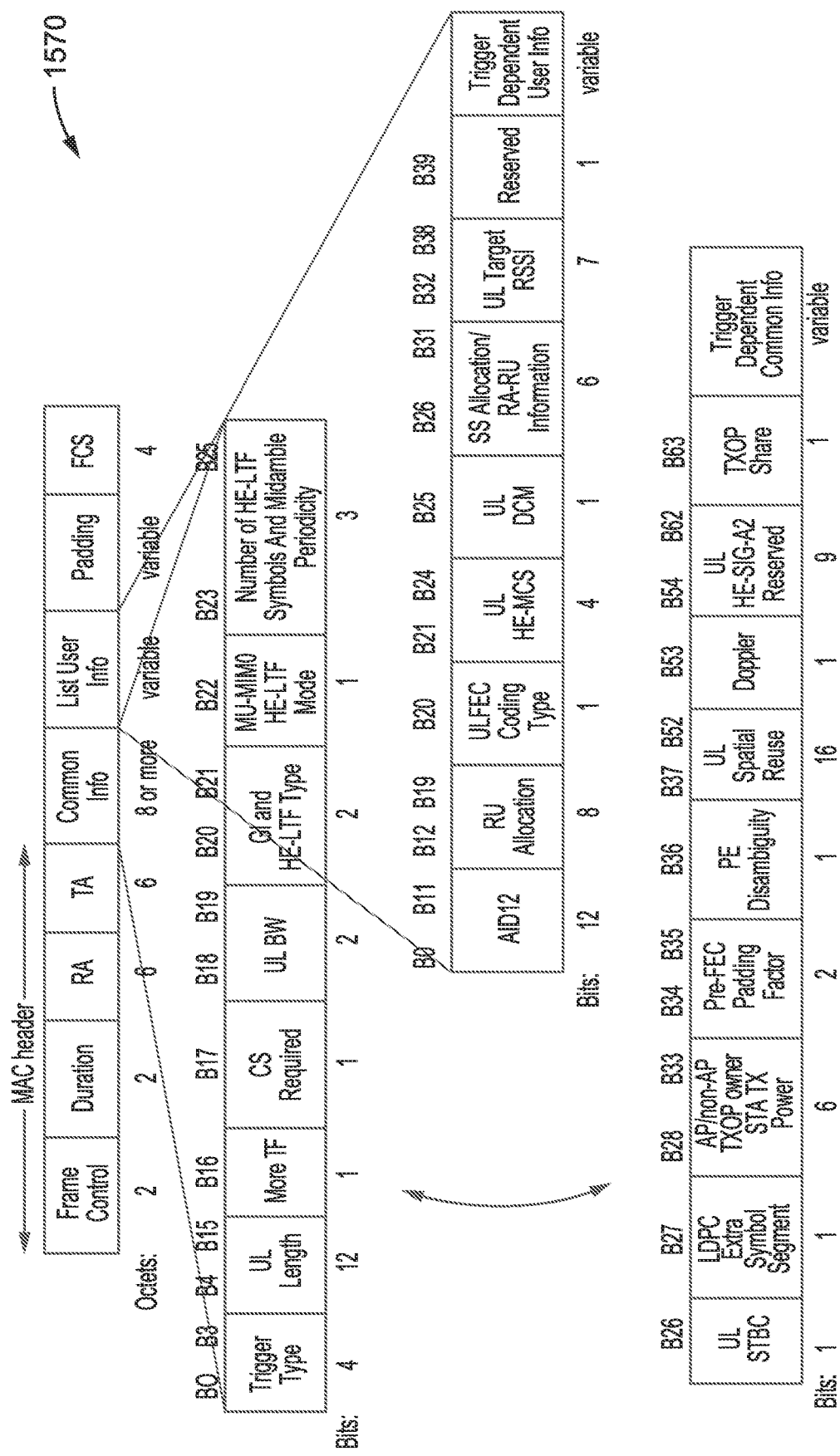
FIG. 66 is a data field diagram of a multiple-user request-to-send (MU-RTS)-share frame according to at least one embodiment of the present disclosure.

FIG. 66 illustrates an example embodiment 1570 of a MU-RTS-share frame having the following fields. A MAC header contains Frame Control, Duration, RA and TA information. The Frame control field indicates the type of frame. A Duration field contains NAV information used for CSMA/CA channel access. An RA field contains a MAC address for the recipient of the frame. A TA field contains the MAC address of the STA that transmitted the frame. A common info field and list user info field are seen.

The common info field is shown having the following subfields. A Trigger Type subfield of the Common Info field identifies the Trigger frame variant. In at least one embodiment if these bits are set to 3 and the TXOP share subfield (B63) is set to 1, then this indicates it is a MU-RTS-share frame. If an AP or non-AP STA receives a MU-RTS-share frame, it is made aware that the shared TXOP is initialized, to which it should respond with a CTS-share frame using the specified RU as indicated in the MU-RTS-share frame (indicated by the UL BW subfield of the Common Info and the RU Allocation subfield of the User Info field). An UpLoad (UL) Length subfield indicates the value of the L-SIG LENGTH field of the solicited HE TB PPDU. A More TF subfield indicates whether or not a subsequent Trigger frame is scheduled for transmission. A CS Required subfield indicates whether or not the STAs identified in the User Info fields are required to consider the medium state or the NAV in determining whether or not to respond. A UL BW subfield indicates the bandwidth in the HE-SIG-A of the HE TB PPDU. A GI and HE-LTF Type subfield indicates the GI and HE-LTF type of the HE TB PPDU response. The MU-MIMO HE-LTF Mode subfield indicates the HE-LTF mode of the non-OFDMA MU-MIMO HE TB PPDU response when the GI and HE-LTF Type subfield indicates either 2× HE-LTF+1.6 fKs GI or 4× HE-LTF+3.2 fKs GI. Otherwise, this subfield is set to indicate HE single stream pilot HE-LTF mode. The Number of HE-LTF Symbols and Midamble Periodicity subfield indicates the number of HE-LTF symbols present in the HE TB PPDU if the Doppler subfield is set to a first state (e.g., 0), and indicates the number of HE-LTF symbols and periodicity of the midamble if the Doppler subfield is set to a second state (e.g., 1).

The field continues at bit 26 with a UL STBC subfield indicating the status of STBC encoding of the solicited HE TB PPDUs. The LDPC Extra Symbol Segment subfield indicates the status of the LDPC extra symbol segment. An AP/non-AP TXOP owner STA Tx Power subfield indicates, in units of dBm, the AP (for the dynamic scenario with AP as the coordinator) or the non-AP TXOP holder STA's (for the dynamic scenario without AP as the coordinator) combined transmit power at the antenna connectors of all the transmit antennas used to transmit the Trigger frame and normalized to 20 MHz bandwidth. A Pre-FEC Padding Factor subfield indicates the pre-FEC padding factor. A PE Disambiguity subfield indicates PE disambiguity. A UL Spatial Reuse subfield carries the values to be included in the Spatial Reuse fields in the HE-SIG-A field of the solicited HE TB PPDUs. A Doppler subfield is set to a first state (e.g., 1) to indicate that a midamble is present in the HE TB PPDU and otherwise set to a second state (e.g., 0). A UL HE-SIG-A2 Reserved subfield carries the value to be included in the Reserved field in the HE-SIG-A2 subfield of the solicited HE TB PPDUs. A TXOP share subfield of the Common Info field set to a first state (e.g., 1) indicates that the sender is willing to share the TXOP with other non-AP STAs; otherwise it is set to a second state (e.g., 0). A Trigger Dependent Common Info subfield is optionally present based on the value of the Trigger Type field.

Back at the top of the figure is seen a List user Information field, and showing User Info 1, User Info 2 through to User Info n fields, each of which having subfields depicted in the middle of the figure as follows. The User Info field contains the assigned RU information for a specific STA. An AID12 subfield of the User Info field is used to allocate the fixed RU to a specific STA, whose AID is equal to the value in the AID12 subfield. An RU Allocation subfield along with the UL BW subfield in the Common Info field identifies the size and the location of the RU. The UL FEC Coding Type subfield indicates the code type of the solicited HE TB PPDU. A UL HE-MCS subfield indicates the HE-MCS of the solicited HE TB PPDU. A UL DCM subfield indicates DCM of the solicited HE TB PPDU. An SS Allocation subfield indicates the spatial streams of the solicited HE TB PPDU. An RA-RU Information subfield indicates RA-RU information. A UL Target RSSI subfield indicates the expected receive signal power for the HE portion of the HE TB PPDU transmitted on the assigned RU. A Trigger Dependent User Info subfield is optionally present based on the value of the Trigger Type field.

8.5. CTS-Share

Figure 67:
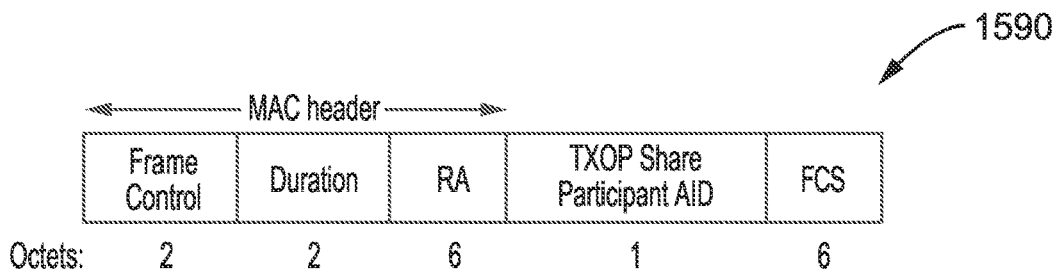
FIG. 67 is a data field diagram of a CTS-share frame according to at least one embodiment of the present disclosure.

FIG. 67 illustrates an example embodiment 1590 of a CTS-share frame having the following fields. A Frame control field indicates the type of frame. A Duration field contains NAV information used for CSMA/CA channel access. An RA field contains a MAC address of the recipient of the frame. A TXOP Share Participant AID field indicates the AID of the TXOP share participant which sent this CTS-share frame. Once the TXOP holder receives the CTS-share frame as an immediate response of the previously sent MU-RTS-share frame, it is made aware of which STAs are willing to join the shared TXOP by checking the TXOP Share Participant AID info, and thus, allocate resources to these STA accordingly. If a non-AP STA receives a MU-RTS-share frame for it, but doesn't have anything to send to the AP, the non-AP STA in at least one embodiment will set the TXOP Share Participant AID to 0 to indicate it will not join the following shared TXOP.

8.6. OBSS TXOP Participant STAs Frame

Figure 68:
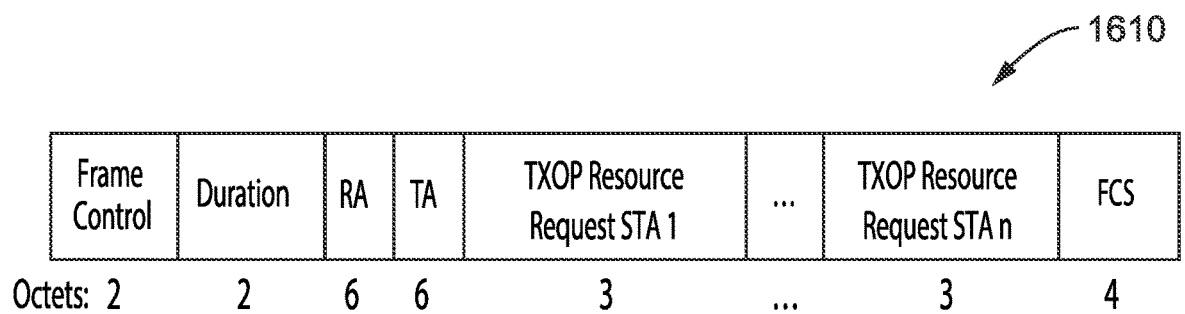
FIG. 68 is a data field diagram of an OBSS TXOP participant STAs frame format according to at least one embodiment of the present disclosure.

FIG. 68 illustrates an example embodiment 1610 of an OBSS TXOP participant STAs frame format having the following fields. A Frame control field indicates the type of the frame. A Duration field contains NAV information used for CSMA/CA channel access. An RA field contains the received BSSID of this trigger frame. A TA field contains the transmitted BSSID of this trigger frame. One or more TXOP Resource Request STA fields are shown, whose subfields are described in FIG. 69.

Figure 69:
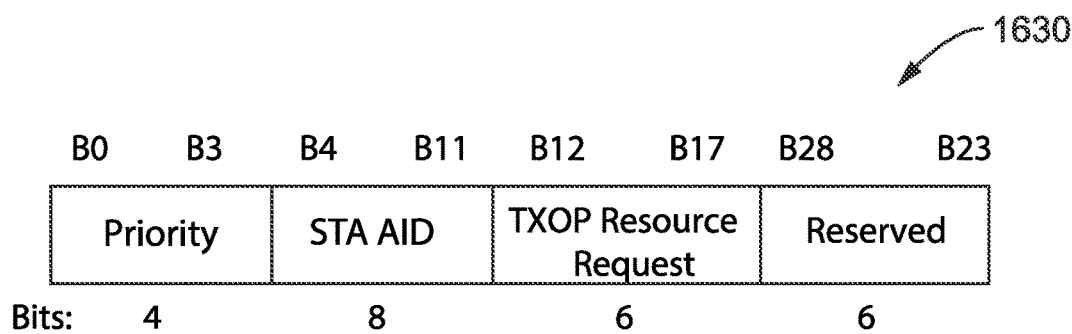
FIG. 69 is a data field diagram of a TXOP Resource Request STA field according to at least one embodiment of the present disclosure.

FIG. 69 illustrates an example embodiment 1630 of the TXOP Resource Request STA field having the following subfields. The TXOP Resource Request subfield is the same as that described in FIG. 64. Once an AP receives a MU-RTS-share frame, it is made aware that the shared TXOP has been initiated. Then the AP unicasts an OBSS TXOP participant STAs frame to another AP of the shared TXOP participant BSS. The frame of the OBSS TXOP participant STA doesn't contain any information of non-AP shared TXOP participant STA.

After receiving the frame from the OBSS TXOP participant STA that doesn't contain any information of non-AP shared TXOP participant STA, the AP of the shared TXOP participant BSS is aware that the initiation of the shared TXOP has started and sends an MU-RTS-share frame to the potential non-AP shared TXOP participant STAs.

After receiving all CTS-share frames from the non-AP TXOP participant STAs that are willing to participant in the following shared TXOP, the AP of the shared TXOP participant BSS unicasts an OBSS TXOP participant STAs frame to the AP of the shared TXOP holder BSS, with the latest information of the shared TXOP participant STAs.

After receiving the OBSS TXOP participant STAs frame with the information of the shared TXOP participant STAs from another BSS, the AP broadcasts a CTS-to-self-share frame to announce, in the shared TXOP participant BSS, that the shared TXOP initialization process has been completed.

8.7. CTS-to-Self-Share

Figure 70:
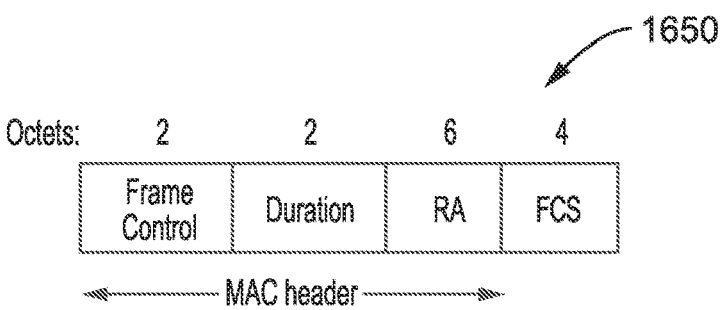
FIG. 70 is a data field diagram of a CTS-to-self frame according to at least one embodiment of the present disclosure.

FIG. 70 illustrates an example embodiment 1650 of a CTS-to-self frame format having the following fields. A Frame control field indicates the type of frame. A Duration field contains NAV information used for CSMA/CA channel access. An RA field contains a MAC address for the recipient of the frame. In a single BSS scenario, A TXOP holder STA may first unicast a CTS-to-self frame to the AP with the RA field equal to its own MAC address to reserve the medium for a TXOP transmission. When the AP receives the CTS-to-self frame, it broadcasts a MU-RTS-share frame to the potential TXOP share participant STAs. In an OBSS scenario, after receiving the OBSS TXOP participant STAs frame with the information of the shared TXOP participant STAs from another BSS, the AP broadcasts a CTS-to-self-share frame to announce that the shared TXOP initialization process is finished in the shared TXOP participant BSS.

Once the non-AP TXOP holder STA receives the CTS-to-self-share frame, it can start the TXOP schedule and access stage. The NAV can be set in the duration field of the CTS-to-self frame. Set up Bits 0-13 contain a NAV duration value, which ranges from 1-16 383. Set up Bit 14-15 contain sharing information, and when set as 01 indicate that the TXOP holder is willing to share the TXOP with other STAs. An AP receiving a CTS-to-self frame from a TXOP holder STA sends a MU-RTS-share frame to the potential TXOP share participant STAs.

8.8. TXOP Priority Trigger Frame

Figure 71:
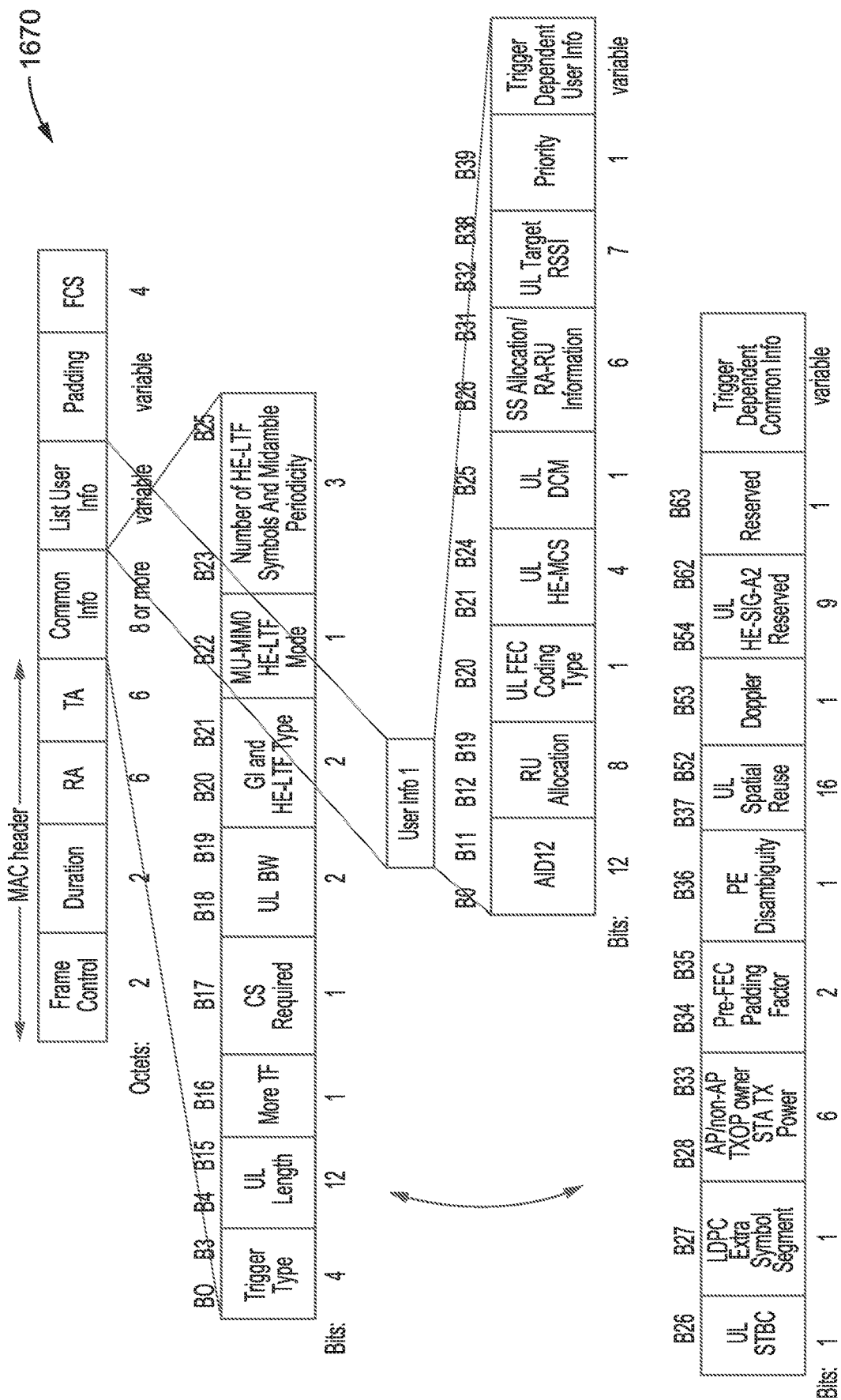
FIG. 71 is a data field diagram of a TXOP priority trigger frame format according to at least one embodiment of the present disclosure.

FIG. 71 illustrates an example embodiment 1670 of a TXOP priority trigger frame format having the following subfields. A Frame control field indicates the type of frame. A Duration field contains NAV information used for CSMA/CA channel access. An RA field contains a MAC address for the recipient of the frame. A TA field contains the MAC address of the STA that transmitted the frame. A Common Info field and List User Info field are described below.

The Common Info field is shown having the following subfields. A Trigger Type subfield in this example is set to 12 (which was reserved previously) to indicate that this is a TXOP Priority trigger frame. The TXOP holder STA will reserve RUs for itself and share the remaining RUs with other STAs. After unicasting the TXOP Priority trigger frame to the AP, the TXOP holder waits for the trigger frame from the AP with the scheduled TXOP access information. After receiving the TXOP Priority trigger frame, the AP performs a shared TXOP access scheduling and trigger UL transmission. The AP allocates more resources for the TXOP holder STA.

An AP/non-AP TXOP owner STA Tx Power subfield indicates, in units of dBm, the AP (for the dynamic scenario with AP as the coordinator) or the non-AP TXOP holder STA's (for the dynamic scenario without AP as the coordinator) combined transmit power at the antenna connectors of all the transmit antennas used to transmit the Trigger frame and normalized to 20 MHz bandwidth.

A List User Info field contains the following subfields. An AID12 subfield (1-2007) of the User Info field is addressed to an associated STA whose AID is equal to the value in the AID12 subfield; this STA is the shared TXOP participant STA. An RU Allocation subfield along with the UL BW subfield in the Common Info field identifies the size and the location of the RU. A Priority subfield of the User Info field indicates the priority of the STA which sent the TXOP Priority Trigger frame. When this subfield is set to a first state (e.g., 1) this indicates that the sender is the TXOP holder, whereby the AP is to assign a sufficient RU size that cannot be less than the RU size indicated by the RU Allocation subfield and the UL BW subfield.

8.9. OBSS-Share Trigger Frame

FIG. 72 illustrates an example embodiment 1690 of an OBSS share trigger frame having the following subfields. A Frame control field indicates the type of frame. A Duration field contains NAV information used for CSMA/CA channel access. An RA field is the received BSSID of this trigger frame. A TA field is the transmitted BSSID of this trigger frame. A Reserved Band TXOP Holder BSS field indicates that the reserved frequency band can be utilized by the shared TXOP holder BSS for data transmission, and thus the remaining frequency band can be utilized by the shared TXOP participant BSS. A TF Delay field indicates a delay duration between the AP receiving the OBSS-share trigger frame to sending a trigger frame. A Data Delay field indicates a delay duration between the reception of the OBSS-share trigger frame to the reception of the UL DATA. An MU-BA Delay field indicates a delay duration between the AP receiving the OBSS-share trigger frame to sending an MU-BA frame to the associated AP.

FIG. 73 illustrates an example embodiment 1710 of a Reserved Band TXOP Holder BSS field having the following subfields. A Reserved Band subfield of the Reserved Band TXOP Holder BSS field indicates the OBSS-share trigger frame reserves a frequency band for the TXOP holder BSS, and leaves the remaining frequency band for the TXOP participant BSS. The combination of bits B0-B3 with bits B4-B5 indicates the reserved frequency band. A Random Access subfield of the Reserved Band TXOP Holder BSS field indicates the OBSS-share frame triggers a random access for the non-AP STAs in the shared TXOP BSS. A Scheduled Access subfield of the Reserved Band TXOP Holder BSS field indicates the OBSS-share frame triggers a scheduled access for the non-AP STAs in the shared TXOP BSS.

8.10. TXOP Random Access Request Trigger Frame

Figure 74:
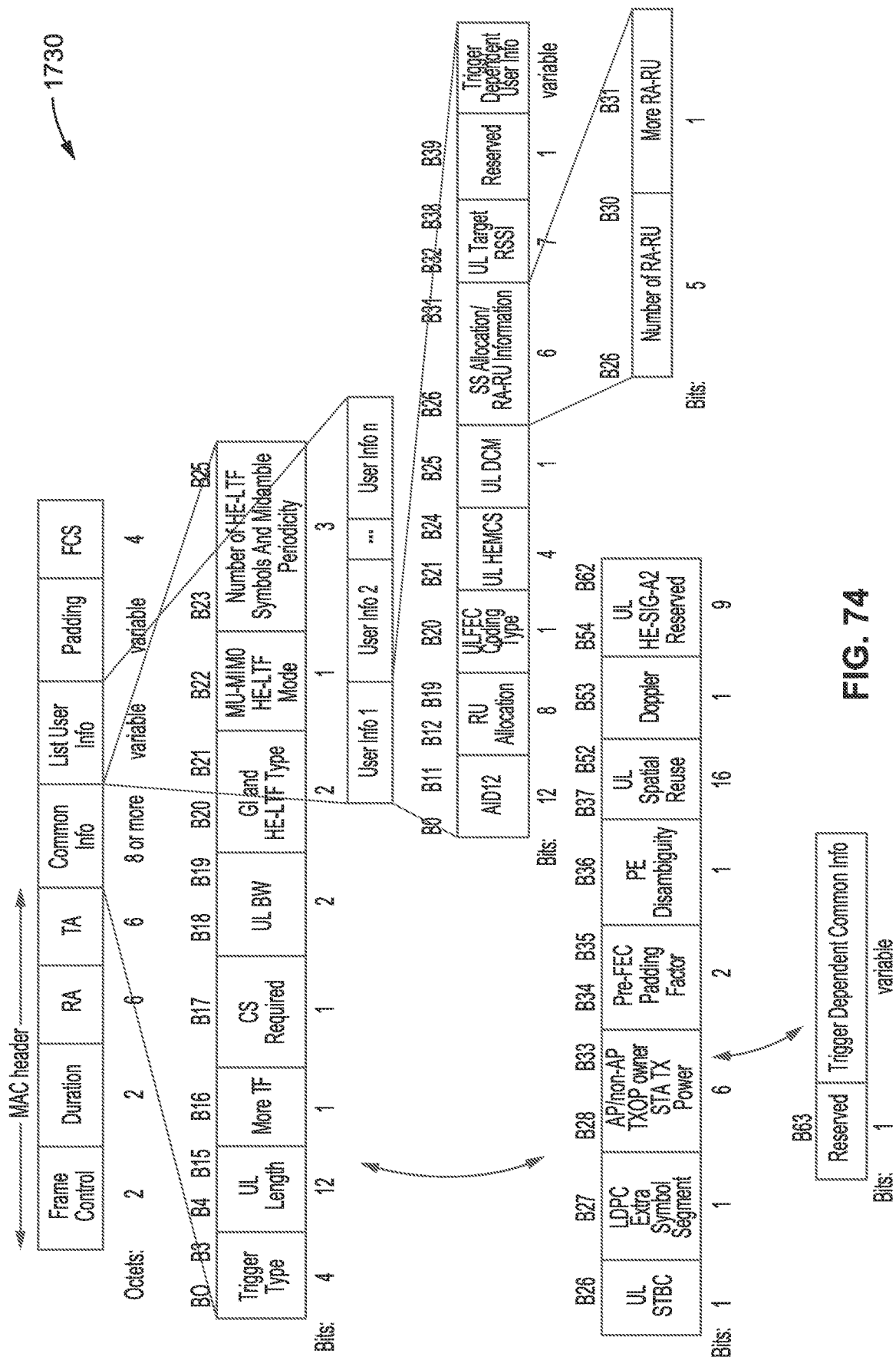
FIG. 74 is a data field diagram of a TXOP random access request trigger frame according to at least one embodiment of the present disclosure.

FIG. 74 illustrates an example embodiment 1730 of a TXOP random access request trigger having the following subfields. A Frame control field indicates the type of frame. A Duration field contains NAV information used for CSMA/CA channel access. An RA field contains a MAC address for the recipient of the frame. A TA field contains the MAC address of the STA that transmitted the frame. A Common Info (Information) Field and List user Info (Information) field are described below.

The Common Info (Information) Field has the following subfields. A Trigger Type subfield in this example embodiment is set to 8 (using bits that were previously reserved) to indicate that it is a TXOP random access request trigger frame. The TXOP holder STA will reserve RUs for itself and share the remaining RUs with other STAs. After sending out or receiving the TXOP random access request trigger, the TXOP holder STA unicasts UL data to the AP in the reserved RUs. After receiving the TXOP random access request trigger, the TXOP share participant STAs randomly access the channel when contending for the shared RUs. The TXOP holder STA accesses the channel using the reserved RU. An AP/non-AP TXOP owner STA Tx Power subfield indicates, in units of dBm, the AP (for the dynamic scenario with AP as the coordinator) or the non-AP TXOP holder STA's (for the dynamic scenario without AP as the coordinator) combined transmit power at the antenna connectors of all the transmit antennas used to transmit the Trigger frame and normalized to 20 MHz bandwidth.

The List user Info (Information) field has the following subfields. The TXOP holder STA announces the reserved RUs in the UL BW subfield of the Common Info and the RU Allocation subfield of the User Info field. In addition, it will announce its own AID in the AID12 subfield which in at least one embodiment ranges from 1 to 2007. For other associated STAs, the AID12 subfield of the User Info field is set as 0, then bits B26-B31 of the User Info field is set to the RA-RU Information subfield. An SS Allocation/RA-RU Information subfield of the User Info field in this case indicates the RA-RU information. The RA-RU information subfield is shown with additional subfields of Number of RA-RU and More RA-RU.

The Number of RA-RU subfield indicates the number of contiguous RUs allocated for UL OFDMA random access (UORA). The value of the Number of RA-RU subfield is equal to the number of contiguous RA-RUs minus one. The More RA-RU subfield is set to a first state (e.g., 1) to indicate that RA-RUs of the type indicated by the AID12 subfield in this User Info field are allocated in subsequent Trigger frames that are sent until the end of the TWT SP in which the Trigger frame carrying this field is sent, otherwise the subfield is set to a second state (e.g., 0). The More RA-RU subfield is reserved if the More TF field in the Common Info field is set to 0.

8.11. Unicast TXOP Access Request Trigger Frame

Figure 75:
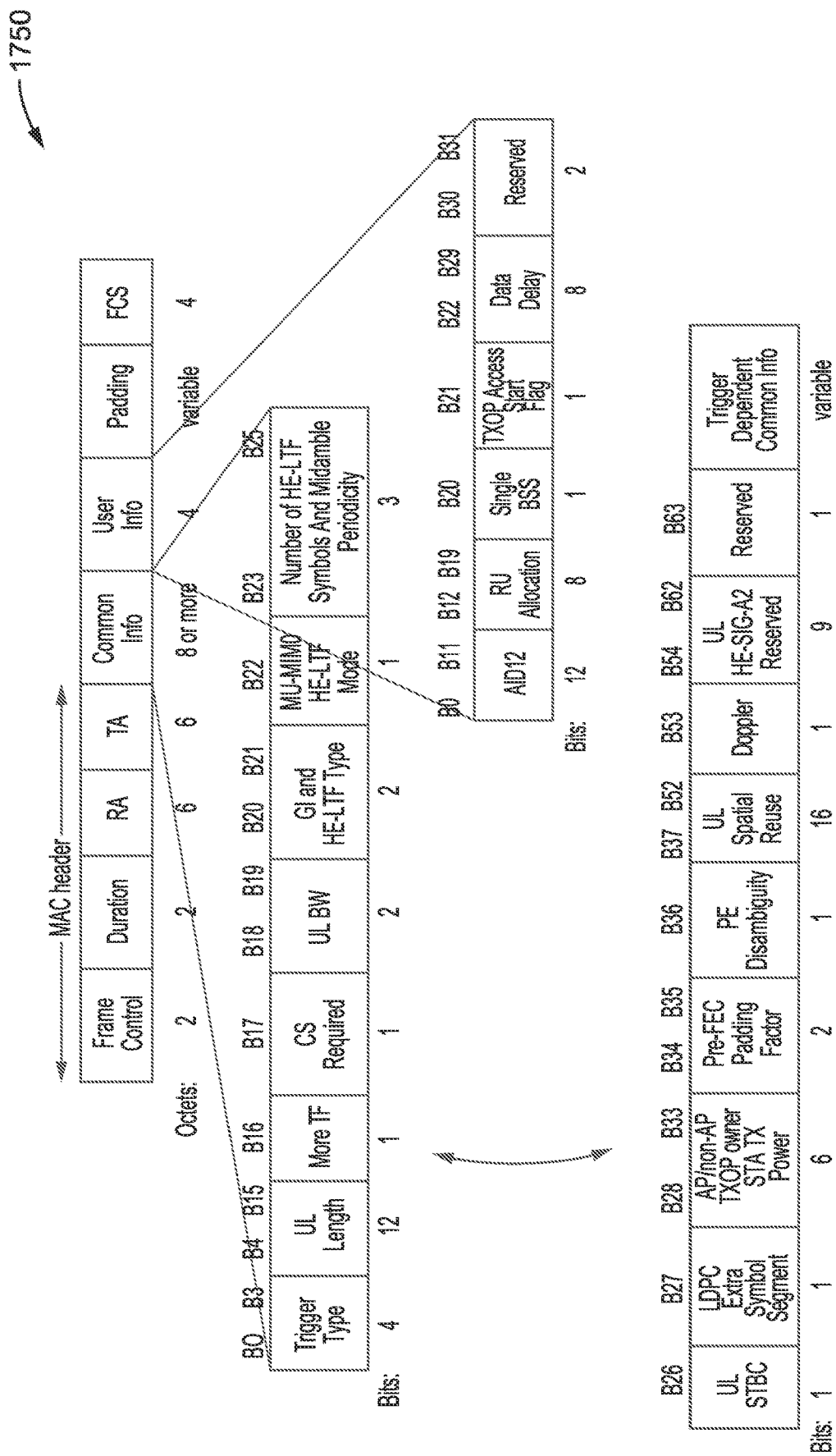
FIG. 75 is a data field diagram of a unicast TXOP access request trigger frame according to at least one embodiment of the present disclosure.

FIG. 75 illustrates an example embodiment 1750 of a unicast TXOP access request trigger frame format having the following fields. A Frame control field indicates the type of frame. A Duration field contains NAV information used for CSMA/CA channel access. An RA field contains a MAC address for the recipient of the frame. A TA field contains the MAC address of the STA that transmitted the frame. A Common Info field and List User Info field are described below.

The Common Info field is shown having the following subfields. A Trigger Type subfield in this example embodiment is set to 9 (previously these bits were reserved) to indicate that this is a Unicast TXOP access request trigger frame.

8.11.1. For a Single BSS Scenario

After sending out the last (indicated by the TXOP Access Start Flag subfield) Unicast TXOP access request trigger frame, the TXOP holder STA should unicast UL data to AP in the reserved RUs.

After receiving the last Unicast TXOP access request trigger frame (even if the destination is another STA), the TXOP share participant STAs should unicast UL data to the AP in the assigned RUs.

8.11.2. For an OBSS Scenario

After sending out/receiving a Unicast TXOP access request trigger frame, the non-AP STAs send out UL DATA after the Data Delay indicated in this trigger frame.

The AP/non-AP TXOP owner STA Tx Power subfield indicates, in units of dBm, the AP (for the dynamic scenario with AP as the coordinator) or the non-AP TXOP holder STA's (for the dynamic scenario without AP as the coordinator) combined transmit power at the antenna connectors of all the transmit antennas used to transmit the Trigger frame and normalized to 20 MHz bandwidth.

A List User Info field contains the following subfields. The AID12 subfield (1-2007) of the User Info field is addressed to an associated STA, the shared TXOP participant STA, whose AID is equal to the value in the AID12 subfield. An RU Allocation subfield along with the UL BW subfield in the Common Info field identifies the size and the location of the RU. A Single BSS subfield indicates if the Unicast TXOP access request trigger frame is sent for a single BSS scenario or an OBSS scenario. For Single BSS scenario, the TXOP Access Start Flag subfield is used to indicate the last Unicast TXOP access request trigger frame. A Data Delay subfield is not used in the Single BSS scenario. For an OBSS scenario, the Data Delay subfield is used to indicate a delay to transmit DATA, while the TXOP Access Start Flag subfield is not used.

The TXOP Access Start Flag subfield indicates if this unicast TXOP access request Trigger frame has been sent to the last TXOP share participant STA by the TXOP holder. If this is the last one, then this flag is set to a first state (e.g. 1); otherwise it is set to a second state (e.g., 0).

For each TXOP share participant STA that receives a unicast TXOP access request Trigger, even if the frame is not sent to it, the STA still checks the TXOP Access Start Flag subfield. If this field is 0, the STA holds the DATA; otherwise if this field is 1, the STA sends out its DATA to the AP.

The Data Delay subfield indicates the delay between the non-AP STAs sending out/receiving a Unicast TXOP access request trigger frame to send out UL DATA.

8.12. TXOP Access Scheduler Trigger Frame

Figure 76:
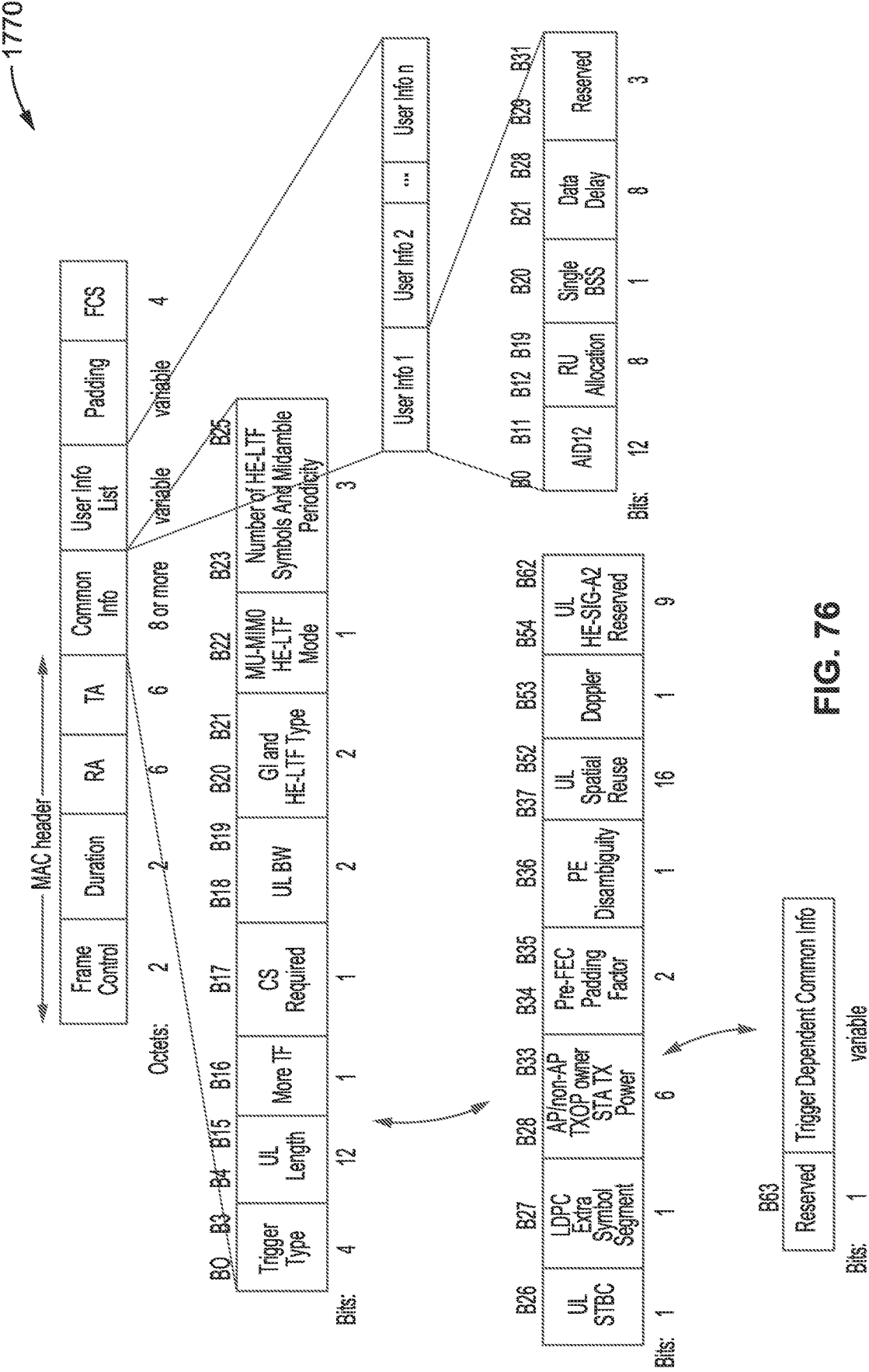
FIG. 76 is a data field diagram of a TXOP access scheduler trigger frame format according to at least one embodiment of the present disclosure.

FIG. 76 illustrates an example embodiment 1770 of a TXOP access scheduler trigger frame format having the following fields. A Frame control field indicates the type of frame. A Duration field contains NAV information used for CSMA/CA channel access. An RA field contains a MAC address for the recipient of the frame. A TA field contains the MAC address of the STA that transmitted the frame. A Common Info field and List User Info field are described below.

The Common Info field is shown having the following subfields. A Trigger Type subfield of the Common Info field is set in this example embodiment to 11 (these bits were previously reserved) to indicate that this is a TXOP access scheduler trigger frame.

8.12.1. For a Single BSS Scenario

After sending out the TXOP access scheduler trigger frame, the TXOP holder STA unicasts UL data to the AP after receiving the last Unicast TXOP access request trigger frame.

After receiving the TXOP access scheduler trigger frame, the AP sends a Unicast TXOP access request trigger frame to each TXOP share participant STA. The AP sets the TXOP Access Start Flag subfield to 1 when sending the last Unicast TXOP access request trigger frame.

8.12.2. For an OBSS Scenario

After sending out the TXOP access scheduler trigger frame, the TXOP holder STA unicasts UL data to the AP after a Data Delay duration. After receiving the TXOP access scheduler trigger frame, the AP sends a Unicast TXOP access request trigger frame to each TXOP share participant STA by setting the corresponding Data Delay duration.

The AP/non-AP TXOP owner STA Tx Power subfield indicates, in units of dBm, the AP (for the dynamic scenario with AP as the coordinator) or the non-AP TXOP holder STA's (for the dynamic scenario without AP as the coordinator) combined transmit power at the antenna connectors of all the transmit antennas used to transmit the Trigger frame and normalized to 20 MHz bandwidth.

A List User Info field contains one or more sets of user information, each of which has the following subfields. An AID12 subfield (1-2007) of the User Info field is addressed to an associated STA whose AID is equal to the value in the AID12 subfield. This STA is the shared TXOP participant STA. An RU Allocation subfield along with the UL BW subfield in the Common Info field identifies the size and the location of the RU. A Data Delay subfield of the User Info field indicates the delay duration for the non-AP STA whose AID is equal to the value in the AID12 subfield to send UL DATA.

8.13. Broadcast TXOP Access Request Trigger Frame

Figure 77:
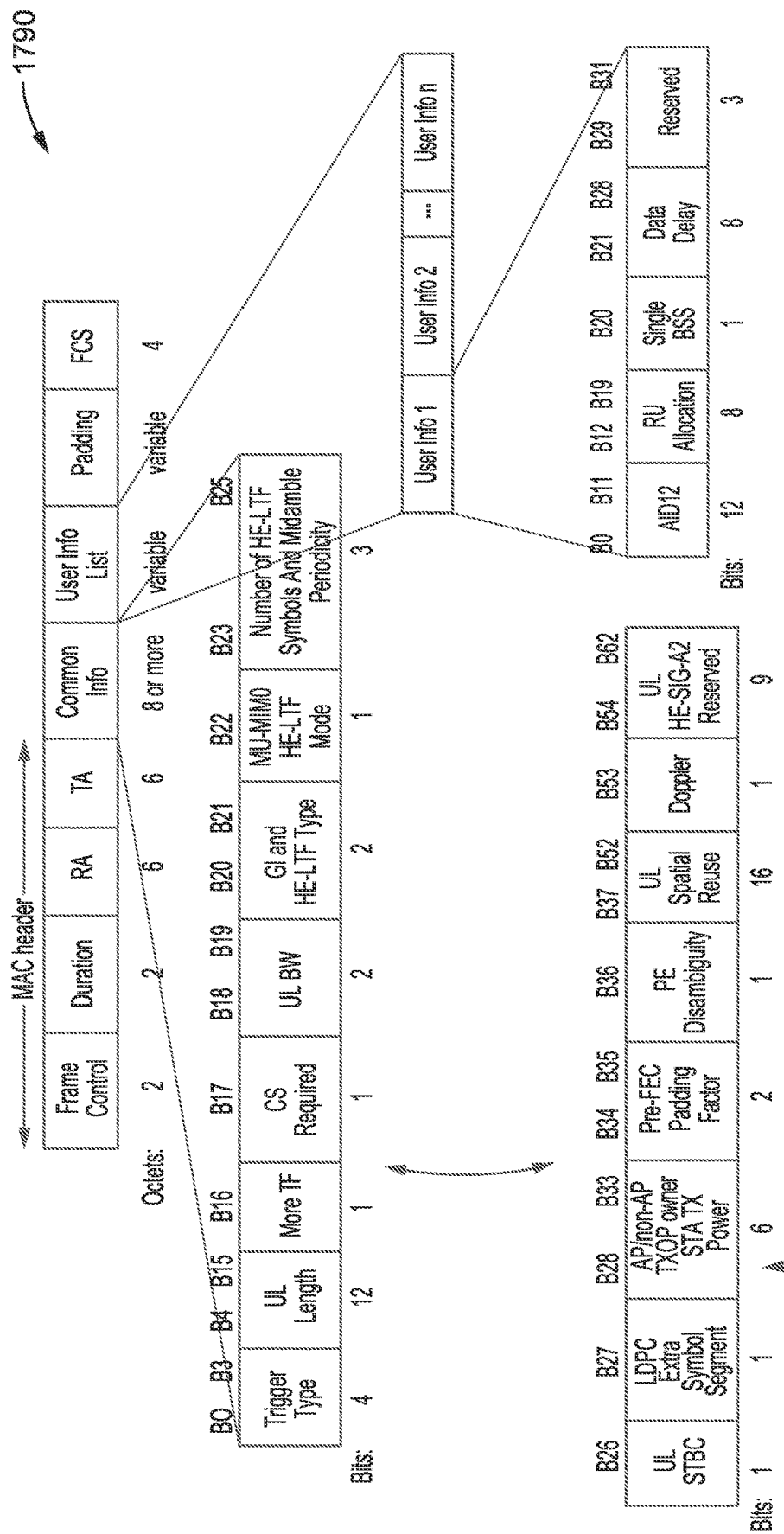
FIG. 77 is a data field diagram of a broadcast TXOP access request trigger frame according to at least one embodiment of the present disclosure.

FIG. 77 illustrates an example embodiment 1790 of a broadcast TXOP access request trigger frame format having the following fields. A Frame control field indicates the type of frame. A Duration field contains NAV information used for CSMA/CA channel access. An RA field contains a MAC address for the recipient of the frame. A TA field contains the MAC address of the STA that transmitted the frame. A Common Info field and List User Info field are described below.

The Common Info field is shown having the following subfields. A Trigger Type subfield of the Common Info field in this example embodiment is set to 10 (previously these bits were reserved) to indicate that this is a Broadcast TXOP access request trigger frame.

8.13.1. For a Single BSS Scenario

After sending out the Broadcast TXOP access request trigger frame, the TXOP holder STA unicasts UL data to the AP in the reserved RUs. After receiving the Broadcast TXOP access request trigger frame, the TXOP share participant STAs unicasts UL data to the AP in the assigned RUs.

8.13.2. For an OBSS Scenario

After sending out the Broadcast TXOP access request trigger frame, the TXOP holder STA unicasts UL data to the AP in the reserved RUs after the Data Delay. After receiving the Broadcast TXOP access request trigger frame, the TXOP share participant STAs unicasts UL data to the AP in the assigned RUs after the Data Delay.

The AP/non-AP TXOP owner STA Tx Power subfield indicates, in units of dBm, the AP (for the dynamic scenario with AP as the coordinator) or the non-AP TXOP holder STA's (for the dynamic scenario without AP as the coordinator) combined transmit power at the antenna connectors of all the transmit antennas used to transmit the Trigger frame and normalized to 20 MHz bandwidth.

A List User Info field contains the following subfields. An AID12 subfield (1-2007) of the User Info field is addressed to an associated STA whose AID is equal to the value in the AID12 subfield. This STA is the shared TXOP participant STA. An RU Allocation subfield along with the UL BW subfield in the Common Info field identifies the size and location of the RU. A Data Delay subfield of the User Info field indicates the delay duration for the non-AP STA whose AID is equal to the value in the AID12 subfield to send UL DATA.

8.14. TXOP Holder Configuration

FIG. 78 illustrates an example embodiment 1810 of a TXOP holder configuration frame format having the following fields. The Frame Control, Duration, RA and TA fields are as previously described. One or more STA TXOP Access Allocation fields are included, which indicate the TXOP access allocation for each specific STA.

FIG. 79 illustrates an example embodiment 1830 of the STA TXOP Allocation field format containing the following fields. A TXOP Holder MAC Address subfield indicates the MAC address of the TXOP holder. A TXOP Participant MAC Address subfield indicates the MAC address of the TXOP share participant. An Allocation Control Information field contains TXOP resource allocation information as described in FIG. 80.

After the AP receives the TXOP holder configuration frame, the AP records the STA TXOP Access Allocation information and sends an acknowledge frame to the STA.

FIG. 80 illustrates an example embodiment 1850 of the Allocation Control Info subfield, indicating the TXOP resource allocation for the specific TXOP share participant STA, and having the following subfields. A Priority subfield indicates the priority of the traffic of the TXOP share participant STA. An AID12 (1-2007) subfield indicates the Allocation Control Info subfield is addressed to an associated STA whose AID is equal to the value in the AID12 subfield. A UL BW subfield of the Allocation Control Info subfield indicates the bandwidth in the HE-SIG-A of the HE TB PPDU. An RU Allocation subfield along with the UL BW subfield identifies the size and location of the assigned RU.

8.15. TXOP Access Configuration

FIG. 81 illustrates an example embodiment 1870 of a TXOP access configuration frame format. A Frame control field indicates the type of frame. A Duration field contains NAV information used for CSMA/CA channel access. An RA field is the received BSSID of this trigger frame. A TA field is the transmitted BSSID of this trigger frame. One or more STA Configuration fields are incorporated.

The STA Configuration field indicates the configuration for each non-AP STA, and contains one or more STA TXOP Access Allocation fields (e.g., 1 through n). The STAs send DATA to the AP using the allocated RU after receiving a trigger from either the TXOP holder (without the AP as coordinator) or from the associated AP (with AP as coordinator).

8.16. OBSS TXOP Access Configuration

FIG. 82 illustrates an example embodiment 1890 of an OBSS TXOP access configuration frame format having the following fields. A Frame control field indicates the type of frame. A Duration field contains NAV information used for CSMA/CA channel access. An RA field contains a MAC address for the recipient of the frame. A TA field contains the MAC address of the STA that transmitted the frame. A BSSID field indicates the ID of the BSS that generates the TXOP access configuration information. The BSSID is the MAC address of the AP in that BSS. The remaining fields are the same as the TXOP access configuration frame as shown in FIG. 81.

The OBSS TXOP access configuration frame is sent from one AP to another AP to indicate the complete TXOP access configuration of the sender AP's BSS.

8.17. TXOP Share Request Trigger

FIG. 83 illustrates an example embodiment 1910 of a TXOP share request trigger frame format having the following fields. It will be noted that a User Info List field is not required in the TXOP share request trigger frame format. A TA field contains the transmitter's MAC address, which should be set as the MAC address of the TXOP holder. An RA field is the receiver's MAC address, which is set as follows. In the scenario without AP as coordinator, the RA field is set as the broadcasting MAC address (ff:ff:ff:ff:ff:ff). The TXOP holder broadcasts the TXOP share request trigger frame. Once TXOP share participant STAs receive this frame, they send UL DATA to the associate AP by using the assigned RU as configured in the Shared TXOP configuration stage. The TXOP holder sends UL DATA to the associate AP using the assigned RU after sending the TXOP shared request trigger frame.

In the scenario which uses the AP as coordinator, the RA field is set as the MAC address of the associated AP. The TXOP holder unicasts the TXOP share request trigger frame. Once the AP receives this frame, the AP broadcast a TXOP share response trigger frame. All the STAs then should send UL DATA to the associated AP using the assigned RU as configured in the Shared TXOP configuration stage.

The other fields are as described in previous sections herein.

8.18. TXOP Share Response Trigger

FIG. 84 illustrates an example embodiment 1930 of a TXOP share response trigger frame format having the following fields. It will be noted that the User Info List field is not required to be included in the TXOP share request trigger frame format. An RA field is the receiver's MAC address, which in the scenario of AP as coordinator, is set as the broadcasting MAC address (ff:ff:ff:ff:ff:ff). A Data Delay field indicates a delay duration between the reception of the TXOP share response trigger to the transmission of the UL DATA in the OBSS scenario. The other fields are as described in previous sections herein.

9. General Scope of Embodiments

The enhancements described in the presented technology can be readily implemented within various wireless network communication stations. It should also be appreciated that wireless network communication stations are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

It will also be appreciated that the computer readable media (memory storing instructions) in these computation systems is "non-transitory", which comprises any and all forms of computer-readable media, with the sole exception being a transitory, propagating signal. Accordingly, the disclosed technology may comprise any form of computer-readable media, including those which are random access (e.g., RAM), require periodic refreshing (e.g., DRAM), those that degrade over time (e.g., EEPROMS, disk media), or that store data for only short periods of time and/or only in the presence of power, with the only limitation being that the term "computer readable media" is not applicable to an electronic signal which is transitory.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, comprising: (a) a wireless communication circuit configured as a first station for wirelessly communicating with at least one other station in the same or other basic service set (BSS), or from an overlapping basic service set (OBSS) over at least one channel; (b) a processor coupled to said wireless communication circuit within a station configured for operating on a wireless network; (c) a non-transitory memory storing instructions executable by the processor; and (d) wherein said instructions, when executed by the processor, perform sharing of a transmit opportunity (TXOP) with other stations in an OBSS in the frequency domain, by performing steps comprising: (d)(i) exchanging sharing offer and request information with an access point (AP) station to inform the AP, and/or gain approval by the AP, in sharing its TXOP with other non-AP stations of this shared TXOP holder BSS; (d)(ii) wherein said sharing offer and request information is shared with APs of overlapped BSSs, as a shared TXOP participant BSS; (d)(iii) upon gaining access to the at least one channel, information is exchanged with other stations to indicate that a coming TXOP is available to be shared, and identifying stations that are willing to join the coming shared TXOP; (d)(iv) wherein the AP of the shared TXOP participant BSS performs identifying shared TXOP participant STAs; and (d)(v) enabling a resource unit (RU) distribution by the non-AP TXOP holder station for the shared TXOP participant stations in the TXOP holder BSS, while in the shared TXOP participant BSS, scheduling and distribution of RUs for the shared TXOP participant stations are determined at the AP level.

A method for performing wireless communication in a network, comprising: (a) wirelessly communicating between a wireless communication circuit configured as a first station with at least one other station in the same or other basic service set (BSS), or from an overlapping basic service set (OBSS) over at least one channel for sharing of a transmit opportunity (TXOP) with other stations in an OBSS in the frequency domain; (b) exchanging sharing offer and request information with an access point (AP) station to inform the AP, and/or gain approval by the AP, in sharing its TXOP with other non-AP stations of this shared TXOP holder BSS; (c) wherein said sharing offer and request information is shared with APs of overlapped BSSs, as a shared TXOP participant BSS; (d) upon gaining access to the at least one channel, information is exchanged with other stations to indicate that a coming TXOP is available to be shared, and identifying stations that are willing to join the coming shared TXOP; (e) wherein the AP of the shared TXOP participant BSS performs identifying shared TXOP participant STAs; (f) enabling a resource unit (RU) distribution by the non-AP TXOP holder station for the shared TXOP participant stations in the TXOP holder BSS, while in the shared TXOP participant BSS, scheduling and distribution of RUs for the shared TXOP participant stations are determined at the AP level; and (g) wherein said method is performed by one or more processors executing instructions stored on a non-transitory medium.

An apparatus for performing wireless communication with a station (STA) obtaining a transmit opportunity (TXOP) in a wireless LAN network sharing its TXOP with other STAs in OBSS in frequency domain by performing the following steps: (a) exchanging a message with an access point (AP) station to inform and/or gain approval of sharing its TXOP with other non-AP STAs. APs of overlapped BSSs further exchange this information between each other; and (b) upon gaining access to the channel, exchanging information with other STAs to indicate the coming TXOP is available to be shared and identify the STAs which are willing to join the coming shared TXOP; (c) the non-AP TXOP holder STA assigning the RU distribution for the shared TXOP participant STAs in the internal BSS, wherein within the shared TXOP participant BSS, the scheduling and distribution of RUs for the shared TXOP participant STAs are left to be performed at the AP level; wherein to avoid interference between different BSSs, different bands are used with scheduling or time-shifting methods; (d) STAs of single BSS exchange information of TXOP shareability through the exchange of management frames with the coordination of AP, wherein the APs of different BSSs exchange this information by sending OBSS sharing STAs frame.

The apparatus or method of any preceding implementation, wherein an OBSS TXOP participant station frame is utilized to synchronize sharing operations between different BSSs.

The apparatus or method of any preceding implementation, wherein different frequency bands are used, or time shifting is performed to avoid interference between different BSSs.

The apparatus or method of any preceding implementation, wherein said non-AP stations exchange information about TXOP shareability through an exchange of management frames with the coordination of the AP station.

The apparatus or method of any preceding implementation, wherein said management frames are selected from the group of message frames consisting of authentication request frames, association request frames, authentication response frames, association response frames and beacon frames.

The apparatus or method of any preceding implementation, wherein APs of different BSS exchange information about TXOP share offer/request information through an exchange of OBSS sharing station frames.

The apparatus or method of any preceding implementation, wherein said instructions when executed by the processor further perform one or more steps comprising the shared TXOP holder station or the AP in each BSS identifying shared TXOP participant stations by exchanging multiple-user request-to-send (MU-RTS)-share and clear-to-send (CTS)-share frames.

The apparatus or method of any preceding implementation, wherein said instructions when executed by the processor further perform one or more steps comprising starting a shared TXOP initialization stage, in the shared TXOP participant BSS, by receiving an OBSS TXOP participant station frame, with no shared TXOP participant STA specified, from the AP in the shared TXOP holder BSS, and is finished by sending back an OBSS TXOP participant stations frame, with all shared TXOP participant stations specified, to the AP in the share TXOP holder BSS.

The apparatus or method of any preceding implementation, wherein said instructions when executed by the processor further perform one or more steps comprising avoiding interference by shared TXOP access between overlapped BSSs, by sending frames in different BSSs simultaneously but on different frequency bands, or sending frames on a same band but shifted with respect to time.

The apparatus or method of any preceding implementation, wherein the shared TXOP access on different bands includes performing scheduling based on random access and dedicated triggers, including a basic trigger.

The apparatus or method of any preceding implementation, wherein the shared TXOP access using time shifting includes scheduling based on a basic trigger, a unicast TXOP access request trigger, with or without using the AP as coordinator, and broadcasting TXOP access request triggers, which may be performed with or without using the AP as coordinator.

The apparatus or method of any preceding implementation, wherein the time shifting information between the shared TXOP holder BSS and the shared TXOP participant BSS is exchanged by utilizing an OBSS-share trigger frame.

The apparatus or method of any preceding implementation, wherein upon receiving a trigger frame from the AP, the non-AP TXOP share participant stations perform accessing the at least one channel according to the access information indicated in the trigger frame.

The apparatus or method of any preceding implementation, wherein the non-AP station performs determining for the other non-AP stations from the same BSS and for an OBSS accessing its TXOP for both resource unit (RU) allocations and order of access in a semi-static configuration through exchanging messages using AP coordination in a single BSS or OBSS scenario.

The apparatus or method of any preceding implementation, wherein the non-AP STAs performs a setup procedure to setup the semi-static configurations: (a) non-AP stations perform exchanging share offer/request frames with each other through AP coordination in each BSS, with the AP further forwarding this shareability information to another AP of the OBSS, after which the other AP broadcasts the received shareability information; (b) non-AP stations exchange the configuration of the semi-static TXOP sharing schedule with each other through AP coordination in each BSS, with the AP further forwarding the shared TXOP access scheduler to another AP of the OBSS, after which the other AP broadcasts the received shared TXOP access scheduler in the OBSS; and (c) performing a scheduling method or a time shifting method toward avoiding interference between different BSSs which utilize different bands in TXOP sharing, wherein non-AP stations access the shared TXOP using a configured RU.

The apparatus or method of any preceding implementation, wherein the assigning of a resource unit (RU) distribution includes advertising an allocation schedule of a shared TXOP access by the non-AP TXOP holder station wherein non-AP stations sharing the TXOP from the same BSS/OBSS follow the advertised allocation schedule.

The apparatus or method of any preceding implementation, wherein the shared TXOP access commences with the non-AP TXOP holder station unicasting a TXOP share request trigger, wherein in response to which the AP broadcasts a TXOP share response trigger with time shifting, or with different band scheduling, to avoid OBSS interference.

The apparatus or method of any preceding implementation, wherein said response trigger with time shifting is performed by exchanging time shifting information between the shared TXOP holder BSS and the shared TXOP participant BSS within an OBSS-share trigger frame.

The apparatus or method of any preceding implementation, wherein after non-AP stations receive a broadcast TXOP share response trigger from the AP, these non-AP stations perform accessing of the shared TXOP based on the advertised allocation schedule with its RU allocation after the corresponding Data Delay as indicated in the received trigger frame.

The apparatus or method of any preceding implementation, wherein in each BSS, the AP identifies the shared TXOP participant STAs with exchanging MU-RTS-share and CTS-share frames. In the shared TXOP participant BSS, the shared TXOP initialization stage is started by receiving an OBSS TXOP participant STAs frame, with no shared TXOP participant STA specified, from the AP in the share TXOP holder BSS, and is finished by sending back an OBSS TXOP participant STAs frame (with all shared TXOP participant STAs specified) to the AP in the share TXOP holder BSS.

The apparatus or method of any preceding implementation, wherein in order to avoid the interference between overlapped BSSs, the frames can be sent in different BSSs simultaneously but on different frequency bands or sent on same bands but with time shift.

The apparatus or method of any preceding implementation, wherein shared TXOP access on different bands methods includes the scheduling based on random access and dedicated trigger (basic trigger).

The apparatus or method of any preceding implementation, wherein shared TXOP access that with time shifting methods includes the scheduling based on basic trigger, unicast TXOP access request trigger (w/o AP as coordinator) and broadcast TXOP access request trigger (w/o AP as coordinator).

The apparatus or method of any preceding implementation, wherein time shifting information between the shared TXOP holder BSS and the shared TXOP participant BSS is exchanged by the OBSS-share trigger frame.

The apparatus or method of any preceding implementation, wherein upon receiving the trigger frame from the AP, the other non-AP TXOP share participant STAs access channel according to the access information indicated in the trigger frame.

The apparatus or method of any preceding implementation, wherein the non-AP STA can decide on the other non-AP STAs from the same BSS or from an OBSS accessing its TXOP and the RU allocation and order of access in a semi-static way through exchanging messages with the coordination of AP in single BSS/OBSS scenario.

The apparatus or method of any preceding implementation, wherein the non-AP STAs run a setup procedure to setup semi-static configurations.

The apparatus or method of any preceding implementation, wherein the non-AP STAs exchange share offer/request frame with each other through the coordination of AP in each BSS; wherein the AP further forwards this shareability information to another AP of the OBSS, and the other AP broadcasts the received shareability information.

The apparatus or method of any preceding implementation, wherein non-AP STAs exchange the configuration, semi-static TXOP sharing schedule with each other through the coordination of AP in each BSS. The AP further forwards the shared TXOP access scheduler to another AP of the OBSS; wherein the other AP broadcasts the received shared TXOP access scheduler in the OBSS.

The apparatus or method of any preceding implementation, wherein to avoid interference between different BSSs, different bands scheduling method or time shift method are used in shared TXOP access. Non-AP STAs access the shared TXOP using configured RU.

The apparatus or method of any preceding implementation, wherein a non-AP STA sharing its TXOP with other non-AP STAs from the same BSS/OBSS follows the advertised allocation schedule.

The apparatus or method of any preceding implementation, wherein to start the shared TXOP access, the non-AP TXOP holder STA unicasts TXOP share request trigger, wherein as a response the AP broadcasts a TXOP share response trigger with time shifting or with different band scheduling to avoid OBSS interference.

The apparatus or method of any preceding implementation, wherein the time shifting information between the shared TXOP holder BSS and the shared TXOP participant BSS is exchanged by the OBSS-share trigger frame.

The apparatus or method of any preceding implementation, wherein once the non-AP STAs receive a broadcast TXOP share response trigger from the AP, they access the channel based on the advertised RU allocation and after the corresponding Data Delay as indicated in the received trigger frame.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to +10°, such as less than or equal to 5°, less than or equal to ±4°, less than or equal to ±3°, less than or equal to 2°, less than or equal to 1°, less than or equal to 0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for wireless communication in a network, comprising:
   (a) a wireless communication circuit configured as a first station for wirelessly communicating with at least one other station in the same or other basic service set (BSS), or from an overlapping basic service set (OBSS) over at least one channel;
   (b) a processor coupled to said wireless communication circuit within a station configured for operating on a wireless network;
   (c) a non-transitory memory storing instructions executable by the processor; and
   (d) wherein said instructions, when executed by the processor, perform sharing of a transmit opportunity (TXOP) with other stations in an OBSS in the frequency domain, by performing steps comprising:
      (i) exchanging sharing offer and request information with an access point (AP) station to inform the AP, and/or gain approval by the AP, in sharing its TXOP with other non-AP stations of this shared TXOP holder BSS;
      (ii) wherein said sharing offer and request information is shared with APs of overlapped BSSs, as a shared TXOP participant BSS;
      (iii) upon gaining access to the at least one channel, information is exchanged with other stations to indicate that a coming TXOP is available to be shared, and identifying stations that are willing to join the coming shared TXOP;
      (iv) wherein the AP of the shared TXOP participant BSS performs identifying shared TXOP participant STAs; and
      (v) enabling a resource unit (RU) distribution by the non-AP TXOP holder station for the shared TXOP participant stations in the TXOP holder BSS, while in the shared TXOP participant BSS, scheduling and distribution of RUs for the shared TXOP participant stations are determined at the AP level.

2. The apparatus of claim 1, wherein an OBSS TXOP participant station frame is utilized to synchronize sharing operations between different BSSs.

3. The apparatus of claim 1, wherein different frequency bands are used, or time shifting is performed to avoid interference between different BSSs.

4. The apparatus of claim 1, wherein said non-AP stations exchange information about TXOP shareability through an exchange of management frames with the coordination of the AP station.

5. The apparatus of claim 4, wherein said management frames are selected from the group of message frames consisting of authentication request frames, association request frames, authentication response frames, association response frames and beacon frames.

6. The apparatus of claim 1, wherein APs of different BSS exchange information about TXOP share offer/request information through an exchange of OBSS sharing station frames.

7. The apparatus of claim 1, wherein said instructions when executed by the processor further perform one or more steps comprising the shared TXOP holder station or the AP in each BSS identifying shared TXOP participant stations by exchanging multiple-user request-to-send (MU-RTS)-share and clear-to-send (CTS)-share frames.

8. The apparatus of claim 1, wherein said instructions when executed by the processor further perform one or more steps comprising starting a shared TXOP initialization stage, in the shared TXOP participant BSS, by receiving an OBSS TXOP participant station frame, with no shared TXOP participant STA specified, from the AP in the shared TXOP holder BSS, and is finished by sending back an OBSS TXOP participant stations frame, with all shared TXOP participant stations specified, to the AP in the share TXOP holder BSS.

9. The apparatus of claim 1, wherein said instructions when executed by the processor further perform one or more steps comprising avoiding interference by shared TXOP access between overlapped BSSs, by sending frames in different BSSs simultaneously but on different frequency bands, or sending frames on a same band but shifted with respect to time.

10. The apparatus of claim 9, wherein the shared TXOP access on different bands includes performing scheduling based on random access and dedicated triggers, including a basic trigger.

11. The apparatus of claim 9, wherein the shared TXOP access using time shifting includes scheduling based on a basic trigger, a unicast TXOP access request trigger, with or without using the AP as coordinator, and broadcasting TXOP access request triggers, which may be performed with or without using the AP as coordinator.

12. The apparatus of claim 9, wherein the time shifting information between the shared TXOP holder BSS and the shared TXOP participant BSS is exchanged by utilizing an OBSS-share trigger frame.

13. The apparatus of claim 1, wherein upon receiving a trigger frame from the AP, the non-AP TXOP share participant stations perform accessing the at least one channel according to the access information indicated in the trigger frame.

14. The apparatus of claim 1, wherein the non-AP station performs determining for the other non-AP stations from the same BSS and for an OBSS accessing its TXOP for both resource unit (RU) allocations and order of access in a semi-static configuration through exchanging messages using AP coordination in a single BSS or OBSS scenario.

15. The apparatus of claim 14, wherein the non-AP STAs performs a setup procedure to setup the semi-static configurations:
 (a) non-AP stations perform exchanging share offer/request frames with each other through AP coordination in each BSS, with the AP further forwarding this shareability information to another AP of the OBSS, after which the other AP broadcasts the received shareability information;
 (b) non-AP stations exchange the configuration of the semi-static TXOP sharing schedule with each other through AP coordination in each BSS, with the AP further forwarding the shared TXOP access scheduler to another AP of the OBSS, after which the other AP broadcasts the received shared TXOP access scheduler in the OBSS; and
 (c) performing a scheduling method or a time shifting method toward avoiding interference between different BSSs which utilize different bands in TXOP sharing, wherein non-AP stations access the shared TXOP using a configured RU.

16. The apparatus of claim 15, wherein the assigning of a resource unit (RU) distribution includes advertising an allocation schedule of a shared TXOP access by the non-AP TXOP holder station wherein non-AP stations sharing the TXOP from the same BSS/OBSS follow the advertised allocation schedule.

17. The apparatus of claim 16, wherein the shared TXOP access commences with the non-AP TXOP holder station unicasting a TXOP share request trigger, wherein in response to which the AP broadcasts a TXOP share response trigger with time shifting, or with different band scheduling, to avoid OBSS interference.

18. The apparatus of claim 17, wherein said response trigger with time shifting is performed by exchanging time shifting information between the shared TXOP holder BSS and the shared TXOP participant BSS within an OBSS-share trigger frame.

19. The apparatus of claim 16, wherein after non-AP stations receive a broadcast TXOP share response trigger from the AP, these non-AP stations perform accessing of the shared TXOP based on the advertised allocation schedule with its RU allocation after the corresponding Data Delay as indicated in the received trigger frame.

20. A method for performing wireless communication in a network, comprising:
 (a) wirelessly communicating between a wireless communication circuit configured as a first station with at least one other station in the same or other basic service set (BSS), or from an overlapping basic service set (OBSS) over at least one channel for sharing of a transmit opportunity (TXOP) with other stations in an OBSS in the frequency domain;
 (b) exchanging sharing offer and request information with an access point (AP) station to inform the AP, and/or gain approval by the AP, in sharing its TXOP with other non-AP stations of this shared TXOP holder BSS;
 (c) wherein said sharing offer and request information is shared with APs of overlapped BSSs, as a shared TXOP participant BSS;
 (d) upon gaining access to the at least one channel, information is exchanged with other stations to indicate that a coming TXOP is available to be shared, and identifying stations that are willing to join the coming shared TXOP;
 (e) wherein the AP of the shared TXOP participant BSS performs identifying shared TXOP participant STAs;
 (f) enabling a resource unit (RU) distribution by the non-AP TXOP holder station for the shared TXOP participant stations in the TXOP holder BSS, while in the shared TXOP participant BSS, scheduling and distribution of RUs for the shared TXOP participant stations are determined at the AP level; and
 (g) wherein said method is performed by one or more processors executing instructions stored on a non-transitory medium.

* * * * *